US008007878B2

(12) United States Patent
Yoneyama et al.

(10) Patent No.: US 8,007,878 B2
(45) Date of Patent: Aug. 30, 2011

(54) ANTIREFLECTION FILM, POLARIZING PLATE, AND IMAGE DISPLAY DEVICE

(75) Inventors: Hiroyuki Yoneyama, Minami-Ashigara (JP); Masaki Noro, Minami-Ashigara (JP); Yasuhiro Okamoto, Minami-Ashigara (JP)

(73) Assignee: Fujifilm Corporation, Minato-Ku, Tokyo (JP)

(*) Notice: Subject to any disclaimer, the term of this patent is extended or adjusted under 35 U.S.C. 154(b) by 875 days.

(21) Appl. No.: 11/498,177

(22) Filed: Aug. 3, 2006

(65) Prior Publication Data

US 2007/0048509 A1 Mar. 1, 2007

(30) Foreign Application Priority Data

Aug. 3, 2005 (JP) ................................ 2005-225478
Apr. 14, 2006 (JP) ................................ 2006-112368

(51) Int. Cl.
*G02F 1/1335* (2006.01)
*C08F 2/50* (2006.01)

(52) U.S. Cl. ........ 428/1.32; 428/1.3; 428/421; 428/422; 428/447; 522/71; 522/81; 522/83; 522/99; 522/113; 522/114; 522/149; 522/172; 522/184; 522/187; 264/1.32; 264/1.34; 264/1.7; 264/1.9; 349/122; 349/137

(58) Field of Classification Search .................... 522/71, 522/81, 83, 99, 113, 114, 149, 172, 184, 522/187; 428/1.32, 1.3, 421, 422, 447; 349/122, 349/137; 264/1.32, 1.34, 1.7, 1.9
See application file for complete search history.

(56) References Cited

U.S. PATENT DOCUMENTS

| | | | | |
|---|---|---|---|---|
| 5,409,777 | A | 4/1995 | Kennedy et al. | |
| 2003/0049456 | A1 | 3/2003 | Kawasato et al. | |
| 2003/0232155 | A1* | 12/2003 | Obayashi et al. | 428/1.32 |
| 2008/0234461 | A1* | 9/2008 | Fukushige | 528/374 |

FOREIGN PATENT DOCUMENTS

| | | | |
|---|---|---|---|
| CN | 1073137 | A | 6/1993 |
| CN | 1337009 | A | 2/2002 |
| CN | 1395118 | A | 2/2003 |
| EP | 1160591 | A1 | 12/2001 |
| JP | 62-174276 | A | 7/1987 |
| JP | 1-259071 | A | 10/1989 |
| JP | 2-173172 | A | 7/1990 |
| JP | 2-302477 | A | 12/1990 |
| JP | 11-189621 | A | 7/1999 |
| JP | 11189621 | A * | 7/1999 |
| JP | 11-228631 | A | 8/1999 |
| JP | 2003-26732 | A | 1/2003 |
| JP | 3498381 | B2 | 12/2003 |
| JP | 2004-307524 | A | 11/2004 |

* cited by examiner

*Primary Examiner* — Sanza L McClendon
(74) *Attorney, Agent, or Firm* — Buchanan Ingersoll & Rooney PC

(57) ABSTRACT

An antireflection film comprising a support and a low refractive index layer prepared by coating a coating composition containing the following components: (A) a fluorine-containing polymer, a principal chain of which is made of only carbon atoms and which contains at least one fluorine-containing vinyl monomer polymerization unit and at least one hydroxyl group-containing vinyl monomer polymerization unit, wherein a content of the hydroxyl group-containing vinyl monomer polymerization unit exceeds 20% by mole, provided that the polymer does not have a polysiloxane structure in the principal chain; (B) a crosslinking agent capable of reacting with a hydroxyl group; and (C) a compound containing two or more (meth)acryloyl groups in one molecule thereof.

24 Claims, 2 Drawing Sheets

ANTIREFLECTION FILM, POLARIZING PLATE, AND IMAGE DISPLAY DEVICE

FIELD OF THE INVENTION

The present invention relates to an antireflection film, a polarizing plate using the antireflection film and an image display device using the antireflection film or the polarizing plate for the outermost surface of a display.

BACKGROUND OF THE INVENTION

In general, in image display devices such as a cathode ray tube display device (CRT), a plasma display (PDP), an electroluminescence display (ELD), and a liquid crystal display device (LCD), for the purpose of preventing a lowering of contrast or reflection of an image due to the reflection of external light, an antireflection film is disposed on the outermost surface of a display so as to reduce a reflectance by using a principle of optical interference.

In general, such an antireflection film can be prepared by forming on a support a low refractive index layer having a refractive index lower than that of the support and having an appropriate thickness. In order to realize a low refractive index, it is desired to use a material having a low refractive index as far as possible for the low refractive index layer.

Also, since the antireflection film is used for the outermost surface of a display, it must have high scar resistance. In a thin film having a thickness of about 100 nm, in order to realize high scar resistance, the film must have strength by itself and adhesiveness to a lower layer.

Also, since the antireflection film is used for the outermost surface of a display device, it is required to have excellent resistance to attachment against various stains centering fingerprints in exhibition or daily use, or even in the case where the film is stained, it is required to have excellent stain wiping properties (the both properties will be hereinafter collectively referred to as "antifouling properties").

In order to decrease the refractive index of a material, there are measures such as (1) introduction of a fluorine atom and (2) decrease of density (introduction of voids). However, in all of these measures, the film strength or adhesiveness at an interface is lowered so that the scar resistance tends to be lowered. Thus, it was a difficult problem to make low refractive index and high scar resistance compatible with each other.

Also, in order to increase the hardness of a film itself, it is important to make a hardening reaction sufficiently proceed. A method for hardening a low refractive index layer of an antireflection film by making a hydroxyl group of a fluorine-containing polymer react with a hardening agent by the action of an acid catalyst is proposed in Japanese Patent No. 3498381, JP-A-11-189621, JP-A-11-228631, JP-A-2004-307524 and JP-A-2003-26732.

Also, in order to improve antifouling properties, an example of a fluorine-containing polymer having silicon introduced into the polymer principal chain is described in Japanese Patent No. 3498381, JP-A-11-189621, JP-A-11-228631 and JP-A-2004-307524.

On the other hand, JP-A-62-174276, JP-A-1-259071, JP-A-2-173172 and JP-A-2-302477 propose a hardenable composition or a paint using an amine salt of sulfonic acid as a catalyst.

SUMMARY OF THE INVENTION

With respect to hardening, according to the technologies of Japanese Patent No. 3498381, JP-A-11-189621, JP-A-11-228631, JP-A-2004-307524 and JP-A-2003-26732, p-toluenesulfonic acid is used as the acid catalyst. Since though its hardening activity is high, a hardening reaction partially proceeds at the time of storage, the stability of a coating solution is insufficient so that the coating condition is restricted. Thus, it is desired that hardening activity and stability of the coating solution are made compatible with each other.

From the standpoint of improving the antifouling properties, the method of introducing silicon into the polymer principal chain as described in Japanese Patent No. 3498381, JP-A-11-189621, JP-A-11-228631 and JP-A-2004-307524 might weaken the film.

Also, there is no working example in which the technologies as described in JP-A-62-174276, JP-A-1-259071, JP-A-2-173172 and JP-A-2-302477 are applied to an antireflection film, and standards for selecting a base are not shown.

An object of the invention is to provide an antireflection film having excellent scar resistance and antifouling properties while making storage stability of a coating solution and hardening activity compatible with each other. In addition, another object of the invention is to provide a polarizing plate and an image display device using such an antireflection film.

In order to overcome the foregoing problems, the present inventors made extensive and intensive investigations. As a result, it has been found that the following constitutions can solve the foregoing problems to attain the foregoing objects, leading to accomplishment of the invention.

That is, the invention has attained the foregoing objects by the following constitutions.

(1) An antireflection film comprising a support and a low refractive index layer prepared by coating a coating composition containing the following components:

(A) a fluorine-containing polymer, a principal chain of which is made of only carbon atoms and which contains at least one fluorine-containing vinyl monomer polymerization unit and at least one hydroxyl group-containing vinyl monomer polymerization unit, wherein the content of the hydroxyl group-containing vinyl monomer polymerization unit exceeds 20% by mole, provided that the polymer does not have a polysiloxane structure in the principal chain;

(B) a crosslinking agent capable of reacting with a hydroxyl group; and (C) a compound containing two or more (meth)acryloyl groups in one molecule thereof.

(2) An antireflection film comprising a support and a low refractive index layer prepared by coating a coating composition containing the following components:

(A) a fluorine-containing polymer, a principal chain of which is made of only carbon atoms and which contains at least one fluorine-containing vinyl monomer polymerization unit and at least one hydroxyl group-containing vinyl monomer polymerization unit, wherein the content of the hydroxyl group-containing vinyl monomer polymerization unit exceeds 20% by mole, provided that the polymer does not have a polysiloxane structure in the principal chain;

(B) a crosslinking agent capable of reacting with a hydroxyl group; and (D) an organosilane compound or a composition containing at least one of a hydrolyzate of the organosilane compound and a partial condensate of the organosilane compound.

(3) An antireflection film comprising a support and a low refractive index layer prepared by coating a coating composition containing the following components:

(A) a fluorine-containing polymer, a principal chain of which is made of only carbon atoms and which contains at least one fluorine-containing vinyl monomer polymerization unit and at least one hydrokyl group-containing vinyl monomer polymerization unit, wherein the content of the hydroxyl group-containing vinyl monomer polymerization unit exceeds 20% by mole, provided that the polymer does not have a polysiloxane structure in the principal chain;

(B) a crosslinking agent capable of reacting with a hydroxyl group; and (E) an inorganic particle having a particle size of 1 nm or more and not more than 100 nm.

(4) The antireflection film as set forth above in (1) or (2), wherein the coating composition further contains (E) an inorganic particle having a particle size of 1 nm or more and not more than 100 nm.

(5) The antireflection film as set forth above in any one of (1) to (4), wherein the fluorine-containing polymer contains at least one polymerization unit having a graft site containing, in a side chain thereof, a polysiloxane repeating unit represented by the following formula (1).

Formula (1)

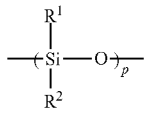

Formula (1)

In the formula (1), $R^1$ and $R^2$ may be the same or different and each represents an alkyl group or an aryl group; and p represents an integer of from 10 to 500.

(6) The antireflection film as set forth above in any one of (1) to (5), wherein the coating composition further contains (F) a polysiloxane compound having a hydroxyl group or a function group capable of reacting with a hydroxyl group to form binding.

(7) The antireflection film as set forth above in any one of (1) to (6), wherein the coating composition further contains at least one salt comprising an organic base having a pKa of from 5.0 to 10.5 in terms of a conjugated acid thereof and an acid.

(8) The antireflection film as set forth above in any one of (1) to (6), wherein the coating composition further contains at least one salt comprising a nitrogen-containing organic base having a boiling point of 35° C. or higher and not higher than 85° C. and an acid.

(9) The antireflection film as set forth above in any one of (3) to (8), wherein the inorganic particle is a hollow silica particle.

(10) The antireflection film as set forth above in any one of (1) to (9), which has at least one layer having a refractive index higher than that of the low refractive index layer between the support and the low refractive index layer, wherein the subject layer contains an organosilane compound or a composition containing at least one of a hydrolyzate of the organosilane compound and a partial condensate of the organosilane compound.

(11) A polarizing plate comprising the antireflection film as set forth above in any one of (1) to (10), wherein the antireflection film is provided as one of two protective films for a polarizing film in the polarizing plate.

(12) An image display device comprising the antireflection film as set forth above in any one of (1) to (10) or the polarizing plate as set forth above in (11), wherein the antireflection film or the polarizing plate is used for the outermost surface of a display.

Nevertheless the antireflection film of the invention has sufficient antireflection properties, it is excellent in both scar resistance and antifouling properties. Furthermore, since the antireflection film of the invention is produced by using a coating solution in which storage properties and hardening activity are made compatible with each other, it has high production adaptability. In addition, the image display device provided with the antireflection film of the invention and the image display device provided with the polarizing plate using the antireflection film of the invention are less in reflection by external light and reflection of the background and extremely high in visibility.

DETAILED DESCRIPTION OF THE INVENTION

Figure 1:
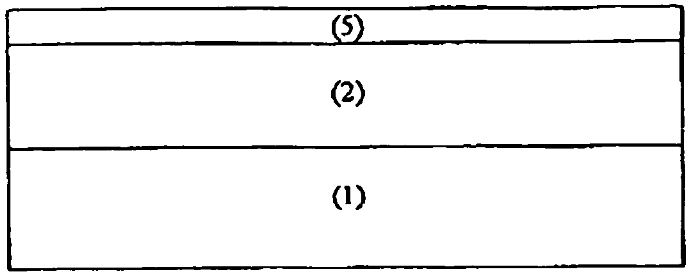
FIG. 1 is an outline cross-sectional view to schematically show a preferred embodiment of the film of the invention.

The invention will be hereunder described in more detail. Incidentally, in this specification, in the case where a numeral value exhibits a physical property value, a characteristic value or the like, the terms "from (numeral value 1) to (numeral value 2)" means "(numeral value 1) or more and not more than (numeral value 2)". Also, in this specification, the term "(meth)acrylate" means "at least one of acrylate and methacrylate". The same is also applicable to "(meth)acrylic acid" and so no.

1. Construction of the Antireflection Film of the Invention:

First of all, constructions such as various compounds which can be used in a support and constitutional layers constituting the antireflection film of the invention will be described.

1-(1) Binder Component to be Added as a Monomer:

The constitutional layers of the film of the invention can be formed by a crosslinking reaction or polymerization reaction of an ionizing radiation hardenable compound. That is, a binder layer can be formed by coating a coating composition containing an ionizing radiation hardenable polyfunctional monomer or polyfunctional oligomer on a transparent support and subjecting the polyfunctional monomer or polyfunctional oligomer to a crosslinking reaction or polymerization reaction. It is preferable that the binder component to be added as a monomer is contained in the coating composition for forming the hard coat layer and/or the low refractive index layer, which will be explained below, of the antireflection film of the invention.

As a functional group of the ionizing radiation hardenable polyfunctional monomer or polyfunctional oligomer, photopolymerizable functional groups, electron beam polymerizable functional groups, and radiation polymerizable functional groups are preferable, with the photopolymerizable functional being especially preferable.

Examples of the photopolymerizable functional group include unsaturated polymerizable functional groups such as a (meth)acryloyl group, a vinyl group, a styryl group, and an allyl group, with the (meth)acryloyl group being preferable. In particular, the following compounds containing two or more (meth)acryloyl groups in one molecule thereof can be used as the constitutional component (C) of the low refractive index layer in the invention.

Specific examples of the photopolymerizable polyfunctional monomer containing a photopolymerizable functional group which can be used include:

(meth)acrylic diesters of an alkylene glycol such as neopentyl glycol acrylate, 1,6-hexanediol (meth)acrylate, and propylene glycol di(meth)acrylate;

(meth)acrylic diesters of a polyoxyalkylene glycol such as triethylene glycol di(meth)acrylate, dipropylene glycol di(meth)arylate, polyethylene glycol di(meth)acrylate, and polypropylene glycol di(meth)acrylate;

(meth)acrylic diesters of a polyhydric alcohol such as pentaerythritol di(meth)acrylate; and (meth)acrylic diesters of an ethylene oxide or propylene oxide adduct such as 2,2-bis{4-(acryloxy.diethoxy)phenyl}propane and 2,2-bis{4-(acryloxy.polypropoxy)phenyl}propane.

In addition, epoxy (meth)acrylates, urethane (meth)acrylates, and polyester (meth)acrylates are also preferably used as the photopolymerizable polyfunctional monomer.

Above all, esters of a polyhydric alcohol and (meth)acrylic acid are preferable; and polyfunctional monomers containing three or more (meth)acryloyl groups in one molecule thereof are more preferable. Specific examples thereof include trimethylolpropane tri(meth)acrylate, trimethylolethane tri(meth)acrylate, 1,2,4-cyclohexane tetra-(meth)acrylate, pentaglycerol triacrylate, pentaerythritol tetra(meth)acrylate, pentaerythritol tri(meth)acrylate, (di)pentaertythritol triacrylate, (di)pentaerythritol pentaacrylate, (di)pentaerythritol tera(meth)acrylate, (di)pentaerythritol hexa(meth)acrylate, tripentaerythritol triacrylate, and tripentaerythritol hexatriacrylate. In this specification, the terms "(meth)acrylate", "(meth)acrylic acid" and "(meth)acryloyl" mean "acrylate or methacrylate", "acrylic acid or methacrylic acid" and "acryloyl or methacryloyl", respectively.

For the purpose of controlling the refractive index of each of the layers, monomers having a different refractive index in terms of a polymer thereof can be used as the monomer which is used as the binder. In particular, examples of a high refractive index monomer include bis(4-methacryloylthiophenyl) sulfide, vinylnaphthalene, vinylphenyl sulfide, and 4-methacryloxyphenyl-4'-methoxyphenyl thioether.

Dendrimers as described in, for example, JP-A-2005-76005 and JP-A-2005-36105 and norbornene ring-containing monomers as described in, for example, JP-2005-60425 can also be used.

The polyfunctional monomer may be used in combination of two or more kinds thereof.

The polymerization of such an ethylenically unsaturated group-containing monomer can be carried out upon irradiation with ionizing radiations or heating in the presence of a photo radical initiator or a heat radical initiator.

For the polymerization reaction of the photopolymerizable polyfunctional monomer, it is preferred to use a photopolymerization initiator. As the photopolymerization initiator, photo radical polymerization initiators and photo cationic polymerization initiators are preferable, with the photo radical polymerization initiators being especially preferable.

1-(2) Binder Component to be Added as a Polymer:

In the invention, a polymer or a crosslinked polymer can be used as the binder for the constitutional layers It is preferable that the crosslinked polymer contains an anionic group. The crosslinked anionic group-containing polymer has a structure in which the principal chain of an anionic group-containing polymer is crosslinked. It is preferable that the binder component to be added as a polymer is contained in the coating composition for forming the hard coat layer and/or the low refractive index layer, which will be explained below, of the antireflection film of the invention.

Examples of the principal chain of the polymer include polyolefins (saturated hydrocarbons), polyethers, polyurethanes, polyesters, polyamines, polyamides, and melamine resins. Above all, a polyolefin principal chain, a polyether principal chain and a polyurea principal chain are preferable; a polyolefin principal chain and a polyether principal chain are more preferable; and a polyolefin principal chain is the most preferable.

The polyolefin principal chain is composed of a saturated hydrocarbon. The polyolefin principal chain is obtained by, for example, an addition polymerization reaction of an unsaturated polymerizable group. In the polyether principal chain, a repeating unit thereof is bound via an ether bond (—O—). The polyether principal chain is obtained by, for example, a ring opening polymerization reaction of an epoxy group. In the polyurea principal chain, a repeating unit thereof is bound via a urea bond (—NH—CO—NH—). The polyurea principal chain is obtained by, for example, a condensation polymerization reaction between an isocyanate group and an amino group. In the polyurethane principal chain, a repeating unit thereof is bound via a urethane bond (—NH—CO—O—). The polyurethane principal chain is obtained by, for example, a condensation polymerization reaction between an isocyanate group and a hydroxyl group (including an N-methylol group). In the polyester principal chain, a repeating unit thereof is bound via an ester bond (—CO—O—). The polyester principal chain is obtained by, for example, a condensation polymerization reaction between a carboxyl group (including an acid halide group) and a hydroxyl group (including an N-methylol group). In the polyamine principal chain, a repeating unit thereof is bound via an imino bond (—NH—). The polyamine principal chain is obtained by, for example, a ring opening polymerization reaction of an ethyleneimine group. In the polyamide principal chain, a repeating unit thereof is bound via an amide bond (—NH—CO—). The polyamide principal chain is obtained by, for example, a reaction between an isocyanate group and a carboxyl group (including an acid halide group). The melamine resin principal chain is obtained by, for example, a condensation polymerization reaction between a triazine group (for example, melamine) and an aldehyde (for example, formaldehyde). Incidentally, in the melamine resin, the principal chain itself has a crosslinking structure.

The anionic group is bound directly to the polymer principal chain or bound to the principal chain via a connecting group. It is preferable that the anionic group is bound as a side chain to the principal chain via a connecting group.

Examples of the anionic group include a carboxylic acid group (carboxyl), a sulfonic acid group (sulfo), and a phosphoric acid group (phosphono), with the sulfonic acid group and the phosphoric acid group being preferable.

The anionic group may be in a salt state. A cation which forms a salt together with the anionic group is preferably an alkali metal ion. Furthermore, a proton of the anionic group may be dissociated.

It is preferable that the connecting group which binds the anionic group to the polymer principal chain is a divalent group selected from —CO—, —O—, an alkylene group, an arylene group, and combinations thereof.

The crosslinking structure undergoes chemical binding (preferably covalent binding) of two or more principal chains and preferably undergoes covalent binding of three or more principal chains. It is preferable that the crosslinking structure is composed of divalent or polyvalent groups selected from —CO—. —O—, —S—, a nitrogen atom, a phosphorus atom, an aliphatic residue, an aromatic residue, and combinations thereof It is preferable that the crosslinked anionic group-containing polymer is a copolymer containing an anionic group-containing repeating unit and a repeating unit having a crosslinking structure. A proportion of the anionic group-containing repeating unit in the copolymer is preferably from 2 to 96% by weight, more preferably from 4 to 94% by weight, and most preferably from 6 to 92% by weight. The repeating unit may contain two or more anionic groups. A proportion of the repeating unit having a crosslinking structure in the copolymer is preferably from 4 to 98% by weight, more preferably from 6 to 96% by weight, and most preferably from 8 to 94% by weight.

The repeating unit of the crosslinked anionic group-containing polymer may have both an anionic group and a crosslinking structure. Furthermore, other repeating unit (repeating unit having neither an anionic group nor a crosslinking structure) may be contained.

As other repeating unit, a repeating unit containing an amino group or a quaternary ammonium group and a repeating unit containing a benzene ring are preferable. The amino group or quaternary ammonium group has a function to hold a dispersed state of an inorganic particle similar to the anionic group. Incidentally, even when the amino group, the quaternary ammonium group or the benzene ring is contained in the anionic group-containing repeating unit or the repeating unit having a crosslinking structure, the same effect is obtainable.

In the repeating unit containing an amino group or a quaternary ammonium group, the amino group or the quaternary ammonium group is bound directly to the polymer principal chain or bound to the principal chain via a connecting group. It is preferable that the amino group or the quaternary ammonium group is bound as a side chain to the principal chain via a connecting group. The amino group or the quaternary ammonium group is preferably a secondary amino group, a tertiary amino group, or a quaternary ammonium group, and more preferably a tertiary amino group or a quaternary ammonium group. In the secondary amino group, tertiary amino group or quaternary ammonium group, a group which is bound to the nitrogen atom is preferably an alkyl group, more preferably an alkyl group having from 1 to 12 carbon atoms, and most preferably an alkyl group having from 1 to 6 carbon atoms. It is preferable that a counter ion of the quaternary ammonium group is a halide ion. It is preferable that the connecting group which binds the secondary amino group, tertiary amino group or quaternary ammonium group to the polymer principal chain is a divalent group selected from —CO—, —NH—, —O—, an alkylene group, an arylene group, and combinations thereof In the case where the crosslinked anionic group-containing polymer contains a repeating unit containing an amino group or a quaternary ammonium group, a proportion of the repeating unit is preferably from 0.06 to 32% by weight, more preferably from 0.08 to 30% by weight, and most preferably from 0.1 to 28% by weight.

1-(3) Fluorine-containing Polymer Binder [Constitutional Component (A) of Low Refractive Index Layer of the Invention]:

In the invention, in the low refractive index layer, there is used a polymer, a principal chain of which is made of only carbon atoms and which contains at least one fluorine-containing vinyl monomer polymerization unit and at least one hydroxyl group-containing vinyl monomer polymerization unit, wherein the content of the hydroxyl group-containing vinyl monomer polymerization unit exceeds 20% by mole, provided that the polymer does not have a polysiloxane structure in the principal chain.

(Fluorine-containing Vinyl Monomer Polymerization Unit)

In the invention, a structure of the fluorine-containing vinyl monomer polymerization unit which is contained in the fluorine-containing polymer to be used for forming a low refractive index layer is not particularly limited, and examples thereof include polymerization units based on a fluorine-containing olefin, a perfluoroalkyl vinyl ether, a fluorine-containing alkyl group-containing vinyl ether or (meth)acrylate, and so on. In view of production adaptability and properties which are required in the low refractive index layer, such as refractive index and film strength, the fluorine-containing polymer is preferably a copolymer of a fluorine-containing olefin and a vinyl ether, and more preferably a copolymer of a perfluoroolefin and a vinyl ether. Furthermore, a perfluoroalkyl vinyl ether, a fluorine-containing alkyl group-containing vinyl ether or (meth)acrylate, or the like may be contained as a copolymerization component for the purpose of lowering the refractive index.

As the perfluoroolefin, ones having from 3 to 7 carbon atoms are preferable; perfluoropropylene and perfluorobutylene are preferable from the viewpoint of polymerization reactivity; and perfluoropropylene is especially preferable from the viewpoint of easiness of availability.

The content of the perfluoroolefin in the polymer is from 25 to 75% by mole. In order to realize a low refractive index of the material, though it is desired to increase a rate of introduction of the perfluoroolefin, the introduction of from about 50 to 70% by mole is a limit in a general solution based radical polymerization reaction from the standpoint of polymerization reactivity, and the introduction exceeding the foregoing range is difficult. In the invention, the subject content is preferably from 30% to 70% by mole, more preferably from 30% to 60% by mole, further preferably from 35% to 60% by mole, and especially preferably from 40 to 60% by mole.

Furthermore, in the fluorine-containing polymer used in the invention, in order to realize a low refractive index, a fluorine-containing vinyl ether represented by the following M1 may be copolymerized. The subject copolymerization component may be introduced into the polymer in the range of from 0 to 40% by mole, preferably from 0 to 30% by mole, and especially preferably from 0 to 20% by mole.

M1

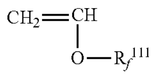

In M1, $Rf^{111}$ represents a fluorine-containing alkyl group having from 1 to 30 carbon atoms, preferably a fluorine-containing alkyl group having from 1 to 20 carbon atoms, and especially preferably a fluorine-containing alkyl group having from 1 to 15 carbon atoms; may be linear {for example, $—CF_2CF_3$, $—CH_2(CF_2)_aH$, and $—CH_2CH_2(CF_2)_aF$ (a: an integer of from 2 to 12)}; may have a branched structure {for example, $—CH(CF_3)_2$, $—CH_2CF(CF_3)_2$, $—CH(CH_3)CF_2CF_3$, and $—CH(CH_3)(CF_2)_5CF_2H$}; may have an alicyclic structure (preferably a 5-membered ring or a 6-membered ring, for example, a perfluorocyclohexyl group, a perfluorocyclopentyl group, and an alkyl group substituted with such a group); and may contain an ether bond {for example, $—CH_2OCH_2CF_2CF_3$, $—CH_2CH_2OCH_2(CF_2)_bH$, $—CH_2CH_2OCH_2(CF_2)_bF$ (b: an integer of from 2 to 12), and $—CH_2CH_2OCF_2CF_2OCF_2CF_2H$}. Incidentally, it should not be construed that the substituent represented by $Rf^{111}$ is limited to the substituents as enumerated herein.

The foregoing monomer represented by M1 can be, for example, synthesized by a method of making a fluorine-containing alcohol act to a split-off group-substituted alkyl vinyl ether such as vinyloxyalkyl sulfonates and vinyloxyalkyl chlorides in the presence of a base catalyst as described in *Macromolecules*, Vol. 32 (21), p. 7122 (1999), JP-A-2-721, and so on; a method of mixing a fluorine-containing alcohol and a vinyl ether such as butyl vinyl ether in the presence of a palladium catalyst, thereby undergoing exchange of the vinyl group as described in WO 92/05135; and a method of making a fluorine-containing ketone and dibromoethane react with each other in the presence of a potassium fluoride catalyst and then undergoing a dehydrobrimination reaction by an alkaline catalyst as described in U.S. Pat. No. 3,420,793.

Preferred examples of the constitutional component represented by M1 will be given below, but it should not be construed that the invention is limited thereto.

M1-(1)

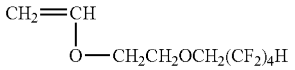

M1-(2)

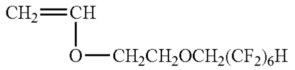

M1-(3)

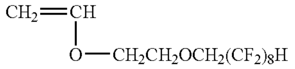

M1-(4)

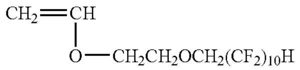

M1-(5)

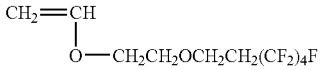

M1-(6)

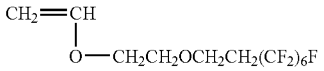

M1-(7)

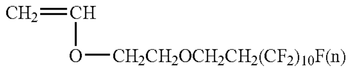

M1-(8)

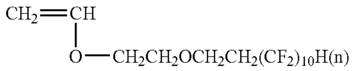

M1-(9)

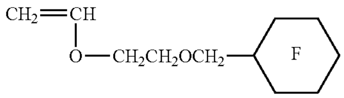

M1-(10)

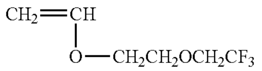

M1-(11)

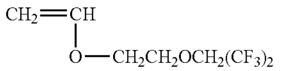

M1-(12)

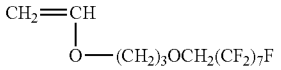

M1-(13)

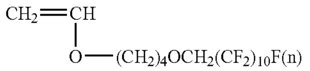

-continued

M1-(14)

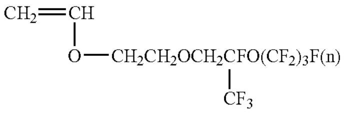

M1-(15)

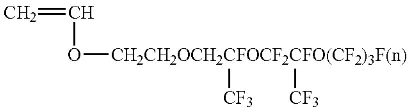

M1-(16)

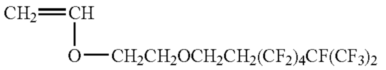

M1-(17)

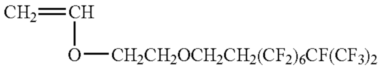

M1-(18)

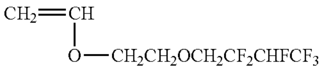

M1-(19)

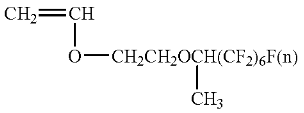

M1-(20)

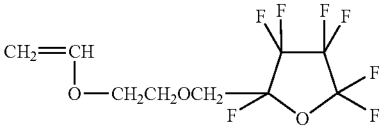

M1-(21)

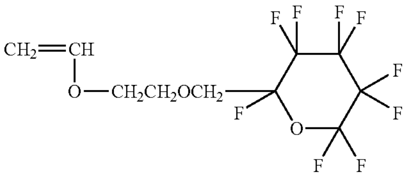

M1-(22)

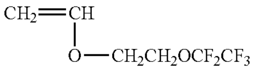

M1-(23)

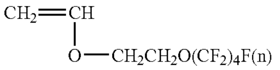

M1-(24)

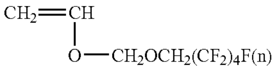

M1-(25)

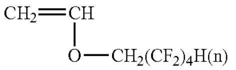

M-(26)

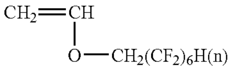

M1-(27)

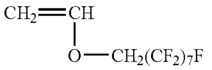

M1-(28)

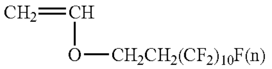

M1-(29)

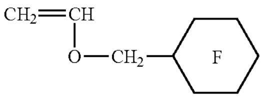

-continued

M1-(30)

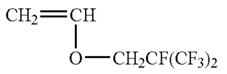

M1-(31)

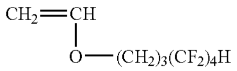

M1-(32)

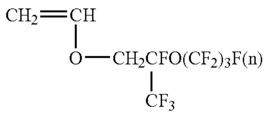

M1-(33)

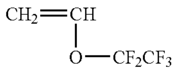

M1-(34)

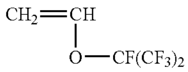

M1-(35)

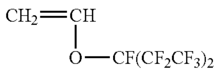

M1-(36)

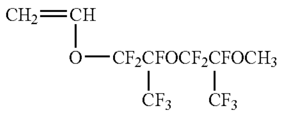

M1-(37)

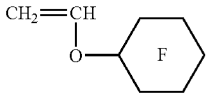

M1-(38)

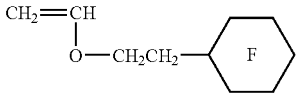

M1-(39)

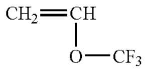

M1-(40)

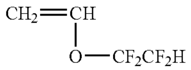

M1-(41)

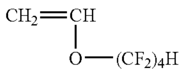

M1-(42)

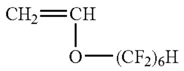

In the fluorine-containing polymer used in the invention, in order to realize a low refractive index, a perfluorovinyl ether represented by the following M2 may be copolymerized. The subject copolymerization component may be introduced into the polymer in the range of from 0 to 40% by mole, preferably from 0 to 30% by mole, and especially preferably from 0 to 20% by mole.

M2

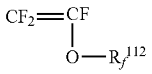

In M2, $Rf^{112}$ represents a fluorine-containing alkyl group having from 1 to 30 carbon atoms, preferably a fluorine-containing alkyl group having from 1 to 20 carbon atoms, especially preferably a fluorine-containing alkyl group having from 1 to 10 carbon atoms, and further preferably a perfluoroalkyl group having from 1 to 10 carbon atoms. Furthermore, the subject fluorine-containing alkyl group may have a substituent. Specific examples of $Rf^{112}$ include $—CF_3$ {M2-(1)}, $—CF_2CF_3$ {M2-(2)}, $—CF_2CF_2CF_3$ {M2-(3)}, and $—CF_2CF(OCF_2CF_2CF_3)CF_3$ {M3-(4)}.

(Hydroxyl Group-containing Vinyl Monomer Polymerization Unit)

It is required that the fluorine-containing polymer which is used in the invention contains a hydroxyl group-containing vinyl monomer polymerization unit, the content of which is more than 20% by mole in the polymer. Since the hydroxyl group has a function such that it is hardened upon reaction with a crosslinking agent, what the content of the hydroxyl group is high is preferable because a hard film can be formed. Its content is preferably more than 20% by mole and not more than 70% by mole, more preferably more than 20% by mole and not more than 60% by mole, and further preferably 25% by mole or more and not more than 55% by mole.

So far as the hydroxyl group-containing vinyl monomer is copolymerizable with the foregoing fluorine-containing vinyl monomer polymerization unit, it can be used without particular limitations, and examples thereof include vinyl ethers, (meth)acrylates, and styrenes. For example, in the case where a perfluoroolefin (for example, hexafluoropropylene) is used as the fluorine-containing vinyl monomer, it is preferred to use a hydroxyl group-containing vinyl ether with good copolymerizability. Specific examples thereof include 2-hydroxyethyl vinyl ether, 4-hydroxybutyl vinyl ether, 6-hydroxyhexyl vinyl ether, 8-hydroxyoctyl vinyl ether, diethylene glycol vinyl ether, triethylene glycol vinyl ether, and 4-(hydroxymethyl)cyclohexylmethyl vinyl ether. But, it should not be construed that the invention is limited thereto.

(Constitutional Unit Having a Polysiloxane Structure)

In order to impart antifouling properties, it is also preferable that the fluorine-containing polymer used in the invention contains a constitutional unit having a polysiloxane structure. As the fluorine-containing polymer having a polysiloxane structure which is useful in the invention, there is enumerated a fluorine-containing polymer which contains (a) at least one fluorine-containing vinyl monomer polymerization unit, (b) at least one hydroxyl group-containing vinyl monomer polymerization unit and (c) at least one polymerization unit having a graft site containing, in a side chain thereof, a polysiloxane repeating unit represented by the following formula (1), and in which a principal chain thereof is made of only carbon atoms.

Formula (1)

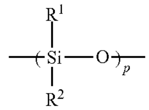

In the formula (1), $R^1$ and $R^2$ may be the same or different and each represents an alkyl group or an aryl group. The alkyl group preferably has from 1 to 4 carbon atoms, and examples thereof include a methyl group, a trifluoromethyl group, and an ethyl group. The aryl group preferably has from 6 to 20 carbon atoms, and examples thereof include a phenyl group and a naphthyl group. Of these, a methyl group and a phenyl group are preferable; and a methyl group is especially preferable. p represents an integer of from 10 to 500, preferably from 10 to 350, and especially preferably from 10 to 250.

The polymer having a polysiloxane structure represented by the formula (1) in a side chain thereof can be synthesized by a method in which with respect to a polymer containing a reactive group (for example, an epoxy group, a hydroxyl group, a carboxyl group, and an acid anhydride group), a polysiloxane containing a corresponding reactive group (for example, an amino group, a mercapto group, a carboxyl group, and a hydroxyl group with respect to the epoxy group or acid anhydride group) at one terminal thereof (for example, SILAPLANE Series (manufactured by Chisso Corporation) is introduced by a polymerization reaction as described in, for example, *J. Appl. Polym. Sci.,* 78, 1955 (2000) and JP-A-56-28219; and a method of polymerizing a polysiloxane-containing silicon macromer, and the both methods can be preferably employed. In the invention, a method for achieving the introduction by polymerizing a silicon macromer is more preferable.

As the silicon macromer, any silicon macromer containing a polymerizable group which is able to undergo copolymerization with a fluorine-containing olefin is useful. Structures represented by any one of the following formulae (2) to (5) are preferable.

Formula (2)

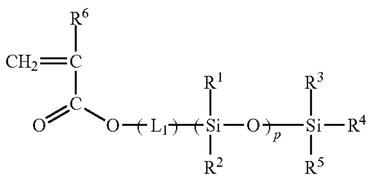

Formula (3)

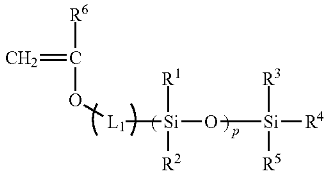

Formula (4)

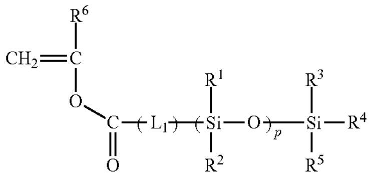

-continued

Formula (5)

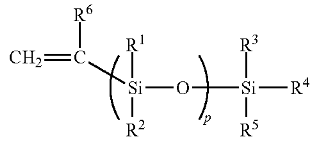

In the formulae (2) to (5), $R^1$, $R^2$ and p have the same meanings as in the formula (1); and preferred ranges thereof are also the same. $R^3$ to $R^5$ each independently represents a substituted or unsubstituted monovalent organic group or a hydrogen atom. Above all, an alkyl group having from 1 to 10 carbon atoms (for example, a methyl group, an ethyl group, and an octyl group), an alkoxy group having from 1 to 10 carbon atoms (for example, a methoxy group, an ethoxy group, and a propyloxy group), and an aryl group having from 6 to 20 carbon atoms (for example, a phenyl group and a naphthyl group) are preferable; and an alkyl group having from 1 to 5 carbon atoms is especially preferable. $R^6$ represents a hydrogen atom or a methyl group. $L_1$ represents an arbitrary connecting group having from 1 to 20 carbon atoms; and examples thereof include a substituted or unsubstituted, linear branched or alicyclic alkylene group and a substituted or unsubstituted arylene group. Above all, an unsubstituted linear alkylene group having from 1 to 20 carbon atoms is preferable; and an ethylene group and a propylene group are especially preferable. These compounds can be synthesized by a method as described in, for example, JP-A-6-322053.

All of the compounds represented by the formulae (2) to (5) can be preferably used in the invention. Above all, compounds having a structure represented by the formula (2), (3) or (4) are especially preferable from the viewpoint of copolymerizability with a fluorine-containing olefin. The foregoing polysiloxane site preferably accounts for from 0.01 to 20% by weight, more preferably from 0.05 to 15% by weight, and especially preferably from 0.5 to 10% by weight in the graft copolymer.

The amount of the polysiloxane structure-containing constitutional unit to the molecular weight of the whole of the fluorine-containing polymer of the invention is preferably from 0.01 to 2% by mole, more preferably from 0.01 to 1% by mole, further more preferably from 0.01 to 2% by mole, and especially preferably from 0.05 to 2% by mole.

Preferred examples of the polymerization unit of the polymer graft site containing a polysiloxane site in a side chain thereof which is useful in the invention will be given below, but it should not be construed that the invention is limited thereto.

S-(1)

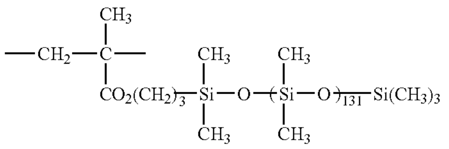

S-(2)

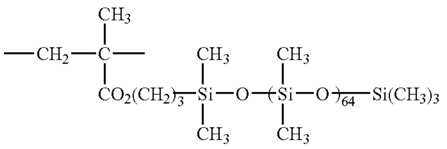

S-(3)

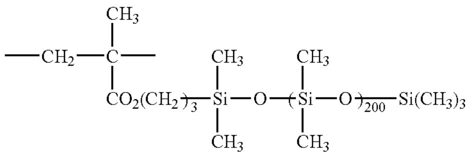

S-(4)

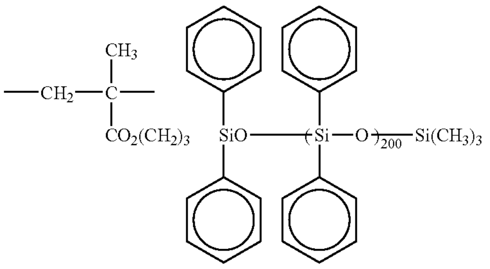

-continued
S-(5)
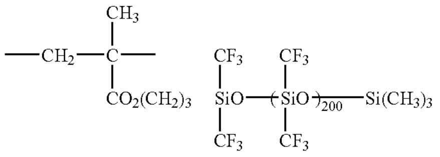
S-(6)
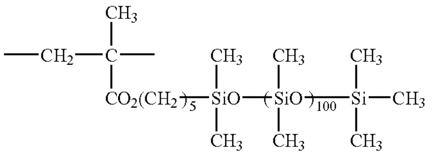
S-(7)
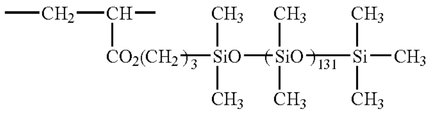
S-(8)
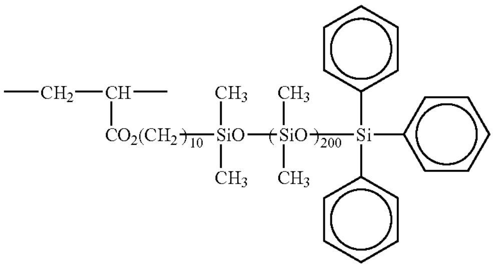
S-(9)
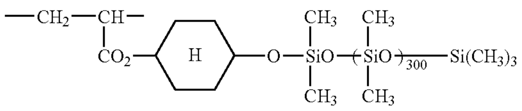
S-(10)
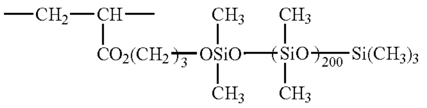
S-(11)
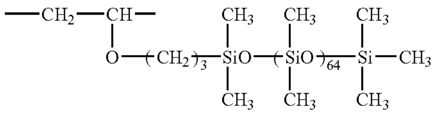
S-(12)
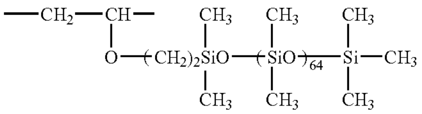
S-(13)
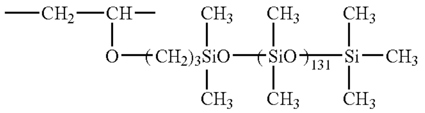
S-(14)
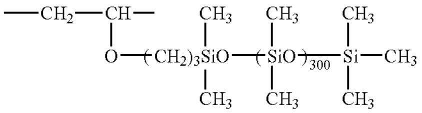
S-(15)
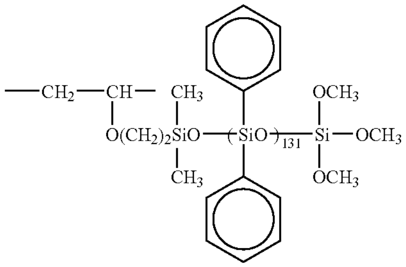
S-(16)
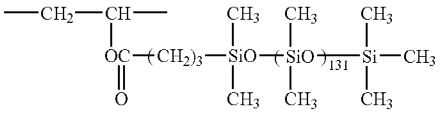
S-(17)
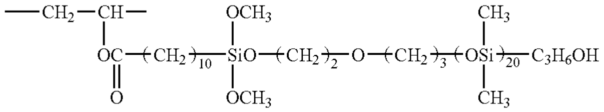
S-(18)
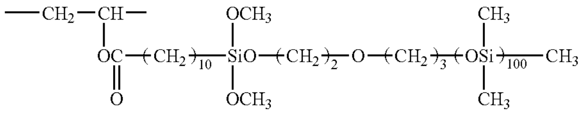
S-(19)
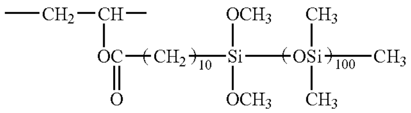
S-(20)
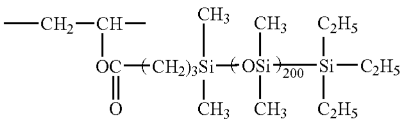
S-(21)
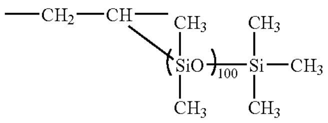
S-(22)
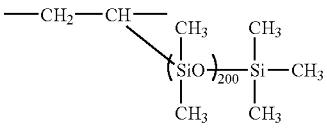

-continued
S-(23)
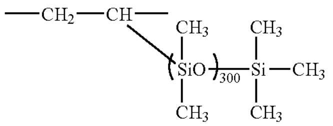
S-(24)
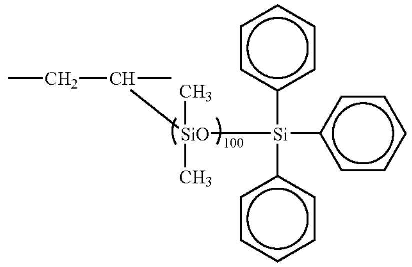
S-(25)
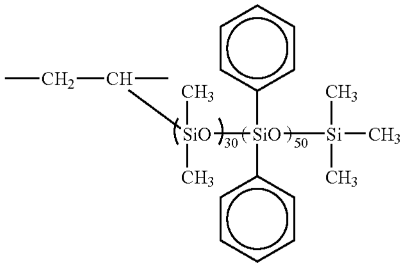
S-(26)
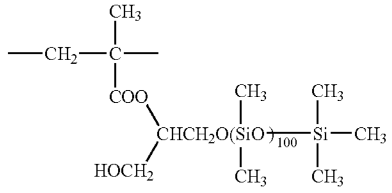
S-(27)
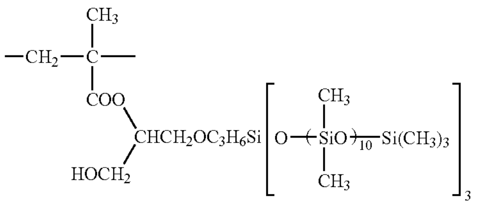
S-(28)
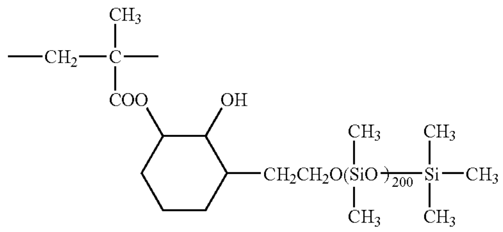
S-(29)
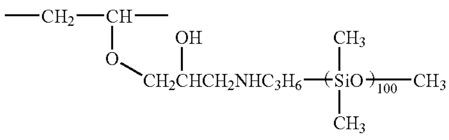
S-(30)
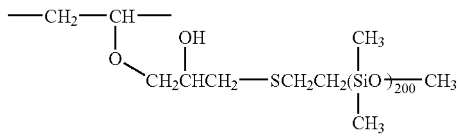
S-(31)
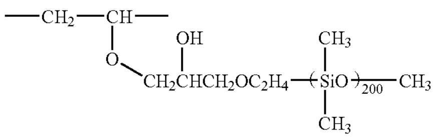
S-(32)
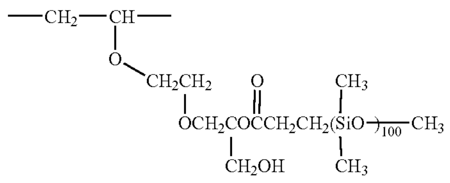
S-(33)
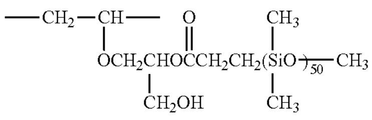
S-(34)
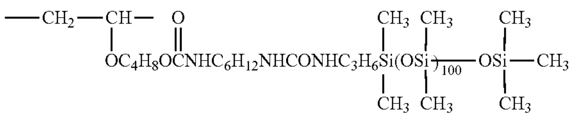
S-(35)
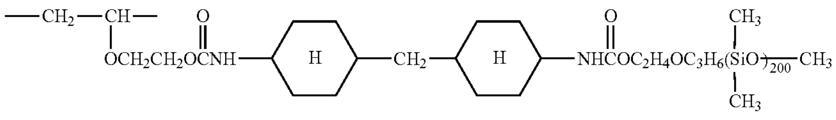

-continued

S-(36) SILAPLANE FM-0711

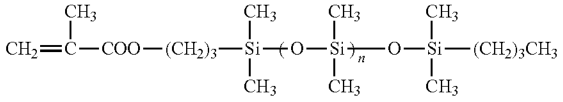

number average molecular weight: 1000
(manufactured by Chisso Corporation)

S-(37) SILAPLANE FM-0721

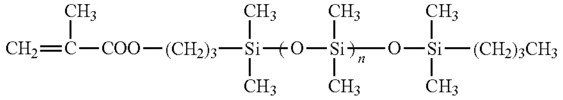

number average molecular weight: 6000
(manufactured by Chisso Corporation)

By introducing the polysiloxane structure, not only antifouling properties and dust removal properties are imparted to the film, but also slipperiness is imparted to the film surface. Also, such is advantageous with respect to the scar resistance.

(Other Polymerization Units)

Other copolymerization components capable of forming the polymerization unit can be properly selected from various viewpoints of, for example, hardness, adhesiveness to a substrate, solubility in a solvent, and transparency. Examples thereof include vinyl ethers such as methyl vinyl ether, ethyl vinyl ether, t-butyl vinyl ether, n-butyl vinyl ether, cyclohexyl vinyl ether, and isopropyl vinyl ether; and vinyl esters such as vinyl acetate, vinyl propionate, vinyl butyrate, and vinyl cyclohexanecarboxylate. The amount of introduction of such a copolymerization component is in the range of from 0 to 40% by mole, preferably from 0 to 30% by mole, and especially preferably from 0 to 20% by mole.

(Configuration of Preferred Fluorine-containing Polymer)

A configuration of the polymer which is especially preferable in the invention is a configuration represented by the following formula (7).

Formula (7)

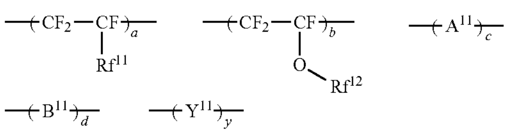

In the formula (7), $Rf^{11}$ represents a perfluoroalkyl group having from 1 to 5 carbon atoms. With respect to the site represented by $—CF_2CF(Rf^{11})$, the foregoing explanation regarding the perfluoroolefin as an example is applicable. In the formula (7), $Rf^{12}$ is the same as defined above for the fluorine-containing vinyl ether ($Rf^{112}$ in the compound represented by the foregoing formula M2); and a preferred range thereof is also the same. $A^{11}$ and $B^{11}$ each represents a hydroxyl group-containing vinyl monomer polymerization unit or an arbitrary constitutional unit. $A^{11}$ is the same as defined above for the hydroxyl group-containing vinyl monomer polymerization unit. Though $B^{11}$ is not particularly limited, it is preferably a vinyl ether or a vinyl ester from the viewpoint of copolymerizability. Concretely, there are enumerated the foregoing enumerated monomers (other polymerization units) and the monomers represented by the foregoing formula M1.

$Y^{11}$ represents a constitutional unit having a polysiloxane structure; and its configuration may be a polymerization unit having a graft site containing, in a side chain thereof, a polysiloxane repeating unit represented by the foregoing formula (1). Its definition and preferred range are the same as described above (the constitutional unit having a polysiloxane structure).

a to d each represents a molar fraction (%) of each of the constitutional components; and (a+b+c+d) is equal to 100. There are satisfied the relationships: $30 \leqq a \leqq 70$ (more preferably $30 \leqq a \leqq 60$, and further preferably $35 \leqq a \leqq 60$), $0 \leqq b \leqq 40$ (more preferably $0 \leqq b \leqq 30$, and further preferably $0 \leqq b \leqq 20$), $20 \leqq c \leqq 70$ (more preferably $20 \leqq c \leqq 60$, and further preferably $25 \leqq c \leqq 55$), and $0 \leqq d \leqq 40$ (more preferably $0 \leqq d \leqq 30$).

y represents a weight fraction (%) of the polysiloxane-containing constitutional unit against the molecular weight of the whole of the fluorine-containing polymer. There is satisfied the relationship: $0.01 \leqq y \leqq 20$ (more preferably $0.05 \leqq y \leqq 15$, and further preferably $0.5 \leqq y \leqq 10$).

In the invention, a number average molecular weight of the fluorine-containing polymer (preferably, the fluorine-containing polymer represented by the formula (7) shown above) which is used for forming a low refractive index layer is preferably from 5,000 to 1,000,000, more preferably from 8,000 to 500,000, and especially preferably from 10,000 to 100,000.

Here, the number average molecular weight is a molecular weight as reduced into polystyrene by means of detection with a differential refractometer in THF as a solvent by a GPC analyzer using columns of TSKgel GMHxL, TSKgel G4000HxL and TSKgel G2000HxL (all of which are a trade name of Tosoh Corporation).

One of the polymer particularly preferred in the present invention has the structure represented by the following formula 8.

Formula 8:

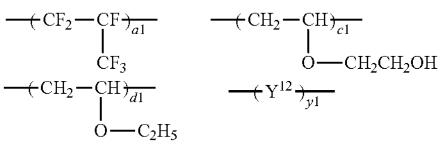

In the foregoing formula 8, a1, c1 and d1 each represent the molar fraction (%) of each component, and a1+b1+c1=100. Each preferably satisfies the following relations, respectively: $30 \leqq a1 \leqq 70$ (more preferably $30 \leqq a \leqq 60$, still more preferably $35 \leqq a1 \leqq 60$, and most preferably $40 \leqq a1 \leqq 55$);

$20 \leqq c1 \leqq 50$ (more preferably $20 \leqq c1 \leqq 45$, still more preferably $25 \leqq c1 \leqq 40$, and most preferably $30 \leqq c1 \leqq 40$); and $0 \leqq d1 \leqq 30$ (more preferably $5 \leqq d1 \leqq 30$, still more preferably $10 \leqq d1 \leqq 25$, and most preferably $10 \leqq d1 \leqq 20$).

In the foregoing formula 8, $Y^{12}$ represents a structural unit having the polysiloxane structure represented by the foregoing formula 2, and preferably has a number average molecular weight of 1000 to 40000, more preferably 3000 to 20000, and still more preferably 5000 to 15000. As preferable specific examples for $Y^{12}$, S-(1), S-(2), S-(7), S-(37) or S-(38) can be mentioned. Among them, S-(1), S-(2), S-(37) or S-(38) are more preferred, and S-(2), S-(37) or S-(38) are still more preferred.

y1 represents the mass fraction (%) of the polysiloxane-containing constituent unit to the entire molecular weight of the fluorine-containing polymer, and satisfies the relation; $0.01 \leqq y1 \leqq 20$ (more preferably $1 \leqq y1 \leqq 15$, still more preferably $2 \leqq y1 \leqq 10$ and most preferably $3 \leqq y1 \leqq 7$).

The number average molecular weight of the fluorine-containing polymer represented by the foregoing formula 8 is preferably 5,000 to 500,000, more preferably 6,000 to 100,000 and particularly preferably 7,000 to 50,000. As a reminder, this number average molecular weight is the same as those represented in terms of polystyrene-converted value as stated previously.

In Tables 1 to 5, specific examples for the fluorine-containing polymer in the present invention are shown. But the present invention should not be construed as the polymer therein being limited thereto. Tables 1 to 5 show the combinations of polymerization unit in the fluorine-containing polymer.

TABLE 1

| | Fluorine-containing polymer | | | | | | | | | | | |
|---|---|---|---|---|---|---|---|---|---|---|---|---|
| | P1 | P2 | P3 | P4 | P5 | P6 | P7 | P8 | P9 | P10 | P11 | P12 |
| Fluorine-containing polymer constitutional component (molar fraction (%)) | | | | | | | | | | | | |
| Hexafluoro-propylene | 50 | 50 | 50 | 50 | 50 | 50 | 50 | 50 | 50 | 50 | 50 | 50 |
| M1-(2) | | | | | | | | | | | | |
| M1-(6) | | | | | | | | | | | | |
| M2-3 | | | | | | | | | | | | |
| HEVE | 50 | 50 | 50 | 50 | 50 | 50 | 50 | 50 | 50 | 50 | 50 | 50 |
| HBVE | | | | | | | | | | | | |
| HOVE | | | | | | | | | | | | |
| DEGVE | | | | | | | | | | | | |
| HMcHVE | | | | | | | | | | | | |
| EVE | | | | | | | | | | | | |
| cHVE | | | | | | | | | | | | |
| tBuVE | | | | | | | | | | | | |
| VAc | | | | | | | | | | | | |
| Silicone-containing constitutional component (% by weight) | | | | | | | | | | | | |
| S-(1) | | 2 | | | | | | | | | | |
| S-(2) | | | 2.1 | | | | | | | | | |
| S-(11) | | | | 2 | | | | | | | | |
| S-(13) | | | | | 2 | | | | | | | |
| S-(16) | | | | | | 1.8 | | | | | | |
| S-(21) | | | | | | | 2 | | | | | |
| S-(29) | | | | | | | | 2 | | | | |
| S-(30) | | | | | | | | | 1.7 | | | |
| S-(36) | | | | | | | | | | 2.1 | | |
| S-(37) | | | | | | | | | | | 2.5 | |
| S-(38) | | | | | | | | | | | | 1.7 |
| Molecular weight (×10,000) | 1.5 | 1.7 | 2.2 | 2.6 | 1.9 | 2.4 | 2.9 | 3.5 | 4.1 | 2.5 | 2.2 | 1.7 |

TABLE 2

| | Fluorine-containing polymer | | | | | | | | | | | |
|---|---|---|---|---|---|---|---|---|---|---|---|---|
| | P13 | P14 | P15 | P16 | P17 | P18 | P19 | P20 | P21 | P22 | P23 | P24 |
| Fluorine-containing polymer constitutional component (molar fraction (%)) | | | | | | | | | | | | |
| Hexafluoro-propylene | 50 | 50 | 50 | 50 | 50 | 50 | 50 | 50 | 45 | 50 | 50 | 40 |
| M1-(2) | | | | | | | 10 | | | | | |
| M1-(6) | | | | | | | | 10 | | | | |
| M2-3 | | | | | | | | | 5 | | | 10 |
| HEVE | 40 | 40 | 40 | 40 | 40 | 40 | 40 | 40 | 40 | 30 | 20 | 25 |
| HBVE | | | | | | | | | | | | |
| HOVE | | | | | | | | | | | | |
| DEGVE | | | | | | | | | | | | |
| HMcHVE | | | | | | | | | | | | |
| EVE | 10 | 10 | 10 | 10 | 10 | 10 | | | | | 30 | 25 |
| cHVE | | | | | | | | | 10 | | | |
| tBuVE | | | | | | | | | | 20 | | |
| VAc | | | | | | | | | | | | |

TABLE 2-continued

| | Fluorine-containing polymer | | | | | | | | | | | |
|---|---|---|---|---|---|---|---|---|---|---|---|---|
| | P13 | P14 | P15 | P16 | P17 | P18 | P19 | P20 | P21 | P22 | P23 | P24 |
| Silicone-containing constitutional component (% by weight) | | | | | | | | | | | | |
| S-(1) | | 2.5 | | | | | | | | | 1.8 | |
| S-(2) | | | | | | | | | | | | |
| S-(11) | | | 2.3 | | | | | | 1.9 | | | |
| S-(13) | | | | | | | | | | | | |
| S-(16) | | | | | | | | | | | | |
| S-(30) | | | | 2.5 | | | | | | | | |
| S-(36) | | | | | | | | | | | | |
| S-(37) | | | | | 6.6 | | | | | 4.2 | | 1.7 |
| S-(38) | | | | | | | | | | | | |
| Molecular weight (×10,000) | 1.5 | 1.7 | 2.1 | 4.5 | 2.8 | 2.5 | 1.6 | 3.1 | 2.5 | 3.1 | 1.9 | 4.1 |

TABLE 3

| | Fluorine-containing polymer | | | | | | | | | | | |
|---|---|---|---|---|---|---|---|---|---|---|---|---|
| | P25 | P26 | P27 | P28 | P29 | P30 | P31 | P32 | P33 | P34 | P35 | P36 |
| Fluorine-containing polymer constitutional component (molar fraction (%)) | | | | | | | | | | | | |
| Hexafluoro-propylene | 50 | 50 | 50 | 50 | 40 | 50 | 50 | 45 | 50 | 50 | 50 | 50 |
| M1-(2) | | | 10 | | | | | | | | | 5 |
| M1-(6) | | | | 5 | | | | | | 10 | | |
| M2-3 | | | | | 10 | | | 5 | | | | |
| HEVE | | | | | | | | | | | | |
| HBVE | 40 | 30 | 40 | 20 | 50 | | | | | | | |
| HOVE | | | | | | 40 | 25 | 50 | | | | |
| DEGVE | | | | | | | | | 40 | 40 | | |
| HMcHVE | | | | | | | | | | | 15 | 40 |
| EVE | 10 | 20 | | | | | 25 | | 10 | | 35 | |
| cHVE | | | | | | 10 | | | | | | |
| tBuVE | | | | | | | | | | | | |
| VAc | | | | 25 | | | | | | | | 5 |
| Silicone-containing constitutional component (% by weight) | | | | | | | | | | | | |
| S-(1) | | | | | | | | 2.9 | | | | |
| S-(2) | 3.1 | | | | | | | | | 1.3 | | |
| S-(11) | | | 1.9 | | | | | | | | | |
| S-(13) | | | | | | 1.9 | | | | | | |
| S-(30) | | | | 3.1 | | | | | | | | |
| S-(36) | | | | | | | 3.2 | | | | | |
| S-(37) | | | | | 3.1 | | | | | | 3.1 | |
| S-(38) | | 2.8 | | | | | | | 1.9 | | | 3.4 |
| Molecular weight (×10,000) | 3.1 | 2.9 | 1.9 | 2.6 | 4.2 | 2.3 | 3.1 | 3.4 | 2.4 | 2.7 | 2.4 | 3.1 |

TABLE 4

| | Fluorine-containing polymer | | | | | | | | | | | |
|---|---|---|---|---|---|---|---|---|---|---|---|---|
| | P37 | P38 | P39 | P40 | P41 | P42 | P43 | P44 | P45 | P46 | P47 | P48 |
| Fluorine-containing polymer constitutional component (molar fraction (%)) | | | | | | | | | | | | |
| Hexafluoro-propylene | 50 | 50 | 50 | 45 | 45 | 45 | 50 | 45 | 50 | 45 | 45 | 45 |
| M1-(2) | | | | | | | | | | | | |
| M1-(6) | | | | | | | | | | | | |
| M2-3 | | | | 5 | 5 | 5 | | | | 5 | 5 | 5 |
| HEVE | 30 | 30 | 30 | 30 | 30 | 30 | 25 | 25 | 25 | 25 | 25 | 25 |
| HBVE | | | | | | | | | | | | |
| HOVE | | | | | | | | | | | | |
| DEGVE | | | | | | | | | | | | |
| HMcHVE | | | | | | | | | | | | |
| EVE | 20 | 20 | 20 | 20 | 20 | 20 | 25 | 25 | 25 | 25 | 25 | 25 |
| cHVE | | | | | | | | | | | | |
| tBuVE | | | | | | | | | | | | |
| VAc | | | | | | | | | | | | |
| Silicone-containing constitutional component (% by weight) | | | | | | | | | | | | |
| S-(1) | | | | | | | | | | | | |

TABLE 4-continued

| | Fluorine-containing polymer | | | | | | | | | | | |
|---|---|---|---|---|---|---|---|---|---|---|---|---|
| | P37 | P38 | P39 | P40 | P41 | P42 | P43 | P44 | P45 | P46 | P47 | P48 |
| S-(2) | | | | | | | | | | | | |
| S-(11) | | | | | | | | | | | | |
| S-(13) | | | | | | | | | | | | |
| S-(30) | | | | | | | | | | | | |
| S-(36) | | | | | | | | | | | | |
| S-(37) | | 3.8 | | | 3.8 | | | 3.8 | | | 3.8 | |
| S-(38) | | | 3.8 | | | 3.8 | | | 3.8 | | | 3.8 |
| Molecular weight (×10,000) | 2.4 | 2.6 | 2.6 | 2.8 | 2.9 | 2.9 | 2.6 | 2.6 | 2.7 | 2.6 | 2.7 | 2.7 |

TABLE 5

| | Fluorine-containing polymer | | | | | | | | | | |
|---|---|---|---|---|---|---|---|---|---|---|---|
| | P49 | P50 | P51 | P52 | P53 | P54 | P55 | P56 | P57 | P58 | P59 |
| Hexafluoro-propylene | 50 | 50 | 50 | 50 | 50 | 50 | 50 | 50 | 50 | 50 | 50 |
| M1-(2) | | | | | | | | | | | |
| M1-(6) | | | | | | | | | | | |
| M2-3 | | | | | | | | | | | |
| HEVE | 30 | 30 | 30 | 32 | 32 | 35 | 35 | 35 | 40 | 40 | 40 |
| HBVE | | | | | | | | | | | |
| HOVE | | | | | | | | | | | |
| DEGVE | | | | | | | | | | | |
| HMcHVE | | | | | | | | | | | |
| EVE | 20 | 20 | 20 | 18 | 18 | 15 | 15 | 15 | 10 | 10 | 10 |
| cHVE | | | | | | | | | | | |
| tBuVE | | | | | | | | | | | |
| VAc | | | | | | | | | | | |
| S-(1) | | | | | | | | | | | |
| S-(2) | | | | | | | | | | | |
| S-(11) | | | | | | | | | | | |
| S-(13) | | | | | | | | | | | |
| S-(30) | | | | | | | | | | | |
| S-(36) | | | | | | | | | | | |
| S-(37) | 5.9 | | 5.2 | 5.8 | | 6.0 | 5.0 | | 5.8 | 4.9 | |
| S-(38) | | 4.8 | | | 5.5 | | | 5.2 | | | 4.5 |
| Molecular weight (×10,000) | 1.1 | 1.3 | 1.2 | 1.0 | 1.3 | 0.9 | 0.8 | 1.4 | 1.0 | 1.1 | 1.5 |

The fluorine-containing polymer shown in the foregoing Tables 1 to 5 for use in the present invention has a fluorine-containing polymer component (a fluorine-containing vinyl monomer polymerization unit and a hydroxyl group-containing vinyl monomer polymerization unit) and a silicone-containing component (a constituent unit having a polysiloxane structure). The component of the fluorine-containing polymer represents the molar fraction (%) of each component, while the silicone-containing component represents the mass % of the silicone-containing component to the entire molecular weight of the fluorine-containing polymer, respectively. The constituent unit having a polysiloxane structure (silicone-containing component) has a large molecular weight, and thus the contribution of the molar fraction of each unit in the fluorine-containing polymer is as small as 2% by mole or less. Hence, the molar fraction was calculated excluding the silicone-containing component. The abbreviated symbols in the tables are as follows.

HFP: Hexafluoropropylene

HEVE: 2-Hydroxyethyl vinyl ether

HBVE: 4-Hydroxybutyl vinyl ether

HOVE: 8-Hydroxyoctyl vinyl ether

DEGVE: Diethylene glycol vinyl ether

HMcHVE: 4-(Hydroxymethyl)cyclohexylmethyl vinyl ether

EVE: Ethyl vinyl ether cHVE: Cyclohexyl vinyl ether tBuVE: t-Butyl vinyl ether

VAc: Vinyl acetate

In the present invention, as the fluorine-containing polymer represented by the foregoing P1 to P59, P2, P3, P10-P12, P14, P17, P18, P20, P22-p26, P29, P38, P39, P41, P42, P44, P45, and P49-P59 are preferred, P14, P17, P18, P20, P22-P24, P38, P39, P41, P42, P44, P45 and P49-P59 are more preferred, and P49-P59 are still more preferred.

The synthesis of the foregoing fluorine-containing polymer which is used in the invention can be carried out by various polymerization methods, for example, solution polymerization, precipitation polymerization, suspension polymerization, precipitation polymerization, block polymerization, and emulsion polymerization. Furthermore, the synthesis can be carried out by a known operation such as a batchwise operation, a semi-continuous operation, and a continuous operation.

Examples of a method for initiating the polymerization include a method of using a radical initiator and a method of irradiating light or radiations. These polymerization methods and method for initiating the polymerization are described in, for example, Teiji Tsuruta, *Kobunshi Gosei Hoho* (Polymer Synthesis Methods, Revised Edition (published by Nikkan Kogyo Shimbun Ltd., 1971); and Takayuki Otsu and Masayoshi Kinoshita, *Kobunshi Gosei no Jikkenho* (Exerimental Methods of Polymer Synthesis), published by Kagaku-dojin Publishing Company, Inc., pages 124 to 125 (1972).

Among the foregoing polymerization methods, a solution polymerization method using a radical initiator is especially preferable. Examples of a solvent which is used in the solution polymerization method include various solvents such as ethyl acetate, butyl acetate, acetone, methyl ethyl ketone, methyl isobutyl ketone, cyclohexanone, tetrahydrofuran, dioxane, N,N-dimethylformamide, N,N-dimethylacetamide, benzene, toluene, acetonitrile, methylene chloride, chloroform, dichloroethane, methanol, ethanol, 1-propanol, 2-propanol, and 1-butanol. Such an organic solvent may be used singly or in admixture of two or more kinds thereof, or may be used as a mixed solvent with water.

The polymerization temperature must be set up in relation to the molecular weight of a formed polymer, the kind of an initiator, and so on. Though the polymerization can be carried out at not higher than 0° C. or 100° C. or higher, it is preferred to carry out the polymerization at a temperature in the range of from 40 to 100° C.

Though the reaction pressure can be properly selected, it is desired that the reaction pressure is usually from about 0.01 to 10 MPa, preferably from about 0.05 to 5 MPa, and more preferably from about 0.1 to 2 MPa. The reaction time is from about 5 to 30 hours.

With respect to the obtained polymer, the reaction solution can be used for the application of the invention as it stands, or it can be used after purification by a re-precipitation or liquid separation operation.

1-(4) Organosilane Compound [Constitutional Component (D) of Low Refractive Index Layer of the Film of the Invention]:

It is preferable from the standpoint of scar resistance that an organosilane compound or a hydrolyzate of the organosilane compound and/or a partial condensate thereof (the solution of the reaction components will be hereinafter sometimes referred to as “sol component”) is contained in the low refractive index layer of the film of the invention.

Such a compound functions as a binder such that after coating, the foregoing hardenable composition is condensed in drying and heating steps to form a hardened material. Furthermore, in the case where a polyfunctional acrylate polymer is contained, a binder having a three-dimensional structure is formed upon irradiation with active rays.

The foregoing organosilane compound is preferably one represented by the following formula [A].

$(R^{10})_m$—$Si(X)_{4-m}$ Formula [A]

In the foregoing formula [A], $R^{10}$ represents a substituted or unsubstituted alkyl group or a substituted or unsubstituted aryl group. Examples of the alkyl group include methyl, ethyl, propyl, isopropyl, hexyl, decyl, and hexadecyl. The alkyl group preferably has from 1 to 30 carbon atoms, more preferably from 1 to 16 carbon atoms, and especially preferably from 1 to 6 carbon atoms. Examples of the aryl group include phenyl and naphthyl. Of these, a phenyl group is preferable.

X represents a hydroxyl group or a hydrolyzable group. Examples of the hydrolyzable group include an alkoxy group (preferably an alkoxy group having from 1 to 5 carbon atoms, for example, a methoxy group and an ethoxy group), a halogen atom (for example, Cl, Br, and I), and $R^2COO$ (wherein $R^2$ is preferably a hydrogen atom or an alkyl group having from 1 to 5 carbon atoms; and examples thereof include $CH_3COO$ and $C_2H_5COO$). Of these, an alkoxy group is preferable; and a methoxy group and an ethoxy group are especially preferable.

m represents an integer of from 1 to 3, preferably 1 or 2, and especially preferably 1.

When plural $R^{10}$s or Xs are present, the plural $R^{10}$s or Xs may be the same or different.

The substituent which is contained in $R^{10}$ is not particularly limited, and examples thereof include a halogen atom (for example, fluorine, chlorine, and bromine), a hydroxyl group, a mercapto group, a carboxyl group, an epoxy group, an alkyl group (for example, methyl, ethyl, isopropyl, propyl, and t-butyl), an aryl group (for example, phenyl and naphthyl), an aromatic heterocyclic group (for example, furyl, pyrazolyl, and pyridyl), an alkoxy group (for example, methoxy, ethoxy, isopropoxy, and hexyloxy), an aryloxy group (for example, phenylthio), an alkylthio group (for example, methylthio and ethylthio), an arylthio group (for example, phenylthio), an alkenyl group (for example, vinyl and 1-propenyl), an acyloxy group (for example, acetoxy, acryloyloxy, and methacryloyloxy), an alkoxycarbonyl group (for example, methoxycarbonyl and ethoxycarbonyl), an aryloxycarbonyl group (for example, phenoxycarbonyl), a carbamoyl group (for example, carbamoyl, N-methylcarbamoyl, N,N-dimethylcarbamoyl, and N-methyl-N-octylcarbamoyl), and an acylamino group (for example, acetylamino, benzoylamino, acrylamino, and methacrylamino). Such a substituent may be further substituted.

In the case where plural $R^{10}$s are present, it is preferable that at least one of them is a substituted alkyl group or a substituted aryl group.

Among the organosilane compounds represented by the foregoing formula [A], a vinyl polymerizable substituent-containing organosilane compound represented by the following formula [B] is preferable.

Formula [B]

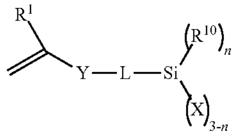

In the foregoing formula [B], $R^1$ represents a hydrogen atom, a methyl group, a methoxy group, an alkoxycarbonyl group, a cyano group, a fluorine atom, or a chlorine atom. Examples of the alkoxycarbonyl group include a methoxycarbonyl group and an ethoxycarbonyl group. Above all, a hydrogen atom, a methyl group, a methoxy group, a methoxycarbonyl group, a cyano group, a fluorine atom, and a chlorine atom are preferable; a hydrogen atom, a methyl group, a methoxycarbonyl group, a fluorine atom, and a chlorine atom are more preferable; and a hydrogen atom and a methyl group are especially preferable.

Y represents a single bond, *—COO—**, *—CONH—**, or *—O—**. Of these, a single bond, *—COO—**, and *—CONH—** are preferable; a single bond and *—COO—** are more preferable; and *—COO—** is especially preferable. Here, * represents the binding position to =$C(R^1)$; and ** represents the binding position to L.

L represents a divalent connecting chain. Specific examples thereof include a substituted or unsubstituted alkylene group, a substituted or unsubstituted arylene group, a substituted or unsubstituted alkylene group containing a connecting group (for example, ethers, esters, and amides) therein, and a substituted or unsubstituted arylene group containing a connecting group therein. Of these, a substituted or unsubstituted alkylene group, a substituted or unsubstituted arylene group, and an alkylene group containing a connecting group therein are preferable; an unsubstituted alkylene group, an unsubstituted arylene group, and an alkylene group containing an ether or ester connecting group therein are more preferable; and an unsubstituted alkylene group and an alkylene group containing an ether or ester connecting group therein are especially preferable. Examples of the substituent include a halogen, a hydroxyl group, a mercapto group, a carboxyl group, an epoxy group, an alkyl group, and an aryl group. Such a substituent may be further substituted.

n represents 0 or 1 and is preferably 0.

$R^{10}$ is synonymous with $R^{10}$ in the formula [A] and is preferably a substituted or unsubstituted alkyl group or an unsubstituted aryl group, and more preferably an un-substituted alkyl group or an unsubstituted aryl group.

X is synonymous with X in the formula [A]. Above all, a halogen atom, a hydroxyl group, and an unsubstituted alkoxy group are preferable; a chlorine atom, a hydroxyl group, and an alkoxy group having from 1 to 6 carbon atoms are more preferable; a hydroxyl group and an alkoxy group having from 1 to 3 carbon atoms are further preferable; and a methoxy group is especially preferable. When plural Xs are present, the plural Xs may be the same or different.

The compound of the formula [A] or formula [B] may be used in combination of two or more kinds thereof In the case where the compounds are used together, it is preferable that a compound containing a polymerizable group such as a vinyl polymerizable group and a compound not containing a polymerizable group are used together. Specific examples of the compound represented by the formula [A] or formula [B] will be given below, but it should not be construed that the invention is limited thereto.

M-1

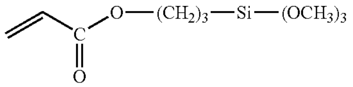

M-2

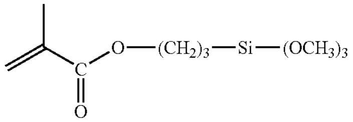

M-3

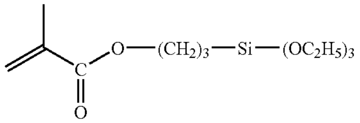

M-4

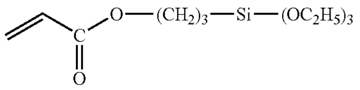

M-5

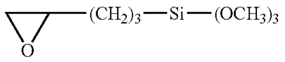

M-6

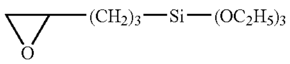

M-7

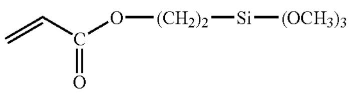

M-8

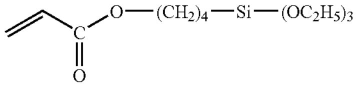

-continued

M-9

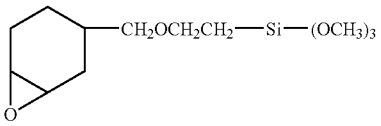

M-10

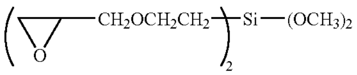

M-11

$CH_3—Si—(OCH_3)_3$

Of these, (M-1), (M-2), (M-5) and (M-11) are especially preferable. In the case where the compounds are used together, for example, it is preferable that a compound containing a vinyl polymerizable group such as M-1 and a compound not containing a polymerizable group such as M-11 are used together.

Then, in general, a hydrolyzate of the foregoing organosilane compound and/or a partial condensate thereof is produced by treating the foregoing organosilane compound in the presence of a catalyst. Examples of the catalyst include inorganic acids such as hydrochloric acid, sulfuric acid, and nitric acid; organic acids such as oxalic acid, acetic acid, formic acid, methanesulfonic acid, and toluenesulfonic acid; inorganic bases such as sodium hydroxide, potassium hydroxide, and ammonia; organic bases such as triethylamine and pyridine; metal alkoxides such as triisopropoxyaluminum and tetra-butoxyzirconium; and metal chelate compounds containing a metal (for example, Zr, Ti, and Al) as a central metal. In the invention, it is preferred to use a metal chelate compound or an acid catalyst such as inorganic acids and organic acids. Hydrochloric acid and sulfuric acid are preferable as the inorganic acid; and ones having an acid dissociation constant (pKa value (at 25° C.)) in water of not more than 4.5 are preferable as the organic acid. Hydrochloric acid, sulfuric acid, and an organic acid having an acid dissociation constant in water of not more than 3.0 are more preferable; hydrochloric acid, sulfuric acid, and an organic acid having an acid dissociation constant in water of not more than 2.5 are further preferable; and an organic acid having an acid dissociation constant in water of not more than 2.5 is especially preferable. Concretely, methanesulfonic acid, oxalic acid, phthalic acid, and malonic acid are preferable, with oxalic acid being especially preferable.

As the metal chelate compound, ones containing, as a central metal, a metal selected from Zr, Ti and Al, in which an alcohol represented by the formula, $R^3OH$ (wherein $R^3$ represents an alkyl group having from 1 to 10 carbon atoms) and a compound represented by the formula, $R^4COCH_2COR^5$ (wherein $R^4$ represents an alkyl group having from 1 to 10 carbon atoms; and $R^5$ represents an alkyl group having from 1 to 10 carbon atoms or an alkoxy group having from 1 to 10 carbon atoms) function as ligands, can be suitably used without particular limitations. Two or more kinds of metal chelate compounds may be used together within this scope. The metal chelate compound which is used in the invention is preferably selected from the group of compounds represented by the formulae, $Zr(OR^3)_{p1}(R^4COCHCOR^5)_{p2}$, $Ti(OR^3)_{q1}(R^4COCHCOR^5)_{q2}$ and $Al(OR^3)_{r1}(R^4COCHCOR^5)_{r2}$ and acts to accelerate a condensation reaction of a hydrolyzate of the foregoing organosilane compound and/or a partial condensate thereof.

In the foregoing metal chelate compounds, $R^3$ and $R^4$ may be the same or different and each represents an alkyl group having from 1 to 10 carbon atoms. Specific examples of the alkyl group include an ethyl group, an n-propyl group, an isopropyl group, an n-butyl group, a sec-butyl group, a t-butyl group, an n-pentyl group, and a phenyl group. Furthermore, $R^5$ represents an alkyl group having from 1 to 10 carbon atoms the same as in the foregoing or an alkoxy group having from 1 to 10 carbon atoms. Examples of the alkoxy group include a methoxy group, an ethoxy group, an n-propoxy group, an isopropoxy group, an n-butoxy group, a sec-butoxy group, and a t-butoxy group. Moreover, in the foregoing metal chelate compounds, p1, p2, q1, q2, r1 and r2 each represents an integer which is determined such that the relations: (p1+p2)=4, (q1+q2)=4 and (r1+r2)=3 are satisfied, Specific examples of such a metal chelate compound include zirconium chelate compounds such as zirconium tri-n-butoxyethylacetoacetate, zirconium di-n-butoxybis-(ethylacetoacetate), zirconium n-butoxytris(ethylacetoacetate), zirconium tetrakis(n-propylacetoacetate), zirconnium tetrakis(acetylacetoacetate), and zirconium tetrakis(ethylacetoacetate); titanium chelate compounds such as titanium diisopropoxy.bis(ethylacetoacetate), titanium diisopropoxy.bis (acetylacetate), and titanium diisopropoxy.bis(acetylcetone); and aluminum chelate compounds such as aluminum diisopropoxyethylacetoacetate, aluminum diisopropoxyacetylacetate, aluminum isopropoxybis(ethylacetoacetate), aluminum isopropoxybis(acetylacetonate), aluminum tris (ethylacetoacetate), aluminum tris(acetylacetonate), and aluminum monoacetylacetonato.bis(ethylacetoacetate).

Of these metal chelate compounds, zirconium tri-n-butoxyethylacetoacetate, titanium diisopropoxybis(acetylacetonate), aluminum diisopropoxyethylacetoacetate, and aluminum tris(ethylacetoacetate) are preferable. Such a metal chelate compound can be used singly or in admixture of two or more kinds thereof A partial hydrolyzate of such a metal chelate compound can also be used.

Furthermore, in the invention, it is preferable that a β-diketone compound and/or a β-ketoester compound is further added in the foregoing hardenable composition. This will be further described below.

The compound which is used in the invention is a β-diketone compound and/or a β-ketoester compound represented by the formula, $R^4COCH_2COR^5$ and acts as a stability improving agent of the hardenable composition which is used in the invention. Here, $R^4$ represents an alkyl group having from 1 to 10 carbon atoms; and $R^5$ represents an alkyl group having from 1 to 10 carbon atoms or an alkoxy group having from 1 to 10 carbon atoms. That is, it is thought that when this compound coordinates with the metal atom in the metal chelate compound (for example, zirconium, titanium and/or aluminum compounds), it inhibits an action of acceleration of a condensation reaction of a hydrolyzate of the organosilane compound and/or a partial condensate thereof by such a metal chelate compound, thereby acting to improve the storage stability of the resulting composition. $R^4$ and $R^5$ which constitute the β-diketone compound and/or β-ketoester compound are synonymous with $R^4$ and $R^5$ which constitute the foregoing metal chelate compound.

Specific examples of this β-diketone compound and/or β-ketoester compound include acetylacetone, methyl acetoacetate, ethyl acetoacetate, n-propyl acetoacetate, isopropyl acetoacetate, n-butyl acetoacetate, sec-butyl acetoacetate, t-butyl acetoacetate, 2,3-hexane-dione, 2,4-heptane-dione, 3,5-heptane-dione, 2,4-octane-dione, 2,4-nonane-dione, and t-methylhexane-dione. Of these, ethyl acetoacetate and acetylacetone are preferable; and acetylacetone is especially preferable. Such a β-diketone compound and/or β-ketoester compound can be used singly or in admixture of two or more kinds thereof In the invention, the β-diketone compound and/or β-ketoester compound is preferably used in an amount of 2 moles or more, and more preferably from 3 to 20 moles per mole of the metal chelate compound. When the amount of the β-diketone compound and/or β-ketoester compound is less than 2 moles, the storage stability of the resulting composition may possibly be deteriorated, and therefore, such is not preferable.

The blending amount of the foregoing organosilane compound or its hydrolyzate and/or its partial condensate is preferably from 0.1 to 50% by weight, more preferably from 0.5 to 30% by weight, and most preferably from 1 to 20% by weight of the whole of solids of the low refractive index layer.

Though the foregoing organosilane compound may be added directly in the hardenable composition (for example, a coating solution for antiglare layer or low refractive index layer), it is preferable that the foregoing organosilane compound is previously treated in the presence of a catalyst to prepare a hydrolyzate of the foregoing organosilane compound and/or a partial condensate thereof and the foregoing hardenable composition is prepared by using the resulting reaction solution (sol solution). In the invention, it is preferable that a composition containing a hydrolyzate of the foregoing organosilane compound and/or a partial condensate and a metal chelate compound is first prepared and a solution resulting from adding a β-dietone compound and/or a β-ketoestr compound in this composition is then contained in a coating solution for at least one layer of an antiglare layer or a low refractive index layer, followed by coating.

A silicon-containing compound as described below in (a), (b) or (c) can be further added to the component (D).

(a) Silicon Alkoxide:

A silicon alkoxide is a compound represented by $R_mSi(OR')_n$, wherein R and R' each represents an alkyl group having from 1 to 10 carbon atoms; and m and n each represents an integer such that the relationship: (m+n)=4 is satisfied. Examples of the silicon alkoxide include tetramethoxysilane, tetraethoxysilane, tetraisopropoxysilane, tetra-n-butoxysilane, tetra-n-butoxysilane, tetra-sec-butoxysilane, tetra-tert-butoxysilane, tetrapentaethoxysilane, tetrapentaisopropoxysilane, tetrapenta-n-propoxysilane, tetra-penta-n-butoxysilane, tetrapenta-sec-butoxysilane, tetrapenta-tert-butoxysilane, methyltrimethoxysilane, methyltriethoxysilane, methyltripropoxysilane, methyltributoxysilane, dimethyldimethoxysilane, dimethyldiethoxysilane, dimethylethoxysilane, dimethylmethoxysilane, dimethylpropoxysilane, dimethylbutoxysilane, methyldimethoxysilane, methyldiethoxysilane, and hexyltrimethoxysilane.

(b) Silane Coupling Agent:

Examples of a silane coupling agent include y-(2-aminoethyl)aminopropyltrimethoxysilane, γ-(2-aminoethyl)aminopropylmethyldimethoxysilane, β-(3,4-epoxycyclohexyl) ethyltrimethoxysilane, γ-aminopropyltriethoxysilane, γ-methacryloxypropyltrimethoxysilane, N-β-(N-vinylbenzylaminoethyl)-γ-aminopropylmethoxysilane hydrochloride, γ-glycydoxypropyltrimethoxysilane, aminosilane, methyltrimethoxysilane, vinyltriacetoxysilane, γ-mercaptopropyltrimethoxysilane, γ-chloropropyltrimethoxysilane, hexamethyldisilazane, vinyltris(β-methoxyethoxy)silane, octadecyldimethyl [3-(trimethoxysilyl)propyl]ammonium chloride, methyltrichlorosilane, and dimethyldichlorosilane.

(c) Ionizing Radiation Hardenable Silicon Compound:

Examples of an ionizing radiation hardenable silicon compound include organosilicon compounds having a molecular weight of not more than 5,000 and containing plural groups capable of causing reaction and crosslinking by ionizing radiations, for example, a polymerizable double bond group.

Examples of such a reactive organosilicon compound include one-terminal vinyl functional polysilanes, both-terminal vinyl functional polysilanes, one-terminal vinyl functional polysiloxanes, and both-terminal vinyl functional polysiloxanes; and vinyl functional polysilanes or vinyl functional polysiloxanes resulting from reaction of the foregoing compounds.

Examples of other compounds include (meth)acryloxysilane compounds such as 3-(meth)acryloxypropyltrimethoxysilane and 3-(meth)acryloxypropylmethyldimethoxysilane.

The following reactive organosilicon compound which is described in, for example, JP-A-2003-39586 can be used together with the foregoing binder. The reactive organosilicon compound is used in an amount in the range of from 10 to 100% by weight based on the total sum of the ionizing radiation hardenable resin and the reactive organosilicon compound. In particular, in the case of using the foregoing ionizing radiation hardenable organosilicon compound (c), it is possible to form a conductive layer by using only this compound as a resin component.

1-(5) Initiator:

The polymerization of a variety of ethylenically unsaturated group-containing monomers can be carried out by irradiation with ionizing radiations or heating in the presence of a photo radical initiator or a heat radical initiator.

In preparing the film of the invention, a photo initiator and a heat initiator can be used together.

<Photo Initiator>

Examples of the photo radical polymerization initiator include acetophenones, benzoins, benzophenones, phosphine oxides, ketals, anthraquinones, thioxanthones, azo compounds, peroxides (for example, ones described in JP-A-2001-139663), 2,3-dialkyldione compounds, disulfide compounds, fluoroamine compounds, aromatic sulfoniums, lophine dimers, onium salts, borate salts, active esters, active halogens, inorganic complexes, and coumarins.

Examples of the acetophenones include 2,2-dimethoxyacetophenone, 2,2-diethoxyacetophenone, p-dimethylacetophenone, 1-hydroxy-dimethyl phenyl ketone, 1-hydroxy-dimethyl-p-isopropyl phenyl ketone, 1-hydroxycyclohexyl phenyl ketone, 2-methyl-4-methylthio-2-morpholinopropiophenone, 2-benzyl-2-dimethylamino-1-(4-morpholinophenyl)butanone, 4-phenoxydichloroacetophenone, and 4-t-butyl-dichloroacetophenone.

Examples of the benzoins include benzoin, benzoin methyl ether, benzoin ethyl ether, benzoin isopropyl ether, benzyl dimethyl ketal, benzoin benzenesulfonic acid ester, benzoin toluenesulfonic acid ester, benzoin methyl ether, benzoin ethyl ether, and benzoin isopropyl ether. Examples of the benzophenones include benzophenone, hydroxybenzophenone, 4-benzoyl-4'-methyldiphenyl sulfide, 2,4-dichlorobenzophenone, 4,4-dichlorobenzophenone, p-chlorobenzophenone, 4,4'-dimethylaminobenzophenone (Michler's ketone), and 3,3',4,4'-tetra(t-butyl peroxycarbonyl)benzophenone.

Examples of the borate salts include organic boric acid salt compounds as described in Japanese Patent No. 2764769, JP-A-2002-116539, and Kunz and Martin, *Red Tech '98. Proceeding, April*, pages 19 to 22 (1998), Chicago. For example, there are enumerated compounds as described in paragraphs [0022] to [0027] of the foregoing JP-A-2002-116539. Furthermore, specific examples of other organoboron compounds include organoboron transition metal-coordinated complexes as described in JP-A-6-348011, JP-A-7-128785, JP-A-7-140589, JP-A-7-306527, and JP-A-7-292014. Specific examples thereof also include ion complexes with a cationic dye.

Examples of the phosphine oxides include 2,4,6-trimethylbenzoyl diphenylphosphine oxide.

Examples of the active esters include 1,2-octanedione, 1-[4-(phenylthio)-2-(O-benzoyloxime)], sulfonic acid esters, and cyclic active ester compounds.

Concretely, Compounds 1 to 21 as described in the working examples of JP-A-2000-80068 are especially preferable.

Examples of the oniums include aromatic diazonium salts, aromatic iodonium salts, and aromatic sulfonium salts.

As the active halogens, there are concretely enumerated compounds as described in Wakabayashi, et al., *Bull Chem. Soc. Japan*, Vol. 42, 2924 (1969), U.S. Pat. No. 3,905,815, JP-A-5-27830, and M.P. Hutt, *Journal of Heterocyclic Chemistry, Vol.* 1 (No. 3), 1970, and especially oxazole compounds and s-triazine compounds having a trihalomethyl group substituted thereon. More suitably, there are enumerated s-triazine derivatives in which at least one mono-, di- or trihalogen-substituted methyl group is bound to an s-triazine ring. As specific examples, there are known s-triazine or oxathiazole compounds including 2-(p-methoxyphenyl)-4,6-bis(trichloromethyl)-s-triazine, 2-(p-methoxyphenyl)-4,6-bis(trichloromethyl)-s-triazine, 2-(p-styrylphenyl) -4,6-bis(trichloromethyl)-s-triazine, 2-(3-bromo-4-di(ethyl acetate)amino) phenyl)-4,6-bis(trichloromethyl)-s-triazine, and a 2-trihalomethyl-5-(p-methoxyphenyl)-1,3,4-oxadiazole. Concretely, compounds as described in JP-A-58-15503, pages 14 to 30 and JP-A-55-77742, pages 6 to 10; and Compound Nos. 1 to 8 as described in JP-B-60-27673, page 287, Compound Nos. 1 to 17 as described in JP-A-60-239736, pages 443 to 444, and Compound Nos. 1 to 19 of U.S. Pat. No. 4,701,399.

Examples of the inorganic complexes include bis- ($\eta^5$-2,4-cyclopentadien-1-yl)-bis(2,6-difluoro-3-(1H-pyrrol-1-yl) phenyl)titanium.

Examples of the coumarins include 3-ketocoumarin.

Such an initiator may be used singly or in admixture.

A variety of examples are described in *Saishin UV Koka Gijutsu* (Latest UV Curing Technologies), published by Technical Information Institute Co., Ltd., page 159 (1991) and Kiyoshi Kato, Shigaisen Koka Shisutemu (Ultraviolet Ray Curing Systems), published by Sogo Gijutsu Center, pages 65 to 148 (1988) and are useful in the invention.

With respect to commercially available photo radical polymerization initiators, KAYACURE Series as manufactured by Nippon Kayaku Co., Ltd. (for example, DETX-S, BP-100, BDMK, CTX, BMS, 2-FAQ, ABQ, CPTX, EPD, ITX, QTX, BTC, and MCA), IRGACURE Series as manufactured by Ciba Speciality Chemicals (for example, 651, 184, 500, 819, 907,369, 1173, 1870, 2959, 4265, and 4263), ESACURE Series as manufactured by Sartmer Company Inc. (for example, KIP100F, KB1, EB3, BP, X33, KT046, KT37, KIP150, and TZT), and combinations thereof are enumerated as preferred examples.

A photopolymerization initiator is preferably used in an amount in the range of 0.1 to 15 parts by weight relative to 100 parts by weight of a polyfunctional monomer, and a more preferable range is 1 to 10 parts by mass. Particularly, by incorporating a photopolymerization initiator to the low refractive index layer of the present invention in the range of 0.1 to 5 parts by weight, crosslinking of the low refractive index layer itself and the bonding at the interface are enhanced, thus capable of improving scar resistance.

<Photosensitizer>

In addition to the photopolymerization initiator, a photosensitizer may be used. Specific examples of the photosensitizer include n-butylamine, triethylamine, tri-n-butyl phosphine, Michler's ketone, and thioxanthone.

In addition, at least one auxiliary agent such as azide compounds, thiourea compounds, and mercapto compounds may be combined and used.

With respect to commercially available photosensitizers, there are enumerated KAYACURE Series as manufactured by Nippon Kayaku Co., Ltd. (for example, DMBI and EPA).

<Heat Initiator>

Examples of a heat initiator which can be used include organic or inorganic peroxides, and organic azo or diazo compounds.

Concretely, examples of the organic peroxides include benzoyl peroxide, halogen benzoyl peroxides, lauroyl peroxide, acetyl peroxide, dibutyl peroxide, cumene hydroperoxide, and butyl hydroperoxide; examples of the inorganic peroxides include hydrogen peroxide, ammonium persulfate, and potassium persulfate; examples of the azo compounds include 2,2'-azobis(isobutyronitrile), 2,2'-azobis(propionitrile), and 1,1'-azobis(cyclohexanecarbonitrile); and examples of the diazo compounds include diazoaminobenzene and p-nitrobenzene diazonium.

1-(6) Crosslinking Compound [Constitutional Component (B) of Low Refractive Index Layer of the Invention]

[Hardening Agent]

In the invention, it is preferable that the low refractive index layer is formed by using a hardenable composition containing a hydroxyl group-containing fluorine-containing polymer and a compound (hardening agent) capable of reacting with the hydroxyl group in the fluorine-containing polymer, namely a so-called hardenable resin composition. The hardening agent preferably contains two or more, and more preferably four or more sites capable of reacting with a hydroxyl group.

The structure of the hardening agent is not particularly limited so far as it contains the foregoing number of functional groups capable of reacting with a hydroxyl group. Examples thereof include polyisocyanates, partial condensates or polymers of an isocyanate compound, adducts with a polyhydric alcohol, a low molecular weight polyester film, etc., block polyisocyanate compounds having an isocyanate group blocked by a blocking agent such as phenol, aminoplasts, and polybasic acids or anhydrides thereof.

Above all, in the invention, aminoplasts capable of causing a crosslinking reaction with a hydroxyl group-containing under an acidic condition are preferable from the viewpoint of making stability at the time of storage and activity of the crosslinking reaction compatible with each other and the viewpoint of strength of the formed film. The aminoplasts are a compound containing an amino group capable of reacting with a hydroxyl group in a fluorine-containing polymer, namely, a hydroxyalkylamino group or an alkoxyalkylamino group, or a carbon atom adjacent to a nitrogen atom and substituted with an alkoxy group. Specific examples thereof include melamine based compounds, urea based compounds, and benzoguanamine based compounds.

The foregoing melamine based compounds are generally known as a compound having a skeleton in which a nitrogen atom is bound to a triazine ring, and specific examples thereof include melamine, alkylated melamines, methylolmelamine, and alkoxylated methylmelamines. Above all, methylolated melamine obtained by making melamine react with formaldehyde under a basic condition, alkoxylated methylmelamines, and derivatives thereof are preferable; and alkoxylated methylmelamines are especially preferable in view of storage stability. Furthermore, with respect to the methylolated melamine and alkoxylated methylmelamines, there are no particular limitations, and for example, a variety of resins obtainable by a method as described in *Plastic Material Course [8]*: *Urea melamine Resins* (published by Nikkan Kogyo Shimbun Ltd.) can be used.

Furthermore, as the foregoing urea compounds, in addition to urea, polymethylolated ureas and alkoxylated methylureas as a derivative thereof, and compounds having a glycol uryl skeleton or 2-imidazolidinone skeleton as a cyclic urea structure are preferable. With respect to the amino compounds such as the foregoing urea derivatives, a variety of resins as described in the foregoing *Urea•melamine Resins* reference, etc. can also be used.

In the invention, as a compound which is suitably used as the crosslinking agent, melamine compounds or glycol uryl compounds are especially preferable in view of compatibility with the fluorine-containing copolymer. Above all, it is preferable that the crosslinking agent is a compound containing a nitrogen atom in the molecule thereof and containing two or more carbon atoms adjacent to the nitrogen atom and substituted with an alkoxy group. Examples of especially preferred compounds include compounds having a structure represented by the following H-1 or H-2 and partial condensates thereof In the following formulae, R represents an alkyl group having from 1 to 6 carbon atoms or a hydroxyl group.

H-1

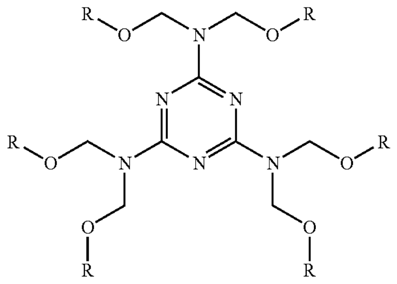

H-2

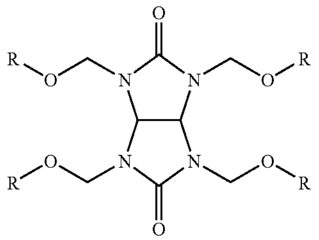

The amount of addition of the aminoplast to the fluorine-containing polymer is from 1 to 50 parts by weight, preferably from 3 to 40 parts by weight, and more preferably from 5 to 30 parts by weight based on 100 parts by weight of the copolymer. When the amount of addition of the aminoplast is 1 part by weight or more, it is possible to sufficiently exhibit durability as a thin film which is a characteristic feature of the invention. When it is not more than 50 parts by weight, in utilizing for optical applications, it is possible to keep a low refractive index which is a characteristic feature of the low refractive index layer in the invention, and therefore, such is preferable. From the viewpoint of keeping a low refractive index even by adding the hardening agent, a hardening agent which even when added, is small with respect to an increase of the refractive index is preferable. According to this viewpoint, among the foregoing compounds, those having a skeleton represented by H-2 are more preferable.

1-(7) Hardening Catalyst:

In the film of the invention, the film is hardened by a crosslinking reaction of the hydroxyl group of the fluorine-containing polymer and the foregoing hardening agent while heating. In this system, since the hardening is accelerated by an acid, it is desired to add an acidic substance in the hardenable resin composition. However, when a usual acid is added, the crosslinking reaction also proceeds in the coating solution, resulting in causing a fault (for example, unevenness and cissing). Accordingly, in order to make the storage stability and the hardening activity compatible with each other in the heat hardening system, it is more preferred to add a compound capable of generating an acid by heating as a hardening catalyst.

It is preferable that the hardening catalyst is a salt made of an acid and an organic base. Examples of the acid include organic acids such as sulfonic acids, phosphonic acids, and carboxylic acids; and inorganic acids such as sulfuric acid and phosphoric acid. From the viewpoint of compatibility with the polymer, organic acids are more preferable; sulfonic acids and phosphonic acids are further preferable; and sulfonic acids are the most preferable. Preferred examples of the sulfonic acids include p-toluenesulfonic acid (PTS), benzenesulfonic acid (BS), p-dodecylbenzenesulfonic acid (DBS), p-chlorobenzenesulfonic acid (CBS), 1,4-naphthalenedisulfonic acid (NDS), methanesulfonic acid (MsOH), and nonafluorobutane-1-sulfonic acid (NFBS). All of these compounds can be preferably used. (Each of the expressions in the parentheses is an abbreviation.)

The hardening catalyst largely varies depending upon the basicity and boiling point of the organic base which is combined with the acid. The hardening catalyst which is preferably used in the invention will be described below from the respective viewpoints.

Explanations are made regarding basicity of an organic base. An organic base having a low basicity is high in acid generation efficiency at the time of heating and is preferable from the viewpoint of hardening activity. However, when the basicity is too low, the storage stability becomes insufficient. Accordingly, it is preferred to use an organic base having a proper basicity. When the basicity is expressed in terms of a pKa of a conjugated acid as an index, the pKa of the organic base which is used in the invention is required to be from 5.0 to 10.5, more preferably from 6.0 to 10.0, and further preferably from 6.5 to 10.0. With respect to the pKa value of the organic base, since values in aqueous solution are described in *The Chemical Handbook Basic Edition* (Revised Version, 5th Edition, edited by The Chemical Society of Japan and published by Maruzen Co., Ltd.), Vol. 2, II, pages 334 to 340, it is possible to select an organic base having a proper pKa among them. Furthermore, it is possible to preferably use a compound having a proper pKa in view of the structure even when it is not described in the subject reference. Compounds having a proper pKa as described in the subject reference will be given in the following Table 6, but it should not be construed that the invention is limited thereto.

TABLE 5

| | | pKa |
|---|---|---|
| b-1 | N,N-Dimethylaniline | 5.1 |
| b-2 | Benzimidazole | 5.5 |
| b-3 | Pyridine | 5.7 |
| b-4 | 3-Methylpyridine | 5.8 |
| b-5 | 2,9-Dimethyl-1,10-phenanthroline | 5.9 |
| b-6 | 4,7-Dimethyl-1,10-phenanthroline | 5.9 |
| b-7 | 2-Methylpyridine | 6.1 |
| b-8 | 4-Methylpyridine | 6.1 |
| b-9 | 3-(N,N-Dimethylamino)pyridine | 6.5 |
| b-10 | 2,6-Dimethylpyridine | 7.0 |

TABLE 5-continued

| | | pKa |
|---|---|---|
| b-11 | Imidazole | 7.0 |
| b-12 | 2-Methyl imidazole | 7.6 |
| b-13 | N-Ethylmorpholine | 7.7 |
| b-14 | N-Methylmorpholine | 7.8 |
| b-15 | Bis(2-methoxyethyl)amine | 8.9 |
| b-16 | 2,2'-Iminodiethanol | 9.1 |
| b-17 | N,N-Dimethyl-2-aminoethanol | 9.5 |
| b-18 | Trimethylamine | 9.9 |
| b-19 | Triethylamine | 10.7 |

Explanations are made regarding boiling point of an organic base. An organic base having a low boiling point is high in acid generation efficiency at the time of heating and is preferable from the viewpoint of hardening activity. Accordingly, it is preferred to use an organic base having a proper boiling point. The boiling point of the base is preferably not higher than 120° C.

Examples of compounds which can be preferably used as the organic base in the invention will be given below, but it should not be construed that the invention is not limited thereto. Each of the expressions in the parentheses shows a boiling point.

b-3: pyridine (115° C.), b-14: 4-methylmorpholine (115° C.), b-20: diallylmethylamine (111° C.), b-19: triethylamine (88.8° C.), b -21: t-butylmethylamine (67 to 69° C.), b-22: dimethylisopropylamine (66° C.), b-23: diethylmethylamine (63 to 65° C.), b-24: dimethylethylamine (36 to 38° C.), b-18: trimethylamine (3 to 5° C.)

The boiling point of the organic base used in the invention is particularly preferably 35° C. or higher and not higher than 85° C. By using the organic base having the specific range of the boiling point, good hardening activity, scar resistance and stability of the coating solution can be obtained. The boiling point is more preferably 45° C. or higher and not higher than 80° C., and most preferably 55° C. or higher and not higher than 75° C.

When used as the acid catalyst of the invention, the foregoing salt made of an acid and an organic salt may be isolated and provided for use. Alternatively, a solution obtained by mixing an acid and an organic salt to form a salt in the solution may be used. Furthermore, only one kind of each of an acid and an organic base may be used, and plural kinds of each of an acid and an organic base may be mixed and used. When an acid and an organic base are mixed and used, it is preferred to mix the acid and the organic base such that an equivalent ratio is preferably from 1/0.9 to 1/1.5, more preferably from 1/0.95 to 1/1.3, and further preferably from 1/1.0 to 1/1.1.

A proportion of this acid catalyst to be used is preferably from 0.01 to 10 parts by weight, more preferably from 0.1 to 5 parts by weight, and further preferably from 0.2 to 3 parts by weight based on 100 parts by weight of the fluorine-containing polymer in the foregoing hardening resin composition.

<Photosensitive Acid Generator and Photo Acid Generator>

In the invention, in addition to the foregoing heat acid generator, a compound capable of generating an acid upon light irradiation, namely a photosensitive acid generator may be further added. The photo acid generator which can be used in the invention will be hereunder described in detail.

Examples of the acid generator include known compounds such as photo initiators of photo cationic polymerization, photo decoloring agents of dyes, photo discoloring agents, and known acid generators which are used for microresists and the like, and mixtures thereof The photosensitive acid generator is a substance which imparts photosensitivity to a film of the subject hardenable resin composition and is able to undergo photo hardening of the subject film upon irradiation with radiations such as light. As the photosensitive acid generator, (1) a variety of onium salts such as iodonium salts, sulfonium salts, phosphonium salts, diazonium salts, ammonium salts, iminium salts, arsonium salts, selenonium salts, and pyridinium salts; (2) sulfone compounds such as β-ketoesters, β-sulfonylsulfone, and α-diazo compounds thereof; (3) sulfonic acid esters such as alkylsulfonic acid esters, haloalkylsulfonic acid esters, arylsulfonic acid esters, and iminosulfonates; (4) sulfonimide compounds; (5) diazomethane compounds; and others can be enumerated and properly used. Above all, diazonium salts, iodonium salts, sulfonium salts, and iminium salts are preferable in view of photosensitivity to photopolymerization initiation, material stability of the compound, and so on. For example, compounds as described in paragraphs [0058] to [0059] of JP-A-2002-29162 are enumerated.

The photosensitive acid generator can be used singly or in combination of two or more kinds thereof Furthermore, the photosensitive acid generator can also be used together with the foregoing heat acid generator. A proportion of the photosensitive acid generator to be used is preferably from 0 to 20 parts by weight, and more preferably from 0.1 to 10 parts by weight based on 100 parts by weight of the fluorine-containing in the hardenable resin composition. When the proportion of the photosensitive acid generator is not more than the foregoing upper limit value, the resulting hardened film has excellent strength and satisfactory transparency, and therefore, such is preferable.

The photosensitive acid generator can also be used in other layer than the foregoing low refractive index layer, for example, a hard coat layer. Its proportion for use is preferably from 0.01 to 10 parts by weight, and more preferably from 0.1 to 5 parts by weight based on 100 parts by weight of the hardenable resin composition.

Besides, the contents as described in, for example, JP-A-2005-43876 can be employed as concrete compounds and method of use thereof 1-(8) Translucent Particle:

In order to impart antiglare properties (surface scattering properties) or internal scattering properties to the film of the invention, in particular the antiglare layer or the hard coat layer, a variety of translucent particles can be used.

The translucent particle may be either an organic particle or an inorganic particle. When there is no scattering in the particle size, scattering in the scattering characteristic becomes small so that it is easy to design a haze value. Plastic beads are suitable as the translucent particle. In particular, ones having a high transparency and having the foregoing numerical value in a difference of the refractive index from the binder are preferable.

Examples of the organic particle include a polymethyl methacrylate particle (refractive index: 1.49), a crosslinked poly(acryl-styrene) copolymer particle (refractive index: 1.54), a melamine resin particle (refractive index: 1.57), a polycarbonate particle (refractive index: 1.57), a polystyrene particle (refractive index: 1.60), a crosslinked polystyrene particle (refractive index: 1.61), a polyvinyl chloride particle (refractive index: 1.60), and a benzoguanamine-melamine formaldehyde particle (refractive index: 1.68).

Examples of the inorganic particle include a silica particle (refractive index: 1.44), an alumina particle (refractive index: 1.63), a zirconia particle, a titania particle, and hollow or porous inorganic particles.

Above all, a crosslinked polystyrene particle, a crosslinked poly((meth)acrylate) particle, and a crosslinked poly(acryl-styrene) particle are preferably used. By adjusting the refractive index of the binder adaptive to the refractive index of each of the translucent particles as selected among these particles, it is possible to attain an internal haze, a surface haze and a center line mean roughness of the invention.

In addition, it is preferred to use a combination of a binder composed of, as the major component, a trifunctional or polyfunctional (meth)acrylate monomer (refractive index after hardening: 1.50 to 1.53) with a translucent particle made of a crosslinked poly(meth)acrylate polymer having an acryl content of from 50 to 100% by weight. A combination of a binder with a translucent particle made of a crosslinked poly (styrene-acryl) copolymer (refractive index: 1.48 to 1.54) is especially preferable.

In the invention, the refractive index of a combination of the binder (translucent resin) with the translucent particle is preferably from 1.45 to 1.70, and more preferably from 1.48 to 1.65. In order to make the refractive index fall within the foregoing range, the kinds and amounts of the binder and the translucent particle may be properly selected. How to select the kinds and amounts can be experimentally known in advance with ease.

Furthermore, in the invention, a difference in refractive index between the binder and the translucent particle [(refractive index of translucent particle)-(refractive index of binder)] is preferably from 0.001 to 0.030, more preferably from 0.001 to 0.020, and further preferably from 0.001 to 0.015 in terms of an absolute value. When this difference exceeds 0.030, there are caused problems such as blurring of film letters, lowering of dark room contrast, and cloudiness of surface.

Here, the refractive index of the binder can be quantitatively determined and evaluated by, for example, direct measurement by an Abbe's refractometer or measurement of a spectral reflection spectrum or spectral ellipsometry. The refractive index of the foregoing translucent particle is measured by dispersing an equivalent amount of the translucent particle in a solvent having a varied refractive index by varying a mixing ratio of two kinds of solvents having a different refractive index to measure a turbidity and measuring a refractive index of the solvent at which the turbidity becomes minimum by an Abbe's refractometer.

In the case of the foregoing translucent particle, since the translucent particle is liable to sediment even in the binder, an inorganic filler such as silica may be added for the purpose of preventing the sedimentation. Incidentally, though what the amount of addition of the inorganic filler is increased is effective for preventing the sedimentation of the translucent particle, it adversely affects the transparency of the film. Accordingly, it is preferable that an inorganic filler having a particle size of not more than 0.5 μm is contained in an amount of less than about 0.1% by weight in the binder to such extent that the transparency of the film is not hindered.

The translucent particle preferably has an average particle size of from 0.5 to 10 μm, and more preferably from 2.0 to 6.0 μm. When the average particle size of the translucent particle is less than 0.5 μm, since the scattering angle distribution of light spreads to a wide angle, blurring of letters on a display is caused, and therefore, such is not preferable. On the other hand, when it exceeds 10 μm, the thickness of a layer to which the translucent particle is added must be thickened so that problems such as curl and an increase of costs occur.

Furthermore, two or more kinds of transparent particles having a different particle size may be used together. It is possible to impart antiglare properties by a translucent particle having a larger particle size and to reduce a rough feeling of the surface by a translucent particle having a smaller particle size, respectively.

The foregoing translucent particle is blended such that it is preferably contained in an amount of from 3 to 30% by weight, and more preferably from 5 to 20% by weight based on the whole of solids of the layer to which the translucent particle is added. When the blending amount of the translucent particle is less than 3% by weight, the addition effect is insufficient, whereas when it exceeds 30% by weight, there are caused problems such as blurring of an image, cloudiness of surface, and glare.

Furthermore, the translucent particle preferably has a density of from 10 to 1,000 mg/$m^2$, and more preferably from 100 to 700 mg/$m^2$.

<Preparation and Classification Methods of Translucent Particle>

Examples of a method for producing the translucent particle according to the invention include a suspension polymerization method, an emulsion polymerization method, a soap-free emulsion polymerization method, a dispersion polymerization method, and a seed polymerization method. The translucent particle may be produced by any of these methods. Such a production method can be carried out by referring to methods as described in, for example, *Kobunshi Gosei no Jikkenho* (Exerimental Methods of Polymer Synthesis) (written by Takayuki Otsu and Masayoshi Kinoshita and published by Kagaku-dojin Publishing Company, Inc.), pages 130 and 146 to 147, *Gosei Kobunshi* (Synthetic Polymers), Vol. 1, pages 246 to 290, ibid., Vol. 3, pages 1 to 108, Japanese Patent Nos. 2543503, 3508304, 2746275, 3521560 and 3580320, JP-A-10-1561, JP-A-7-2908, JP-A-5-297506, and JP-A-2002-145919.

With respect to the particle size distribution of the translucent particle, a monodispersed particle is preferable in view of control of a haze value and diffusibility and uniformity of coating surface properties. For example, when a particle having a particle size of 20% or more larger than the average particle size is defined as a coarse particle, a proportion of this coarse particle is preferably not more than 1%, more preferably not more than 0.1%, and further preferably not more than 0.01%. In order to obtain a particle having such particle size distribution, it is an effective measure to perform classification after the preparation or synthesis reaction. By increasing the number of classification or strengthening its degree, it is possible to obtain a particle having desired particle size distribution.

For the classification, it is preferred to employ a method such as an air classification method, a centrifugal classification method, a sedimentation classification method, a filtration classification method, and an electrostatic classification method.

1-(9) Inorganic Particle:

In the invention, for the purpose of improving physical characteristics such as hardness and optical characteristics such as reflectance and scattering properties, a variety of inorganic particles can be used.

Examples of the inorganic particle include oxides of at least one metal selected among silicon, zirconium, titanium, aluminum, indium, zinc, tin, and antimony. The inorganic particle shown as the component (E) is also included. Specific examples thereof include $ZrO_2$, $TiO_2$, $Al_2O_3$, $In_2O_3$, ZnO, $SnO_2$, $Sb_2O_3$, and ITO. Besides,$BaSO_4$, $CaCO_3$, talc, and kaolin.

With respect to the particle size of the inorganic particle which is used in the invention, it is preferable that the inorganic particle is finely divided in a dispersion medium as far as possible. The particle size of the inorganic particle is from 1 to 200 nm, preferably from 5 to 150 nm, more preferably from 10 to 100 nm, and especially preferably from 10 to 80 nm in terms of a weight average molecular weight. By finely dividing the inorganic particle to not more than 100 nm, it is possible to form a film whose transparency is not hindered. The particle size of the inorganic particle can be measured by a light scattering method or from an electron microscopic photograph.

The inorganic particle preferably has a specific surface area of from 10 to 400 $m^2$/g, more preferably from 20 to 200 $m^2$/g, and most preferably 30 to 150 $m^2$/g.

It is preferable that the inorganic particle which is used in the invention is added in a coating solution for a layer to be used as a dispersion in a dispersion medium.

It is preferred to use a liquid having a boiling point of from 60 to 170° C. as the dispersion medium of the inorganic particle. Examples of the dispersion medium include water, alcohols (for example, methanol, ethanol, isopropanol, butanol, and benzyl alcohol), ketones (for example, acetone, methyl ethyl ketone, methyl isobutyl ketone, and cyclohexanone), esters (for example, methyl acetate, ethyl acetate, propyl acetate, butyl acetate, methyl formate, ethyl formate, propyl formate, and butyl formate), aliphatic hydrocarbons (for example, hexane and cyclohexane), halogenated hydrocarbons (for example, methylene chloride, chloroform, and carbon tetrachloride), aromatic hydrocarbons (for example, benzene, toluene, and xylene), amides (for example, dimethylformamide, dimethylacetamide, and n-methylpyrrolidone), ethers (for example, diethyl ether, dioxane, and tetrahydrofuran), and ether alcohols (for example, 1-methoxy-2-propanol). Of these, toluene, xylene, methyl ethyl ketone, methyl isobutyl ketone, cyclohexanone, and butanol are especially preferable.

The most preferred dispersion medium is methyl ethyl ketone, methyl isobutyl ketone, or cyclohexanone.

The inorganic particle is dispersed by using a dispersion machine. Examples of the dispersion machine include a sand grinder mill (for example, a pin-provided bead mill), a high-speed impeller mill, a pebble mill, a roller mill, an attritor, and a colloid mill. Of these, a sand grinder mill and a high-speed impeller mill are especially preferable. Furthermore, a preliminary dispersion treatment may be carried out. Examples of a dispersion machine which is used for the preliminary dispersion treatment include a ball mill, a three-roll mill, a kneader, and an extruder.

<High Refractive Index Particle>

For the purpose of realizing a high refractive index of a layer which constitutes the invention, a hardened material of a composition in which an inorganic particle having a high refractive index is dispersed in a monomer, an initiator and an organic substituted silicon compound.

In this case, $ZrO_2$ and $TiO_2$ are especially preferably used as the inorganic particle from the viewpoint of refractive index. $ZrO_2$ is the most preferable for the purpose of realizing a high refractive index of the hard coat layer; and a fine particle of $TiO_2$ is the most preferable as a particle for a high refractive index layer or a middle refractive index layer.

An inorganic particle containing, as the major component, $TiO_2$ and containing at least one element selected from cobalt, aluminum and zirconium is especially preferable as the foregoing particle of $TiO_2$. The "major component" as referred to herein means a component having the highest content (% by weight) among the components which constitute the particle.

In the invention, the particle composed of, as the major component, $TiO_2$ preferably has a refractive index of from 1.90 to 2.80, more preferably from 2.10 to 2.80, and most preferably from 2.20 to 2.80.

A primary particle of the particle composed of, as the major component, $TiO_2$ preferably has a weight average molecular weight of from 1 to 200 nm, more preferably from 1 to 150 nm, further preferably from 1 to 100 nm, and especially preferably from 1 to 80 nm.

With respect to the crystal structure of the particle composed of, as the major component, $TiO_2$, it is preferable that the major component is of a rutile structure, a rutile/anatase mixed crystal structure, an anatase structure, or an amorphous structure. Above all, it is especially preferable that the major component is of a rutile structure. The "major component" as referred to herein means a component having the highest content (% by weight) among the components which constitute the particle.

By containing at least one element selected from Co (cobalt), Al (aluminum) and Zr (zirconium) in the particle composed of, as the major component, $TiO_2$, it is possible to suppress photo catalytic activity which $TiO_2$ possesses and to improve weather resistance of the film of the invention.

Co (cobalt) is an especially preferred element. Furthermore, it is also preferred to use two or more kinds of elements.

In the invention, the inorganic particle composed of, as the major component, $TiO_2$ may have a core/shell structure through a surface treatment as described in JP-A-2001-166104.

The amount of addition of the monomer or inorganic particle in the layer is preferably from 10 to 90% by weight, and more preferably from 20 to 80% by weight of the whole weight of the binder. Two or more kinds of inorganic particles may be used within the layer.

<Low Refractive Index Particle>[Constitutional Component (E) of Low Refractive Index Layer of the Invention]

It is desired that the inorganic particle which is contained in the low refractive index layer has a low refractive index. Examples thereof include fine particles of magnesium fluoride and silica. In view of refractive index, dispersion stability and costs, a silica fine particle is especially preferable.

The average particle size of the silica fine particle is preferably 30% or more and not more than 150%, more preferably 35% or more and not more than 80%, and further preferably 40% or more and not more than 60% of the thickness of the low refractive index layer. That is, when the thickness of the low refractive index layer is 100 nm, the particle size of the silica fine particle is preferably 30 nm or more and not more than 150 nm, more preferably 35 nm or more and not more than 80 nm, and further preferably 40 nm or more and not more than 60 nm.

When the particle size of the silica fine particle is too small, an effect for improving the scar resistance becomes low, whereas when it is too large, fine irregularities are formed on the surface of the low refractive index layer and the appearance such as deep black and integrated reflectance are deteriorated. The silica fine particle may be either crystalline or amorphous; it may be a monodispersed particle; and so far as a prescribed particle size is met, it may be a coagulated particle. Though the shape of the silica fine particle is most preferably spherical, even when it is amorphous, there is no problem.

Furthermore, it is preferred to use at least one silica fine particle having an average particle size of less than 25% of the thickness of the low refractive index layer (referred to as "small particle-sized silica fine particle") together with the silica fine particle having the foregoing particle size (referred to as "large particle-sized silica fine particle").

Since the small particle-sized silica fine particle can exist in a gap between the large particle-sized silica fine particles, it can contribute as a holding agent of the large particle-sized silica fine particle.

When the thickness of the low refractive index layer is 100 nm, the average particle size of the small particle-sized silica fine particle is preferably 1 nm or more and not more than 20 nm, more preferably 5 nm or more and not more than 15 nm, and especially preferably 10 nm or more and not more than 15 nm. The use of such a silica fine particle is preferable from the standpoints of raw material costs and an effect of the holding agent.

The coating amount of the low refractive index particle is preferably from 1 mg/m$^2$ to 100 mg/m$^2$, more preferably from 5 mg/m$^2$ to 80 mg/m$^2$, and further preferably from 10 mg/m$^2$ to 60 mg/m$^2$. When the coating amount of the low refractive index particle is too low, an effect for improving the scar resistance becomes low, whereas when it is too high, fine irregularities are formed on the surface of the low refractive index layer and the appearance such as deep black and integrated reflectance are deteriorated.

<Hollow Silica Particle>

For the purpose of more lowering the refractive index, it is preferred to use a hollow silica fine particle.

The hollow silica fine particle preferably has a refractive index of from 1.15 to 1.40, more preferably from 1.17 to 1.35, and most preferably from 1.17 to 1.30. The refractive index as referred to herein expresses a refractive index as the whole of the particle but does not express a refractive index of only silica as an outer shell which forms the hollow silica fine particle. At this time, when a radius of a void within the particle is defined as "a" and a radius of the outer shell of the particle is defined as "b", a porosity x which is expressed by the following numerical expression (VIII):

$$x=(4\pi a3/3)/(4\pi b3/3)\times 100 \qquad \text{Expression (VIII)}$$

is preferably from 10 to 60%, more preferably from 20 to 60%, and most preferably from 30 to 60%. When it is intended to make the hollow silica fine so as to have a lower refractive index and a larger porosity, the thickness of only the outer shell becomes thin so that the strength as the particle is weakened. Accordingly, a particle having a low refractive index of less than 1.15 is not preferable from the viewpoint of scar resistance.

A method for producing hollow silica is described in, for example, JP-A-2001-233611 and JP-A-2002-79616. A particle having a void inside the shell, in which pores of the shell are plugged, is especially preferable. Incidentally, the refractive index of such a hollow silica particle can be calculated by a method as described in JP-A-2002-79616.

The coating amount of the hollow silica is preferably from 1 mg/m$^2$ to 100 mg/m$^2$, more preferably from 5 mg/m$^2$ to 80 mg/m$^2$, and further preferably from 10 mg/m$^2$ to 60 mg/m$^2$. When the coating amount of the hollow silica is too low, an effect for realizing a low refractive index and an effect for improving the scar resistance become low, whereas when it is too high, fine irregularities are formed on the surface of the low refractive index layer and the appearance such as deep black and integrated reflectance are deteriorated.

The average particle size of the hollow silica is preferably 30% or more and not more than 150%, more preferably 35% or more and not more than 80%, and further preferably 40% or more and not more than 60% of the thickness of the low refractive index layer. That is, when the thickness of the low refractive index layer is 100 nm, the particle size of the hollow silica is preferably 30 nm or more and not more than 150 nm, more preferably 35 nm or more and not more than 80 nm, and further preferably 40 nm or more and not more than 65 nm.

When the particle size of the silica fine particle is too small, a proportion of voids is reduced so that a lowering of the refractive index cannot be expected, whereas when it is too large, fine irregularities are formed on the surface of the low refractive index layer and the appearance such as deep black and integrated reflectance are deteriorated. The silica fine particle may be either crystalline or amorphous and may be a monodispersed particle. Though the shape of the silica fine particle is most preferably spherical, even when it is amorphous, there is no problem.

Furthermore, with respect to the hollow silica, two or more kinds of hollow silica having a different average particle size can be used together. Here, the average particle size of the hollow silica can be determined from an electron microscopic photograph.

In the invention, the hollow silica preferably has a specific surface area of from 20 to 300 $m^2/g$, more preferably from 30 to 120 $m^2/g$, and most preferably 40 to 90 $m^2/g$. The surface area can be determined by a BET method using nitrogen.

In the invention, it is possible to use a void-free silica particle together with the hollow silica. The void-free silica preferably has a particle size of 30 nm or more and not more than 150 nm, more preferably 35 nm or more and not more than 100 nm, and most preferably 40 nm or more and not more than 80 nm.

1-(10) Conductive Particle:

In order to impart conductivity to the film of the invention, a variety of conductive particles can be used.

It is preferable that the conductive particle is formed of a metal oxide or nitride. Examples of the metal oxide or nitride include tin oxide, indium oxide, zinc oxide, and titanium nitride. Of these, tin oxide and indium oxide are especially preferable. The conductive inorganic particle contains, as the major component, such a metal oxide or nitride and can further contain other element. The "major component" as referred to herein means a component having the highest content (% by weight) among the components which constitute the particle. Examples of other element include Ti, Zr, Sn, Sb, Cu, Fe, Mn, Pb, Cd, As, Cr, Hg, Zn, Al, Mg, Si, P, Si, B, Nb, In, V, and halogen atoms. For the purpose of enhancing the conductivity of tin oxide and indium oxide, it is preferred to use Sb, P, B, Nb, In, V, or a halogen atom. Tin oxide containing Sb (ATO) and indium oxide containing Sn (ITO) are especially preferable. A proportion of Sb in ATO is preferably from 3 to 20% by weight; and a proportion of Sn in ITO is preferably from 5 to 20% by weight.

A primary particle of the conductive inorganic particle which is used for an antistatic layer preferably has an average particle size of from 1 to 150 nm, more preferably from 5 to 100 nm, and most preferably from 5 to 70 nm. The conductive inorganic particle in the antistatic layer to be formed has an average particle size of from 1 to 200 nm, preferably from 5 to 150 nm, more preferably from 10 to 100 nm, and most preferably from 10 to 80 nm. The average particle size of the conductive inorganic particle is an average particle size expecting the weight of the particle as a weight and can be measured by a light scattering method or from an electron microscopic photograph.

The conductive inorganic particle preferably has a specific surface area of from 10 to 400 $m^2/g$, more preferably from 20 to 200 $m^2/g$, and most preferably from 30 to 150 $m^2/g$.

The conductive inorganic particle may be subjected to a surface treatment. The surface treatment is carried out by using an inorganic compound or an organic compound. Examples of the inorganic compound which is used for the surface treatment include alumina and silica. A silica treatment is especially preferable. Examples of the organic compound which is used for the surface treatment include polyols, alkanolamines, stearic acid, silane coupling agents, and titanate coupling agents. Of these, silane coupling agents are the most preferable. The surface treatment may be carried out by combining two or more kinds of surface treatments.

It is preferable that the shape of the conductive inorganic particle is a rice grain form, a spherical form, a cubic form, a spindle-like shape, or an amorphous form.

Two or more kinds of conductive particles may be used together within a specific layer or as a film.

A proportion of the conductive inorganic particle in the antistatic layer is preferably from 20 to 90% by weight, more preferably from 25 to 85% by weight, and further preferably from 30 to 80% by weight.

The conductive inorganic particle can be used in a state of dispersion for the formation of an antistatic layer.

1-(11) Surface Treating Agent:

For the purpose of designing to achieve dispersion stabilization or enhancing compatibility or binding properties with the binder component in the dispersion or coating solution, the inorganic particle which is used in the invention may be subjected to a physical surface treatment such as a plasma discharge treatment and a corona discharge treatment or a chemical surface treatment with a surfactant, a coupling agent, or the like.

The surface treatment can be carried out by using a surface treating agent made of an inorganic compound or an organic compound. Examples of the inorganic compound which is used for the surface treatment include cobalt-containing inorganic compounds (for example, $CoO_2$, $Co_2O_3$, and $Co_3O_4$), aluminum-containing inorganic compounds (for example, $Al_2O_3$ and $Al(OH)_3$), zirconium-containing inorganic compounds (for example, $ZrO_2$ and $Zr(OH)_4$), silicon-containing inorganic compounds (for example, $SiO_2$), and iron-containing inorganic compounds (for example, $Fe_2O_3$).

Of these, cobalt-containing inorganic compounds, aluminum-containing inorganic compounds, and zirconium-containing inorganic compounds are especially preferable; and cobalt-containing inorganic compounds, $Al(OH)_3$ and $Zr(OH)_4$ are the most preferable.

Examples of the organic compound which is used for the surface treatment include polyols, alkanolamines, stearic acid, silane coupling agents, and titanate coupling agents. Of these, silane coupling agents are the most preferable. It is especially preferable that the surface treatment is carried out by using at least one member of silane coupling agents (for example, organosilane compounds) and partial hydrolyzates or condensates thereof.

Examples of the titanate coupling agent include metal alkoxides such as tetramethoxytitanium, tetraethoxytitanium, and tetraisopropoxytitanium; and PLENACT Series (for example, KR-TTS, KR-46B, KR-55, and KR-41B, all of which are manufactured by Ajinomoto Co., Ind.).

As the organic compound which is used for the surface treatment, polyols and alkanolamines and besides, anionic group-containing organic compounds are preferable; and organic compounds containing a carboxyl group, a sulfonic acid group or a phosphoric acid group are especially preferable. Stearic acid, lauric acid, oleic acid, linoleic acid, linolenic acid, and so on can be preferably used.

It is preferable that the organic compound which is used for the surface treatment further contains a crosslinking or polymerizable functional group. Examples of the crosslinking or polymerizable functional group include ethylenically unsaturated groups capable of undergoing an addition reaction or polymerization reaction by a radical species (for example, a (meth)acryl group, an allyl group, a stearyl group, and a vinyloxy group), cationically polymerizable groups (for example, an epoxy group, an oxatanyl group, and a vinyloxy group), and polycondensation reactive groups (for example, a hydrolyzable silyl group and an N-methylol group). Of these, ethylenically unsaturated group-containing groups are preferable.

Two or more kinds of such a surface treatment can be employed. A combination of an aluminum-containing inorganic compound and a zirconium-containing inorganic compound is especially preferable.

When the inorganic particle is silica, it is especially preferred to use a coupling agent. Alkoxy metal compounds (for example, titanium coupling agents and silane coupling agents) are preferably used as the coupling agent. Above all, a silane coupling treatment is especially effective.

The foregoing coupling agent is used for undergoing a surface treatment in advance prior to the preparation of a coating solution as a surface treating agent of an inorganic filler of a low refractive index layer. It is preferred to contain the coupling agent in the subject layer by further addition as an additive at the time of preparation of the coating solution for the layer.

For the purpose of reducing a load of the surface treatment, it is preferable that the silica fine particle is dispersed in advance in a medium prior to the surface treatment.

Specific examples of the surface treating agent and the catalyst for the surface treatment which can be preferably used in the invention include organosilane compounds and catalysts as described in, for example, WO 2004/017105.

1-(12) Dispersant:

A variety of dispersants can be used for dispersing the particle which is used in the invention.

It is preferable that the dispersant further contains a crosslinking or polymerizable functional group. Examples of the crosslinking or polymerizable functional group include ethylenically unsaturated groups capable of undergoing an addition reaction or polymerization reaction by a radical species (for example, a (meth)acryl group, an allyl group, a stearyl group, and a vinyloxy group), cationically polymerizable groups (for example, an epoxy group, an oxatanyl group, and a vinyloxy group), and polycondensation reactive groups (for example, a hydrolyzable silyl group and an N-methylol group). Of these, ethylenically unsaturated group-containing groups are preferable.

For dispersing the inorganic particle, in particular dispersing an inorganic particle composed of, as the major component, $TiO_2$, it is preferred to use a dispersant containing an anionic group. It is more preferable that the dispersant contains an anionic group and a crosslinking or polymerizable functional group. It is especially preferable that the subject crosslinking or polymerizable functional group is contained in a side chain of the dispersant.

As the anionic group, an acidic proton-containing group such as a carboxyl group, a sulfonic acid group (sulfo), a phosphoric acid group (phosphono), and a sulfonamide group, or a salt thereof is effective. Above all, a carboxyl group, a sulfonic acid group, a phosphoric acid group, and salts thereof are preferable; and a carboxyl group and a phosphoric acid group are especially preferable. With respect to the number of the anionic group to be contained in the dispersant per molecule, plural kinds may be contained in one molecule. The number of the anionic group is preferably two or more, more preferably five or more, and especially preferably ten or more in average. Furthermore, plural kinds of anionic groups to be contained in the dispersant may be contained in one molecule.

In the dispersant containing an anionic group in a side chain thereof, the composition of an anionic group-containing repeating unit is in the range of from $10^{-4}$ to 100% by mole, preferably from 1 to 50% by mole, and especially preferably from 5 to 20% by mole of the whole of repeating units.

It is preferable that the dispersant further contains a crosslinking or polymerizable functional group. Examples of the crosslinking or polymerizable functional group include ethylenically unsaturated groups capable of undergoing an addition reaction or polymerization reaction by a radical species (for example, a (meth)acryl group, an allyl group, a stearyl group, and a vinyloxy group), cationically polymerizable groups (for example, an epoxy group, an oxatanyl group, and a vinyloxy group), and polycondensation reactive groups (for example, a hydrolyzable silyl group and an N-methylol group). Of these, ethylenically unsaturated group-containing groups are preferable.

The number of the crosslinking or polymerizable functional group to be contained in the dispersant per molecule is preferably two or more, more preferably five or more, and especially preferably ten or more in average. Furthermore, plural kinds of crosslinking or polymerizable functional groups to be contained in the dispersant may be contained in one molecule.

In the preferred dispersant which is used in the invention, as the repeating unit containing an ethylenically unsaturated group in a side chain thereof, a repeating unit of a poly-1,2-butadiene or poly-1,2-isoprene structure or a (meth)acrylic ester or amide, to which is bound a specific residue (an R group in —COOR or —CONHR), can be utilized. Examples of the foregoing specific residue (R group) include $-(CH_2)_n-CR^{21}{=}CR^{22}R^{23}$, $-(CH_2O)_n-CH_2CR^{21}{=}CR^{22}R^{23}$, $-(CH_2CH_2O)_n-CH_2CR^{21}{=}CR^{22}R^{23}$, $-(CH_2)_n-NH-CO-O-CH_2CR^{21}{=}CR^{22}R^{23}$, $-(CH_2)_n-O-CO-CR^{21}{=}CR^{22}R^{23}$, and $-(CH_2CH_2O)_2-X$ (wherein $R^{21}$ to $R^{23}$ each represents a hydrogen atom, a halogen atom, an alkyl group having from 1 to 20 carbon atoms, an aryl group, an alkoxy group, or an aryloxy group; $R^{21}$ and $R^{22}$ or $R^{23}$ may be taken together to form a ring; n represents an integer of from 1 to 10; and X represents a dicyclopentadienyl residue). Specific examples of R of the ester residue include $-CH_2CH{=}CH_2$ (corresponding to a polymer of allyl (meth) acrylate as described in JP-A-64-17047), $-CH_2CH_2O-CH_2CH{=}CH_2$, $-CH_2CH_2OCOCH{=}CH_2$, $-CH_2CH_2OCOC(CH_3){=}CH_2$, $-CH_2C(CH_3){=}CH_2$, $-CH_2CH{=}CH-C_6H_5$, $-CH_2CH_2OCOCH{=}CH-C_6H_5$, $-CH_2CH_2-NHCOO-CH_2CH{=}CH_2$, and $-CH_2CH_2O-X$ (wherein X represents a dicyclopentadienyl residue). Specific examples of R of the amide reside include $-CH_2CH{=}CH_2$, $-CH_2CH_2-Y$ (wherein Y represents a 1-cyclohexenyl residue), $-CH_2CH_2-OCO-CH{=}CH_2$, and $-CH_2CH_2-OCO-C(CH_3){=}CH_2$.

In the foregoing ethylenically unsaturated group-containing dispersant, a free radical (a polymerization initiation radical or a growth radical in a polymerization process of a polymerizable compound) is added to the unsaturated group, and addition polymerization is caused directly between the molecules or via a polymerization chain of the polymerizable compound, whereby crosslinking is formed between the molecules to cause hardening. Alternatively, an atom in the molecule (for example, a hydrogen atom on a carbon atom adjacent to the unsaturated binding group) is withdrawn by the free radical to form polymer radicals which are then bound to each other, whereby crosslinking is formed between the molecules to cause hardening.

Though the weight average molecular weight (Mw) of the dispersant containing an anionic group and a crosslinking or polymerizable functional group and containing the subject crosslinking or polymerizable functional group in a side chain thereof is not particularly limited, it is preferably 1,000 or more. The weight average molecular weight (Mw) of the dispersant is more preferably from 2,000 to 1,000,000, further preferably from 5,000 to 200,000, and especially preferably from 10,000 to 100,000.

Though the crosslinking or polymerizable functional group-containing unit may constitute all of the repeating units other than the anionic group-containing repeating unit, it preferably accounts for from 5 to 50% by mole, and especially preferably from 5 to 30% by mole of the whole of the crosslinking or repeating units.

The dispersant may be a copolymer with a suitable monomer other than the monomer containing a crosslinking or polymerizable functional group and an anionic group. Though the copolymerization component is not particularly limited, it is selected from various viewpoints such as dispersion stability, compatibility with other monomer component, and strength of a formed film. Preferred example thereof include methyl (meth)acrylate, n-butyl (meth)acrylate, t-butyl (meth)acrylate, cyclohexyl (meth)acrylate, and styrene.

Though the form of the dispersant is not particularly limited, it is preferably a form of a block copolymer or a random copolymer. It is especially preferably a form of a random copolymer in view of easiness for synthesis.

The use amount of the dispersant to be used to the inorganic particle is preferably in the range of from 1 to 50% by weight, more preferably in the range of from 5 to 30% by weight, and most preferably in the range of from 5 to 20% by weight. Furthermore, two or more kinds of dispersants may be used together.

1-(13) Antifouling Agent:

In the film of the invention, in particular the uppermost layer of the film, for the purpose of imparting characteristics such as antifouling properties, water-proof properties, chemical resistance, and slipperiness, it is preferable that known polysiloxane based or fluorine based antifouling agents and slipping agents and the like are properly added.

When such an additive is added, the amount of addition of the additive-is preferably in the range of from 0.01 to 20% by weight, more preferably in the range of from 0.05 to 10% by weight, and especially preferably in the range of from 0.1 to 5% by weight of the whole of solids of the low refractive index layer.

[Compound Having a Polysiloxane Structure] [Constitutional Component (F) of Low Refractive Index of the Film of the Invention]

Next, a compound having a polysiloxane structure will be described.

In the invention, for the purposes of improving the scar resistance by imparting slipperiness and imparting antifouling properties, a compound having a polysiloxane structure is used. The structure of the compound is not particularly limited, and examples thereof include a structure containing plural dimethylsilyloxy units as a repeating unit and containing a substituent in a terminal and/or a side chain of the chemical chain thereof. Furthermore, a structural unit other than dimethylsilyloxy may be contained in the chemical chain containing dimethylsilyloxy as a repeating unit.

Though the molecular weight of the compound having a polysiloxane structure is not particularly limited, it is preferably not more than 100,000, especially preferably not more than 50,000, and most preferably from 3,000 to 30,000.

From the viewpoint of preventing transfer from occurring, it is preferable that a hydroxyl group or a function group capable of reacting with a hydroxyl group to form binding is contained. It is preferable that this binding forming reaction rapidly proceeds under a heating condition and/or in the presence of a catalyst. Examples of such a substituent include an epoxy group and a carboxyl group. Preferred examples of the compound will be given below, but it should not be construed that the invention is limited thereto.

(Compound Containing a Hydroxyl Group)

X-22-160AS, KF-6001, KF-6002, KF-6003, X-22-170DX X-22-176DX, X-22-176D, and X-22-176F (all of which are manufactured by Shin-Etsu Chemical Co., Ltd.); FM-4411, FM-4421, FM-4425, FM-0411, FM-0421, FM-0425, FM-DA11, FM-DA21, and FM-DA25 (all of which are manufactured by Chisso Corporaiton); and CMS-626 and CMS-222 (all of which are manufactured by Gelest, Inc.)

(Compound Containing a Functional Group Capable of Reacting With a Hydroxyl Group)

X-22-162C and KF-105 (all of which are manufactured by Shin-Etsu Chemical Co., Ltd.); and FM-5511, FM-5521, FM-5525, FM-6611, FM-6621, and FM-6625 (all of which are manufactured by Chisso Corporation)

In addition to the foregoing polysiloxane based compound, other polysiloxane based compound can be further used together. Preferred examples thereof include compounds containing plural dimethylsilyloxy units as a repeating unit and containing a substituent in a terminal and/or a side chain of the chemical chain thereof Furthermore, a structural unit other than dimethylsilyloxy may be contained in the chemical chain containing dimethylsilyloxy as a repeating unit. The substituent may be the same or different, and it is preferable that plural substituents are contained. Preferred examples of the substituent include groups containing, for example, an acryloyl group, a methacryloyl group, a vinyl group, an aryl group, a cinnamoyl group, an oxetanyl group, a fluoroalkyl group, a polyoxyalkylene group, a carboxyl group, or an amino group. Though the molecular weight of this polysiloxane based compound is not particularly limited, it is preferably not more than 100,000, more preferably not more than 50,000, especially preferably from 3,000 to 30,000, and most preferably from 10,000 to 20,000. Though the silicon atom content of the silicone based compound is not particularly limited, it is preferably 18.0% by weight or more, especially preferably from 25.0 to 37.0% by weight, and most preferably from 30.0 to 37.0% by weight. Preferred examples of the silicone based compound include X-22-174DX, X-22-2426, X-22-164B, X-22-164C, and X-22-1821 (all of which are a trade name of Shin-Etsu Chemical Co., Ltd.); FM-0725, FM-7725, FM-6621, and FM-1121 (all of which are a trade name of Chisso Corporation); and DMS-U22, RMS-033, RMS-083, UMS-182, DMS-H21, DMS-H31, HMS-301, FMS121, FMS123, FMS131, FMS141, and FMS221 (all of which are a trade name of Gelest, Inc.).

As the fluorine based compound which is used as an antifouling agent, compounds containing a fluoroalkyl group are preferable. The subject fluoroalkyl group preferably has from 1 to 20 carbon atoms, and more preferably from 1 to 10 carbon atoms. The fluoroalkyl group may be of a linear structure (for example, $-CF_2CF_3$, $-CH_2(CF_2)_4H$, $-CH_2(CF_2)_8CF_3$, and $-CH_2CH_2(CF_2)_4H$), a branched structure (for example, $CH(CF_3)_2$, $CH_2CF(CF_3)_2$, $CH(CH_3)CF_2CF_3$, and $CH(CH_3)(CF_2)_5CF_2H$), or an alicyclic structure (preferably a 5-membered ring or a 6-membered ring; for example, a perfluorocyclohexyl group, a perfluorocyclopentyl group, and an alkyl group substituted with the preceding group); and may contain an ether bond (for example, $CH_2OCH_2CF_2CF_3$, $CH_2CH_2OCH_2C_4F_8H$, $CH_2CH_2OCH_2CH_2C_8F_{17}$, and $CH_2CH_2OCF_2CF_2OCF_2CF_2H$). Plural fluoroalkyl groups may be contained in the same molecule.

It is preferable that the fluorine based compound further contains a substituent which contributes to the formation of binding to a low refractive index layer film or compatibility therewith. The subject substituent may be the same or different, and it is preferable that plural substituents are contained. Preferred examples of the substituent include an acryloyl group, a methacryloyl group, a vinyl group, an aryl group, a cinnamoyl group, an epoxy group, an oxetanyl group, a hydroxyl group, a polyoxyalkylene group, a carboxyl group, and an amino group. The fluorine based compound may be a polymer or oligomer with a fluorine atom-free compound. Its molecular weight is not particularly limited. Though the fluorine atom content of the fluorine based compound is not particularly limited, it is preferably 20% by weight or more, especially preferably from 30 to 70% by weight, and most preferably from 40 to 70% by weight. Preferred examples of the fluorine based compound include R-2020, M-2020, R-3833, and M-3833 (all of which are a trade name of Daikin Industries, Ltd.); and MEGAFAC F-171, MEGAFAC F-172 and MEGAFAC F-170A, and DEFENSA MCF-300 (all of which are a trade name of Dainippon Ink and Chemical, Incorporated). However, it should not be construed that the invention is limited thereto.

For the purpose of imparting characteristics such as dust removal properties and antistatic properties, dust removing agents or antistatic agents such as known cationic surfactants and polyoxyalkylene based compounds can also be properly added. With respect to such a dust removing agent or antistatic agent, its structural unit may be contained as a part of the function in the foregoing silicone based compound or fluorine based compound. When such a dust removing agent or antistatic agent is added as an additive, it is preferably added in an amount ranging from 0.01 to 20% by weight, more preferably from 0.05 to 10% by weight, and especially preferably from 0.1 to 5% by weight of the whole of solids of the low refractive index layer. Preferred examples of the dust removing agent or antistatic agent include MEGAFAC F-150 (a trade name of Dainippon Ink and Chemicals, Incorporated) and SH-3748 (a trade name of Dow Corning Toray Co., Ltd.). However, it should not be construed that the invention is limited thereto.

1-(14) Surfactant:

In particular, in order to ensure uniformity in surface properties such as coating unevenness, drying unevenness, and point defect, it is preferred that any one or both of a fluorine based surfactant and a silicone based surfactant is contained in a coating composition for forming a photo diffusion layer. In particular, a fluorine based surfactant can be preferably used because it reveals an effect for improving a fault of surface properties such as coating unevenness, drying unevenness, and point defect in a smaller amount of addition. It is possible to increase the productivity by bringing high-speed coating adaptability while increasing the uniformity in surface properties.

Preferred examples of the fluorine based surfactant include fluoro aliphatic group-containing copolymers (sometimes abbreviated as "fluorine based polymer"). As the fluorine based polymer, an acrylic resin or a methacrylic resin which is characterized by containing a repeating unit corresponding to the following monomer (i) or containing a repeating unit corresponding to the following monomer (ii), or a copolymer thereof with a copolymerizable vinyl based monomer is useful.

(i) Fluoro aliphatic group-containing monomer represented by the following formula (a):

Formula (a)

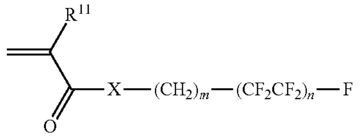

In the formula (a), $R^{11}$ represents a hydrogen atom or a methyl group; X represents an oxygen atom, a sulfur atom, or —N($R^{12}$)—; m represents an integer of 1 or more and not more than 6; and n represents an integer of from 2 to 4. $R^{12}$ represents a hydrogen atom or an alkyl group having from 1 to 4 carbon atoms, specifically a methyl group, an ethyl group, a propyl group or a butyl group, with a hydrogen atom and a methyl group being preferable. X is preferably an oxygen atom.

(ii) Monomer represented by the following formula (b), which is copolymerizable with the monomer of the foregoing (i):

Formula (b)

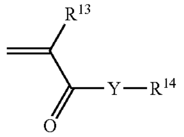

In the formula (b), $R^{13}$ represents a hydrogen atom or a methyl group; Y represents an oxygen atom or a sulfur atom, or —N($R^5$)—; and $R^{15}$ represents a hydrogen atom or an alkyl group having from 1 to 4 carbon atoms, specifically a methyl group, an ethyl group, a propyl group or a butyl group, with a hydrogen atom and a methyl group being preferable. Y is preferably an oxygen atom, —N(H)—, or —N($CH_3$)—.

$R^{14}$ represents an optionally substituted linear, branched or cyclic alkyl group having 4 or more and not more than 20 carbon atoms. Examples of a substituent of the alkyl group represented by $R^{14}$ include a hydroxyl group, an alkylcarbonyl group, an arylcarbonyl group, a carboxyl group, an alkyl ether group, an aryl ether group, a halogen atom (for example, a fluorine atom, a chlorine atom, and a bromine atom), a nitro group, a cyano group, and an amino group. However, it should not be construed that the invention is limited thereto. As the linear, branched or cyclic alkyl group having 4 or more and not more than 20 carbon atoms, there are suitably used a butyl group, a pentyl group, a hexyl group, a heptyl group, an octyl group, a nonyl group, a decyl group, an undecyl group, a dodecyl group, a tridecyl group, a tetradecyl group, a pentadecyl group, an octadeyl group, and an eicosanyl group, each of which may be linear or branched; monocyclic cycloalkyl groups such as a cyclohexyl group and a cycloheptyl group; and polycyclic cycloalkyl groups such as a bicycloheptyl group, a bicyclodecyl group, a tricycloundecyl group, a tetracyclododecyl group, an adamantyl group, a norbornyl group, and a tetracyclodecyl group.

The amount of the fluoro aliphatic group-containing monomer represented by the formula (a) which is used in the fluorine based polymer to be used in the invention is in the range of 10% by mole or more, preferably from 15 to 70% by mole, and more preferably from 20 to 60% by mole based on each of the monomers of the fluorine based polymer.

The fluorine based polymer which is used in the invention preferably has a weight average molecular weight of from 3,000 to 100,000, and more preferably from 5,000 to 80,000.

In addition, the amount of addition of the fluorine based polymer which is used in the invention is preferably in the range of from 0.001 to 5% by weight, more preferably in the range of from 0.005 to 3% by weight, and further preferably in the range of from 0.01 to 1% by weight based on the coating solution. When the amount of addition of the fluorine based polymer is less than 0.001% by weight, the effect is insufficient, whereas when it exceeds 5% by weight, drying of the film is not sufficiently carried out, and the performance (for example, reflectance and scar resistance) as the film is adversely affected.

1-(15) Thickener:

In the film of the invention, a thickener may be used for the purpose of adjusting the viscosity of the coating solution.

Especially, for the hard coat layer containing scattering particles, it is preferable to add a thickener. By increasing the viscosity, the speed of surfacing or downwelling of the scattering particles can be lowered. The "thickener" as referred to herein means a substance capable of increasing the viscosity of the solution by the addition thereof. A degree of the increase of the viscosity of the coating solution by the addition of the thickener is preferably from 0.05 to 50 cP (mPa·s), more preferably from 0.10 to 20 cP (mPa·s), and most preferably from 0.10 to 10 cP (mPa·s).

Examples of such a thickener will be given below, but it should not be construed that the invention is limited thereto.

Poly-ϵ-caprolactone
Poly-ϵ-caprolactone diol
Poly-ϵ-caprolactone triol
Polyvinyl acetate
Poly(ethylene adipate)
Poly(1,4-butylene adipate)
Poly(1,4-butylene glutarate)
Poly(1,4-butylene succinate)
Poly(1,4-butylene terephthalate)
Poly(ethylene terephthalate)
Poly(2-methyl-1,3-propylene adipate)
Poly(2-methyl-1,3-propylene glutarate)
Poly(neopentyl glycol adipate)
Poly(neopentyl glycol sebacate)
Poly(1,3-propylene adipate)
Poly(1,3-propylene glutarate)
Polyvinyl butyral
Polyvinyl formal
Polyvinyl acetal
Polyvinyl propanal
Polyvinyl hexanal
Polyvinylpyrrolidone
Polyacrylic esters
Polymethacrylic esters
Cellulose acetate
Cellulose propionate
Cellulose acetate butyrate Besides, there can also be used known viscosity adjusters and thixotropic agents such as smectite, fluorotetrasilicomica, bentonite, silica, montmorillonite, and poly-(sodium acrylate) as described in JP-A-8-325491; and ethyl cellulose, polyacrylic acid, and organic clays as described in JP-A-10-219136.

1-(16) Coating Solvent:

As a solvent which is used in a coating composition for forming each of the layers of the invention, a variety of solvents which are selected from the viewpoints that each component can be dissolved or dispersed therein; that uniform surface properties are liable to be obtained in a coating step and a drying step; that liquid preservability can be ensured; and that they have a proper saturated vapor pressure can be used.

A mixture of two or more kinds of solvents can be used. In particular, it is preferable from the viewpoint of a drying load that a solvent having a boiling point of not higher than 100° C. at room temperature under atmospheric pressure is used as the major component, whereas a small amount of a solvent having a boiling point of 100° C. or higher is contained for the purpose of adjusting the drying speed.

Examples of the solvent having a boiling point of not higher than 100° C. include hydrocarbons such as hexane (boiling point: 68.7° C.), heptane (boiling point: 98.4° C.), cyclohexane (boiling point: 80.7° C.), and benzene (boiling point: 80.1° C.); halogenated hydrocarbons such as dichloromethane (boiling point: 39.8° C.), chloroform (boiling point: 61.2° C.), carbon tetrachloride (boiling point: 76.8° C.), 1,2-dichloroethane (boiling point: 83.5° C.), and trichloroethylene (boiling point: 87.2° C.); ethers such as diethyl ether (boiling point: 34.6° C.), diisopropyl ether (boiling point: 68.5° C.), dipropyl ether (boiling point: 90.5° C.), and tetrahydrofuran (boiling point: 66° C.); esters such as ethyl formate (boiling point: 54.2° C.), methyl acetate (boiling point: 57.8° C.), ethyl acetate (boiling point: 77.1° C.), and isopropyl acetate (boiling point: 89° C.); ketones such as acetone (boiling point: 56.1° C.) and 2-butanone (the same as methyl ethyl ketone, boiling point: 79.6° C.); alcohols such as methanol (boiling point: 64.5° C.), ethanol (boiling point: 78.3° C.), 2-propnaol (boiling point: 82.4° C.), and 1-propanol (boiling point: 97.2° C.); cyano compounds such as acetonitrile (boiling point: 81.6° C.) and propionitrile (boiling point: 97.4° C.); and carbon disulfide (boiling point: 46.2° C.). Of these, ketones and esters are preferable; and ketones are especially preferable. Among the ketones, 2-butanol is especially preferable.

Examples of the solvent having a boiling point of 100° C. or higher include octane (boiling point: 125.7° C.), toluene (boiling point: 110.6° C.), xylene (boiling point: 138° C.), tetrachloroethylene (boiling point: 121.2° C.), chlorobenzene (boiling point: 131.7° C.), dioxane (boiling point: 101.3° C.), dibutyl ether (boiling point: 142.4° C.), isobutyl acetate (boiling point: 118° C.), cyclohexanone (boiling point: 155.7° C.), 2-methyl-4-pentanone (the same as MIBK, boiling point: 115.9° C.), 1-butanol (boiling point: 117.7° C.), N,N-dimethylformamide (boiling point: 153° C.), N,N-dimethylacetamide (boiling point: 166° C.), and dimethyl sulfoxide (boiling point: 189° C.). Of these, cyclohexanone and 2-methyl-4-pentanone are preferable.

1-(17) Others:

In addition to the foregoing components, a resin, a coupling agent, a coloration preventing agent, a coloring agent (for example, pigments and dyes), a defoaming agent, a leveling agent, a flame retarder, an ultraviolet ray absorber, an infrared ray absorber, an adhesion imparting agent, a polymerization inhibitor, an antioxidant, a surface modifier, and so on can also be added in the film of the invention.

1-(18) Support:

A support of the film of the invention is not particularly limited, and examples thereof include a transparent resin film, a transparent resin plate, a transparent resin sheet, and a transparent glass. Examples of the transparent resin film include a cellulose acylate film (for example, a cellulose triacetate film (refractive index: 1.48), a cellulose diacetate film, a cellulose acetate butyrate film, and a cellulose acetate propionate film), a polyethylene terephthalate film, a polyethersulfone film, a polyacrylic resin film, a polyurethane based film, a polyester film, a polycarbonate film, a polysulfone film, a polyether film, a polymethylpentene film, a polyether ketone film, and a (meth)acrylonitrile film.

<Cellulose Acylate Film>

Above all, a cellulose acylate film which is high in transparency, low in optical birefringence and easy for manufacturing and which is generally used as a protective film of polarizing plate is preferable, and a cellulose triacetate film is especially preferable. Furthermore, the thickness of the transparent support is usually from about 25 μm to 1,000 μm.

In the invention, it is preferred to use cellulose acetate having a degree of acetylation of from 59.0 to 61.5% for the cellulose acylate film.

The "degree of acetylation" as referred to herein means an amount of bound acetic acid per cellulose unit weight. The degree of acetylation complies with the measurement and calculation in ASTM D-817-91 (test methods of testing cellulose acetate and so on).

The cellulose acylate preferably has a viscosity average degree of polymerization (DP) of 250 or more, and more preferably 290 or more.

Furthermore, it is preferable that the cellulose acylate which is used in the invention has a value of Mw/Mn (wherein Mw represents a weight average molecular weight, and Mn represents a number average molecular weight), as measured by gel permeation chromatography, close to 1.0, in another word, the molecular weight distribution is narrow. Concretely, the Mw/Mn value is preferably from 1.0 to 1.7, more preferably from 1.3 to 1.65, and most preferably from 1.4 to 1.6.

In general, it is not the case that the hydroxyl groups at the 2-, 3- and 6-positions of the cellulose acylate are equally distributed at every ⅓ of the entire degree of substitution, but the degree of substitution of the hydroxyl group at the 6-position tends to become small. In the invention, it is preferable that the degree of substitution of the hydroxyl group at the 6-position of the cellulose acylate is larger than that at the 2- or 3-position.

The hydroxyl group at the position is preferably substituted with an acyl group in a proportion of 32% or more, more preferably 33% or more, and especially preferably 34% or more of the entire degree of substitution. In addition, it is preferable that the degree of substitution of the acyl group at the 6-position of the cellulose acylate is 0.88 or more. The hydroxyl group at the 6-position may be substituted with an acyl group having 3 or more carbon atoms other than the acetyl group (for example, a propionyl group, a butyroyl group, a valeroyl group, a benzoyl group, and an acryloyl group). The measurement of the degree of substitution at each position can be determined by NMR.

In the invention, cellulose acetate as obtained by methods as described in JP-A-11-5851, paragraphs [0043] to [0044], [Examples] [Synthesis Example 1], paragraphs [0048] to [0049], [Synthesis Example 2] and paragraphs [0051] to [0052], [Synthesis Example 3] can be used as the cellulose acylate.

<Polyethylene Terephthalate film>

In the invention, a polyethylene terephthalate film is preferably used, too because not only it is excellent in all of transparency, mechanical strength, flatness, chemical resistance and humidity resistance, but also it is cheap.

For the purpose of more improving the adhesive strength of the transparent plastic film and the hard coat layer to be provided thereon, it is more preferable that the transparent plastic film is subjected to an easy adhesion treatment.

As a commercially available optical easy-adhesion layer-provided PET film, there are enumerated COSMOSHINE A4100 and A4300, as manufactured by Toyobo Co., Ltd.

2. Layers Constituting the Antireflection Film:

The antireflection film of the invention is obtained by mixing and coating the foregoing respective layer constitutional components on the foregoing support. Next, the layers which constitute the antireflection film of the invention will be described.

2-(1) Antiglare Layer:

An antiglare layer is formed for the purpose of imparting antiglare properties due to surface scattering as defined in the invention, and preferably hard coat properties for improving the scar resistance of the film to the film.

As a method of forming the antiglare layer, there are known a method of forming an antiglare layer by laminating a matlike shaping film having fine irregularities on the surface thereof as described in JP-A-6-16851; a method of forming an antiglare layer by hardening and shrinking an ionizing radiation hardenable resin due to a difference of an ionizing radiation dose as described in JP-A-2000-206317; a method of forming an antiglare layer by solidifying a translucent fine particle and a translucent resin while gelling by utilizing a reduction of the weight ratio of a good solvent against the translucent resin upon drying, thereby forming irregularities on the film surface as described in JP-A-2000-338310; and a method of forming an antiglare layer by imparting surface irregularities by a pressure from the outside as described in JP-A-2000-275404. These known methods can be utilized.

In the antiglare layer which can be used in the invention, it is preferable that a binder capable of imparting hard coat properties, a translucent particle for imparting antiglare properties and a solvent are contained as essential components and that surface irregularities are formed by projections of the translucent particle itself or projections formed by an agglomerate of plural particles.

The antiglare layer formed by dispersing a mat particle is made of a binder and a translucent particle as dispersed in the binder. It is preferable that the antiglare layer having antiglare properties has both antiglare properties and hard coat properties.

Specific examples of the mat particle which is suitably used include particles of an inorganic compound such as a silica particle and a $TiO_2$ particle; and resin particles such as an acrylic resin particle, a crosslinked acrylic resin particle, a polystyrene particle, a crosslinked styrene resin particle, a melamine resin particle, and a benzoguanamine resin particle. Of these, a crosslinked styrene resin particle, a crosslinked acrylic resin particle, and a silica particle are preferable.

The shape of the mat particle which can be employed may be either spherical or amorphous.

The particle size distribution of the mat particle is measured by a Coulter counter method, and the measured distribution is reduced into particle number distribution.

By adjusting a refractive index of the translucent resin in conformity with the refractive index of each translucent particle selected among these particles, it is possible to attain the internal haze and surface haze of the invention. Concretely, a combination of a translucent resin composed of, as the major component, a trifunctional or polyfunctional (meth)acrylate monomer (refractive index after hardening: 1.55 to 1.70) which is preferably used in the antiglare layer of the invention as described later and a translucent particle made of a crosslinked poly(meth)acrylate polymer having a styrene content of from 50 to 100% by weight and/or a benzoquanamine particle is preferable; and a combination of the foregoing translucent resin and a translucent particle made of a crosslinked poly(styrene-acrylate) copolymer having a styrene content of from 50 to 100% by weight (refractive index: 1.54 to 1.59) is especially preferable.

It is preferable that the translucent particle is blended such that it is contained in an amount of from 3 to 30% by weight in the whole of solids of the antiglare layer in the formed antiglare layer. The amount of the translucent particle is more preferably from 5 to 20% by weight. When the amount of the translucent particle is less than 3% by weight, the antiglare properties are insufficient, whereas when it exceeds 30% by weight, problems such as blurring of an image, cloudiness of surface, and glare are caused.

Furthermore, the translucent particle preferably has a density of from 10 to 1,000 $mg/m^2$, and more preferably from 100 to 700 $mg/m^2$.

Furthermore, an absolute value of a difference between the refractive index of the translucent resin and the refractive index of the translucent particle is preferably not more than 0.04. The absolute value of a difference between the refractive index of the translucent resin and the refractive index of the translucent particle is more preferably from 0.001 to 0.030, further preferably from 0.001 to 0.020, and especially preferably from 0.001 to 0.015. When this difference exceeds 0.040, there are caused problems such as blurring of film letters, lowering of dark room contrast, and cloudiness of surface.

Here, the refractive index of the foregoing translucent resin can be quantitatively determined and evaluated by, for example, direct measurement by an Abbe's refractometer or measurement of a spectral reflection spectrum or spectral ellipsometry. The refractive index of the foregoing translucent particle is measured by dispersing an equivalent amount of the translucent particle in a solvent having a varied refractive index by varying a mixing ratio of two kinds of solvents having a different refractive index to measure a turbidity and measuring a refractive index of the solvent at which the turbidity becomes minimum by an Abbe's refractometer.

Furthermore, two or more kinds of mat particles having a different particle size may be used together. It is possible to impart antiglare properties by a mat particle having a larger particle size and to impart other optical characteristics by a mat particle having a smaller particle size, respectively. For example, in the case where an antiglare antireflection film is stuck onto a high definition display with 133 ppi or more, a fault on display image quality which is called "glare" may possibly be caused. The "glare" is derived from the matter that pixels are enlarged or shrunk by irregularities present on the surface of the antiglare antireflection film so that uniformity of luminance is lost. It is possible to largely improve the glare by using a mat particle having a smaller particle size than the mat particle capable of imparting the antiglare properties and having a different refractive index from the binder together.

The thickness of the antiglare layer is preferably from 1 to 10 μm, and more preferably from 1.2 to 8 μm. When the antiglare layer is too thin, hard properties are insufficient, whereas when it is too thick, curl or brittleness is deteriorated so that processing adaptability may possibly be lowered. Thus, it is preferable that the thickness of the antiglare layer falls within the foregoing range.

On the other hand, the center line mean roughness (Ra) of the antiglare layer is preferably in the range of from 0. 10 to 0.40 μm. When the center line mean roughness (Ra) of the antiglare layer exceeds 0.40 μm, problems such as whitening of surface are caused when glare or external light is reflected. Furthermore, a value of transmitted image sharpness is preferably from 5 to 60%.

The strength of the antiglare layer is preferably H or more, more preferably 2H or more, and most preferably 3H or more by a pencil hardness test.

2-(2) Hard Coat Layer:

For the purpose of imparting a physical strength to the film, in addition to the antiglare layer, a hard coat layer can be provided in the film of the invention.

Preferably, a low refractive index layer is provided thereon; and more preferably, a middle refractive index layer and a high refractive index layer are provided between the hard coat layer and the low refractive index layer, thereby constituting an antireflection film.

The hard coat layer may be constituted by stacking of two or more layers.

In the invention, according to an optical design for obtaining an antireflection film, the hard coat layer preferably has a refractive index in the range of from 1.48 to 2.00, more preferably from 1.52 to 1.90, and further preferably from 1.55 to 1.80. In the invention, since at least one low refractive index layer is present on the hard coat layer, when the refractive index is excessively low as compared with this range, the antireflection properties are lowered, whereas when it is excessively high, a color taste of the reflected light tends to become strong.

From the viewpoint of imparting sufficient durability and impact resistance to the film, the thickness of the hard coat layer is usually from about 0.5 μm to 50 μm, preferably from 1 μm to 20 μm, more preferably from 2 μm to 10 μm, and most preferably from 3 μm to 7 μm.

Furthermore, the strength of the hard coat layer is preferably H or more, more preferably 2H or more, and most preferably 3H or more by a pencil hardness test.

In addition, it is preferable that an abrasion amount of a specimen before and after the test is small as far as possible in a taber test according to JIS K5400.

It is preferable that the hard coat layer is formed by a crosslinking reaction or polymerization reaction of an ionizing radiation hardenable compound. For example, it is possible to form the hard coat layer by coating a coating composition containing an ionizing radiation hardenable polyfunctional monomer or polyfunctional oligomer on a transparent support and subjecting the polyfunctional monomer or polyfunctional oligomer to a crosslinking reaction or polymerization reaction.

As a functional group of the ionizing radiation hardenable polyfunctional monomer or polyfunctional oligomer, a photopolymerizable functional group, an electron beam polymerizable functional group, and a radiation polymerizable functional group are preferable, with a photopolymerizable functional group being especially preferable.

Examples of the photopolymerizable functional group include unsaturated polymerizable functional groups such as a (meth)acryloyl group, a vinyl group, a styryl group, and an allyl group, with a (meth)acryloyl group being preferable.

For the purpose of imparting internal scattering properties, a mat particle having an average particle size of from 1.0 to 10.0 μm, and preferably from 1.5 to 7.0 μm, for example, a particle of an inorganic compound or a resin particle may be contained in the hard coat layer.

For the purpose of controlling the refractive index of the hard coat layer, a high refractive index monomer or an inorganic particle or the both can be added in a binder of the hard coat layer. The inorganic particle has an effect for suppressing hardening and shrinkage due to the crosslinking reaction in addition to the effect for controlling the refractive index. In the invention, it is called a binder including a polymer as formed by polymerization of the foregoing polyfunctional monomer and/or high refractive index monomer, etc. and an inorganic particle as dispersed therein after the formation of the hard coat layer.

For the purpose of holding the image sharpness, it is preferred to adjust the transmitted image sharpness in addition to the adjustment of the irregular shape of the surface. A clear antireflection film preferably has a transmitted image sharpness of 60% or more. The transmitted image sharpness is in general an index to show a blurring state of an image which is transmitted through the film and projected. The larger this value, the better the sharpness of the image as seen through the film is. The transmitted image sharpness is preferably 70% or more, and more preferably 80% or more.

2-(3) High Refractive Index Layer and Middle Refractive Index Layer:

In the film of the invention, the antireflection properties can be enhanced by providing a high refractive index layer and a middle refractive index layer.

In this specification, the high refractive index layer and the middle refractive index layer will be sometimes named generically as a high refractive index layer. Incidentally, in the invention, the terms "high", "middle" and "low" of the high refractive index layer, middle refractive index layer and low refractive index layer express a relative large and small relation mutually among the layers. Furthermore, so far as the relation with the transparent support is concerned, it is preferable that the refractive index is satisfied with the relationships of [(transparent support)>(low refractive index layer)] and [(high refractive index layer)>(transparent support)].

Furthermore, in this specification, the high refractive index layer, the middle refractive index layer and the low refractive index layer will be sometimes named generically as an antireflection layer.

For the purpose of constructing a low refractive index layer on a high refractive index layer to prepare an antireflection film, the high refractive index layer preferably has a refractive index of from 1.55 to 2.40, more preferably from 1.60 to 2.20, further preferably from 1.65 to 2.10, and most preferably from 1.80 to 2.00.

In the case where a middle refractive index layer, a high refractive index layer and a low refractive index layer are coated and provided in this order on a support to prepare an antireflection film, the high refractive index layer preferably has a refractive index of from 1.65 to 2.40, and more preferably from 1.70 to 2.20. The refractive index of the middle refractive index layer is adjusted so as to have a value between a refractive index of the low refractive index layer and a refractive index of the high refractive index layer. The refractive index of the middle refractive index layer is preferably from 1.55 to 1.80.

An inorganic particle composed of, as the major component, $TiO_2$ which is used in the high refractive index layer and the middle refractive index layer is used in a state of dispersion for the formation of the high refractive index layer and the middle refractive index layer.

In dispersing the inorganic particle, the inorganic particle is dispersed in a dispersion medium in the presence of a dispersant.

It is preferable that the high refractive index layer and the middle refractive index layer which are used in the invention are preferably formed by further adding a binder precursor necessary for the formation of a matrix (for example, an ionizing radiation hardenable polyfunctional monomer or polyfunctional oligomer as described later), a photopolymerization initiator, and the like in a dispersion having an inorganic particle dispersed in a dispersion medium, thereby preparing a coating composition for forming a high refractive index layer and a coating composition for forming a middle refractive index layer, coating the coating composition for forming a high refractive index layer and the coating composition for forming a middle refractive index layer on a transparent support, and then hardening them by a crosslinking reaction or polymerization reaction of an ionizing radiation hardenable compound (for example, a polyfunctional monomer and a polyfunctional oligomer).

In addition, it is preferable that the binder of the high refractive index layer and the binder of the middle refractive index are subjected to a crosslinking reaction or polymerization reaction with the dispersant at the same time of or after coating the layers.

In the thus prepared binder of the high refractive index layer and binder of the middle refractive index, for example, the foregoing preferred dispersant and ionizing radiation hardenable polyfunctional monomer or polyfunctional oligomer undergo a crosslinking reaction or polymerization reaction, whereby an anionic group of the dispersant is taken into each of the binders. In addition, in each of the binder of the high refractive index layer and the binder of the middle refractive index, the anionic group has a function to hold a dispersed state of the inorganic particle, and the crosslinking or polymerization structure imparts a film forming ability to the binder, thereby improving the physical strength, chemical resistance and weather resistance of the high refractive index layer and the middle refractive index layer each containing an inorganic particle.

The binder of the high refractive index layer is added in an amount of from 5 to 80% by weight based on the solids content of the coating composition of the subject layer.

The content of the inorganic particle in the high refractive index layer is preferably from 10 to 90% by weight, more preferably from 15 to 80% by weight, and especially preferably from 15 to 75% by weight based on the weight of the high refractive index layer. Two or more kinds of inorganic particles may be used together within the high refractive index layer.

In the case where the low refractive index layer is present on the high refractive index layer, it is preferable that the refractive index of the high refractive index layer is higher than the refractive index of the transparent support.

In the high refractive index layer, a binder which is obtainable by a crosslinking or polymerization reaction, such as aromatic ring-containing ionizing radiation hardenable compounds, ionizing radiation hardenable compounds containing a halogen atom other than fluorine (for example, Br, I and Cl), and ionizing radiation hardenable compounds containing an atom such as S, N and P can also be preferably used.

The thickness of the high refractive index layer can be adequately designed depending upon the application. In the case where the high refractive index layer is used as an optical interference layer as described later, its thickness is preferably from 30 to 200 nm, more preferably from 50 to 170 nm, and especially preferably from 60 to 150 nm.

In the case where the high refractive index layer does not contain a particle capable of imparting an antiglare function, it is preferable that a haze of the high refractive index layer is low as far as possible. The haze is preferably not more than 5%, more preferably not more than 3%, and especially preferably not more than 1%.

It is preferable that the high refractive index layer is constructed on the foregoing transparent support directly or via other layer.

2-(4) Low Refractive Index Layer:

In order to lower the reflectance of the film of the invention, it is required to use a low refractive index layer.

The low refractive index layer preferably has a refractive index of from 1.20 to 1.46, more preferably from 1.25 to 1.46, and especially preferably from 1.30 to 1.46.

The low refractive index layer preferably has a thickness of from 50 to 200 nm, and more preferably from 70 to 100 nm. The low refractive index layer preferably has a haze of not more than 3%, more preferably not more than 2%, and most preferably not more than 1%. Concretely, the low refractive index layer preferably has a strength of H or more, more preferably 2H or more, and most preferably 3H or more by a pencil hardness test with a load of 500 g.

Furthermore, in order to improve an antifouling performance of an optical film, a contact angle against water on the surface is preferably 90° or more, more preferably 95° or more, and especially preferably 100° or more.

It is preferable that the foregoing hardenable composition contains (A) the foregoing fluorine-containing polymer, (B) the inorganic particle, and (C) the organosilane compound.

For the purpose of dispersing and fixing the fine particle of the invention, a binder is used in the low refractive index layer. Though the binder as described previously in the hard coat layer can be used as the binder, it is preferred to use a fluorine-containing polymer or a fluorine-containing sol-gel raw material having a low refractive index of the binder by itself. The fluorine-containing polymer or fluorine-containing sol-gel is preferably a raw material which is crosslinked by heat or ionizing radiations and in which the surface of the formed low refractive index layer has a dynamic friction coefficient of from 0.03 to 0.30 and a contact angle against water of from 85 to 120°.

2-(5) Antistatic Layer and Conductive Layer:

In the invention, it is preferred from the standpoint of destaticization on the film surface to provide an antistatic layer. Examples of a method of forming an antistatic layer include conventionally known methods such as a method of coating a conductive coating solution containing a conductive fine particle and a reactive hardenable resin and a method of forming a conductive thin film by vapor deposition or sputtering of a metal or metal oxide capable of forming a transparent film or the like. The conductive layer can be formed on the support directly or via a primer layer capable of strengthening adhesion to the support. Furthermore, the antistatic layer can be used as a part of the antireflection film. In this case, in the case where the antistatic layer is used in a layer close to the outermost layer, even when the film is thin, it is possible to sufficiently obtain antistatic properties.

The antistatic layer preferably has a thickness of from 0.01 to 10 μm, more preferably from 0.03 to 7 μm, and further preferably from 0.05 to 5 μm. The antistatic layer preferably has a surface resistivity of from $10^5$ to $10^{12}$ Ω/sq, more preferably from $10^5$ to $10^9$ Ω/sq, and most preferably from $10^5$ to $10^8$ Ω/sq. The surface resistivity can be measured by a four probe method.

It is preferable that the antistatic layer is substantially transparent. Concretely, the antistatic layer preferably a haze of not more than 10%, more preferably not more than 5%, further preferably not more than 3%, and most preferably not more than 1%. The antistatic layer preferably has a transmittance against light having a wavelength of 550 nm of 50% or more, more preferably 60% or more, further preferably 65% or more, and most preferably 70% or more.

The antistatic layer of the invention is excellent in strength. Concretely, the antistatic layer preferably has a strength of H or more, more preferably 2H or more, further preferably 3H or more, and most preferably 4H or more in terms of a pencil hardness with a load of 1 kg.

2-(6) Antifouling Layer:

It is possible to provide an antifouling layer on the outermost surface of the invention. The antifouling layer decreases surface energy of the antireflection layer, thereby making hydrophilic or oleophilic stains hardly attach.

The antifouling layer can be formed by using a fluorine-containing polymer or an antifouling agent.

The antifouling layer preferably has a thickness of from 2 to 100 nm, and more preferably from 5 to 30 nm.

2-(7) Layer for Preventing Interference Unevenness (Spectral Unevenness):

In the case where there is a substantial difference in refractive index between the transparent support and the hard coat layer or between the transparent support and the antiglare layer (the difference in refractive index is 0.3 or more), reflected light is generated on the interface between the transparent support and the hard coat layer or between the transparent support and the antiglare layer. This reflected light may possibly interfere with reflected light on the surface of the antireflection layer, thereby generating interference unevenness as caused due to delicate unevenness in thickness of the hard coat layer (or the antiglare layer). In order to prevent such interference unevenness, for example, a layer for preventing interference unevenness, which has a middle refractive index np and whose thickness $d_p$ is satisfied with the following expression, can also be provided between the transparent support and the hard coat layer (or the antiglare layer).

$$d_p=(2N-1)\times\lambda/(4n_p) \qquad \text{Numerical Expression } (d_p)$$

In the foregoing expression, λ represents a wavelength of visible light and is any value in the range of from 450 to 650 nm; and N represents a natural number.

Furthermore, when the antireflection film is stuck onto an image display, etc., there may be the case where a pressure sensitive adhesive layer (or an adhesive layer) is stacked in the side of the transparent support on which the antireflection layer is not stacked. In such an embodiment, when there is a substantial difference in refractive index (0.3 or more) between the transparent support and the pressure sensitive adhesive layer (or the adhesive layer), there may be the case where reflected light is generated between the transparent support and the pressure sensitive adhesive layer (or the adhesive layer), and this reflected light interferes with reflected light on the surface of the antireflection layer or the like, thereby generating interference unevenness as caused due to unevenness in thickness of the support or the hard coat layer likewise the foregoing case. For the purpose of preventing such interference unevenness, a layer for preventing interference unevenness similar to the foregoing layer for preventing interference unevenness can be provided in the side of the transparent support on which the antireflection layer is not stacked.

Incidentally, such a layer for preventing interference unevenness is described in detail in JP-A-2004-345333, and the layer for preventing interference unevenness as presented in this patent document can also be employed in the invention.

2-(8) Easy Adhesion Layer:

An easy adhesion layer can be coated and provided in the film of the invention. The "easy adhesive layer" as referred to herein means, for example, a layer capable of imparting a function to make the protective film for polarizing plate and its adjacent layer, or the hard coat layer and the support easy adhere to each other.

Examples of the easy adhesion treatment include a treatment for providing an easy adhesion layer on a transparent plastic film by an easy adhesive made of a polyester, an acrylic ester, a polyurethane, a polyethyleneimine, a silane coupling agent, or the like.

Examples of the easy adhesion layer which is preferably used in this technology include a layer containing a polymer compound containing a —COOM group (wherein M represents a hydrogen atom or a cation). A more preferred embodiment is concerned with one in which a layer containing a —COOM group-containing polymer compound is provided in the side of the film substrate and a layer containing, as the major component, a hydrophilic polymer compound is provided adjacent thereto in the side of a polarizing film. Examples of the —COOM group-containing polymer compound as referred to herein include a —COOM group-containing styrene-maleic acid copolymer and a —COOM group-containing vinyl acetate-maleic acid copolymer or vinyl acetate-maleic acid-maleic anhydride copolymer. It is especially preferred to use a —COOM group-containing vinyl acetate-maleic acid copolymer. Such a polymer compound is used singly or in admixture of two or more kinds thereof, and its weight average molecular weight is preferably from about 500 to 500,000. As an especially preferred example of the —COOM group-containing polymer compound, those as described in JP-A-6-094915 and JP-A-7-333436 are suitably used.

Furthermore, preferred examples of the hydrophilic polymer compound include hydrophilic cellulose derivatives (for example, methyl cellulose, carboxymethyl cellulose, and hydroxycellulose), polyvinyl alcohol derivatives (for example, polyvinyl alcohol, a vinyl acetate-vinyl alcohol copolymer, polyvinyl acetal, polyvinyl formal, and polyvinyl benzal), natural polymer compounds (for example, gelatin, casein, and gum arabi), hydrophilic polyester derivatives (for example, partially sulfonated polyethylene terephthalate), and hydrophilic polyvinyl derivatives (for example, poly-N-vinylpyrrolidone, polyacrylamide, polyvinyl indazole, and polyvinyl pyrazole). Such a hydrophilic polymer compound is used singly or in admixture of two or more kinds thereof.

The easy adhesion layer preferably has a thickness in the range of from 0.05 to 1.0 μm. When the thickness of the easy adhesion layer is less than 0.05 μm, sufficient adhesion is hardly obtained, whereas when it exceeds 1.0 μm, an adhesion effect is saturated.

2-(9) Anticurl Layer:

It is possible to subject the film of this technology to anticurl processing. The "anticurl processing" as referred to herein is to impart a function to roll up the surface to which the anticurl processing has been applied inwardly. By applying this processing, in applying some surface processing onto one surface of a transparent resin film, thereby applying surface processing with different degree and type to the both surfaces, it works to prevent a phenomenon in which the subject surface is curled inwardly from occurring.

There are enumerated an embodiment in which an anticurl layer is provided in a side of a substrate opposite to the side in which the antiglare layer or antireflection layer is provided; an embodiment in which an easy adhesion layer is coated and provided on one surface of a transparent resin film; and an embodiment in which anticurl processing is applied onto the opposite surface.

Specific examples of the anticurl processing include coating with a solvent and coating and providing a transparent resin layer made of a solvent and cellulose triacetate, cellulose diacetate, cellulose acetate propionate, or the like. Concretely, a method using a solvent as referred to herein is carried out by coating a composition containing a solvent capable of dissolving or swelling therein a cellulose acylate film which is used as a protective film for polarizing plate. Accordingly, as a coating solution of the layer having a function to prevent curl from occurring, one containing a ketone based or ester based organic solvent is preferable. Preferred examples of the ketone based organic solvent include acetone, methyl ethyl ketone, methyl isobutyl ketone, cyclohexanone, ethyl lactate, acetylacetone, diacetone alcohol, isophorone, ethyl n-butyl ketone, diisopropyl ketone, diethyl ketone, di-n-propyl ketone, methyl cyclohexanone, methyl n-butyl ketone, methyl n-propyl ketone, methyl n-hexyl ketone, and methyl n-heptyl ketone; and preferred examples of the ester based organic solvent include methyl acetate, ethyl acetate, butyl acetate, methyl lactate, and ethyl lactate. However, there may be the case where, in addition to a mixture of a solvent capable of dissolving a cellulose acylate film therein and/or a solvent capable of swelling a cellulose acylate film therein, a solvent which does not dissolve a cellulose acylate film therein is contained as the solvent to be used. The anticurl processing is carried out by using a composition obtained by mixing these solvents in a proper proportion depending upon the curl degree of the transparent resin film and the kind of the resin in a coating amount. Besides, the anticurl function is also revealed by applying transparent hard processing or antistatic processing.

2-(10) Water Absorbing Layer:

A water absorbing agent can be used in the film of the invention. The water absorbing agent can be selected among compounds having a water absorbing function while centering an alkaline earth metal. Examples thereof include BaO, SrO, CaO, and MgO. In addition, the water absorbing agent can also be selected among metal elements such as Ti, Mg, Ba, and Ca. A particle size of such an absorbing agent particle is preferably not more than 100 nm, and more preferably not more than 50 nm.

The layer containing such a water absorbing agent may be prepared by employing a vacuum vapor deposition method likewise the foregoing barrier layer, or a nano particle may be prepared by a variety of methods. The thickness of the layer is preferably from 1 to 100 nm, and more preferably from 1 to 10 nm. The water absorbing agent-containing layer may be added between a support and a stack (a stack of a barrier layer and an organic layer), in the uppermost layer of a stack, between stacks, or an organic layer or a barrier layer in a stack. In the case of adding in a barrier layer, it is preferred to employ a co-vapor deposition method.

2-(11) Primer Layer or Inorganic Thin Film Layer:

In the film of the invention, it is possible to enhance gas barrier properties by placing a known primer layer or inorganic thin film layer between the support and the stack.

For the primer layer, for example, an acrylic resin, an epoxy resin, a urethane resin, and a silicone resin can be used. However, in the invention, an organic/inorganic hybrid layer is preferable as this primer layer. Furthermore, an inorganic vapor deposition layer or a minute inorganic coating thin film by a sol-gel method is preferable as the inorganic thin film layer. The inorganic vapor deposition layer can be formed by a vacuum vapor deposition method, a sputtering method, or the like.

3. Layer Configuration of Film:

With respect to the film of the invention, known layer configurations using the foregoing layers can be employed. Representative examples thereof will be given below.

(a) Support/hard coat layer (b) Support/hard coat layer/low refractive index layer (see FIG. 1)

Figure 2:
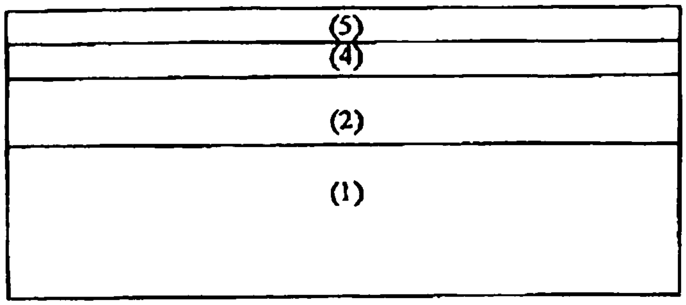
FIG. 2 is an outline cross-sectional view to schematically show a preferred embodiment of the film of the invention.

(c) Support/hard coat layer/high refractive index layer/low refractive index layer (see FIG. 2)

Figure 3:
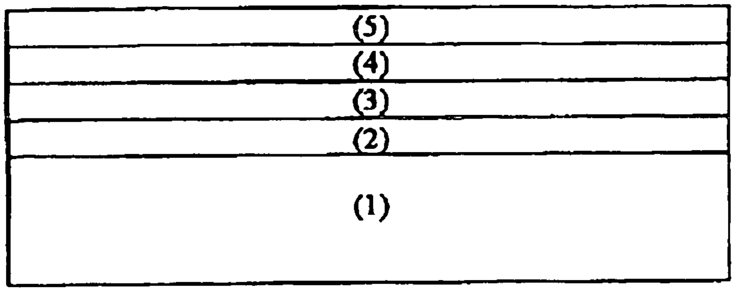
FIG. 3 is an outline cross-sectional view to schematically show a preferred embodiment of the film of the invention.

(d) Support/hard coat layer/middle refractive index layer/high refractive index layer/low refractive index layer (see FIG. 3)

As in (b) (FIG. 1), by stacking a low refractive index layer (5) on a hard coat layer (2) having been coated on a support (1), it is possible to suitably use the stack as the anti-reflection film. By forming the low refractive index layer (5) in a thickness of approximately ¼ of the wavelength of light on the hard coat layer (2), it is possible to reduce the surface reflection due to a principle of thin film interference.

Furthermore, as in (c) (FIG. 2), by stacking a high refractive index layer (4) and a low refractive index layer (5) on a hard coat layer (2) having been coated on a support (1), it is also possible to suitably use the stack as the antireflection film. In addition, as in (d) (FIG. 3), by placing a layer configuration of a support (1), a hard coat layer (2), a middle refractive index layer (3), a high refractive index layer (4), and a low refractive index layer (5) in this order, it is possible to keep a reflectance at not higher than 1%.

Figure 4:
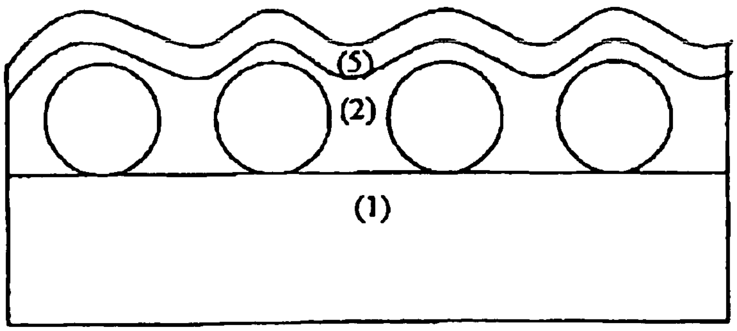
FIG. 4 is an outline cross-sectional view to schematically show a preferred embodiment of the film of the invention.
Figure 5:
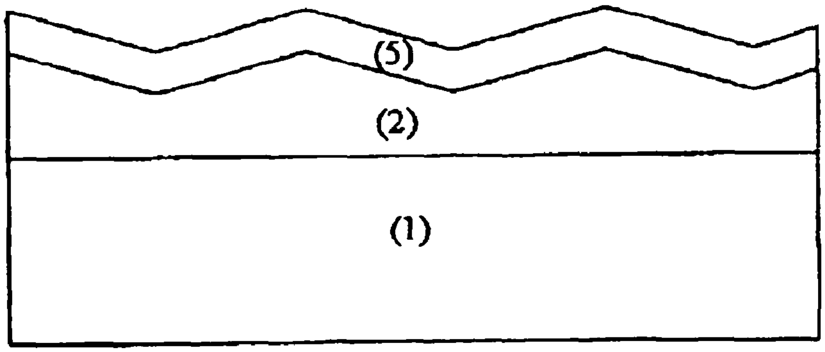
FIG. 5 is an outline cross-sectional view to schematically show a preferred embodiment of the film of the invention.

In the configurations (a) to (d), the hard coat layer (2) can be made of an antiglare layer having antiglare properties. The antiglare properties may be provided by dispersing a mat particle as illustrated in FIG. 4, or may be provided by shaping the surface by a method such as embossing as illustrated in FIG. 5. An antiglare layer which is formed by dispersing a mat particle is made of a binder and a translucent particle as dispersed in the binder. The antiglare layer having antiglare properties preferably has both antiglare properties and hard coat properties and may be configured by plural layers of, for example, from two layers to four layers.

Furthermore, examples of a layer which may be provided between a transparent support and a layer in the side of the surface or on the outermost surface include a layer for preventing interference unevenness (spectral unevenness), an antistatic layer (in the case where requirements such as reduction of the surface resistivity value from the display side are presented or in the case where staining on the surface or the like becomes problematic), other hard coat layer (in the case where the hardness is insufficient only by the hard coat layer or antiglare layer made of a single layer), a gas barrier layer, a water absorbing layer (moisture-proof layer), an adhesiveness improving layer, and an antifouling layer (anti-contamination layer).

It is preferable that the refractive indexes of the respective layers which constitute the antiglare antireflection film having an antireflection layer in the invention meet the following relationship.

(Refractive index of hard coat layer)>(Refractive index of transparent support)>(Refractive index of low refractive index layer)

4. Production Method:

The film of the invention can be formed in the following method, but it should not be construed that the invention is limited thereto.

4-(1) Preparation of Coating Solution

<Preparation>

First of all, a coating solution containing components for forming each layer is prepared. On that occasion, by minimizing the amount of volatilization of a solvent, it is possible to suppress an increase of the water content in the coating solution. The water content in the coating solution is preferably not more than 5%, and more preferably not more than 2%. Suppression of the amount of volatilization of the solvent is achieved by, for example, improving tightness at the time of stirring after charging the respective raw materials in a tank and minimizing an air contact area of the coating solution at the time of liquid transfer works. Furthermore, a measure for lowering the water content in the coating solution during coating or before or after coating may be provided.

<Physical Properties of Coating Solution>

In the coating system of the invention, since an upper limit rate at which coating is possible is largely influenced by physical properties of the solution, it is necessary to control physical properties of the solution at a moment of coating, in particular viscosity and surface tension.

The viscosity of the low refractive index layer used in the present invention is preferably not more than 2.0 [mPa·s], more preferably not more than 1.5 [mPa·s], and most preferably not more than 1.0 [mPa·s]. Since the viscosity varies with a shear rate depending upon the coating solution, the foregoing value shows a viscosity at the shear rate at the moment of coating. By adding a thixotropic agent in the coating solution, the viscosity becomes low at the time of coating at which high shear is applied, whereas the viscosity becomes high at the time of drying at which shear is not substantially applied to the coating solution so that unevenness is hardly generated at the time of drying. Thus, such is preferable.

Furthermore, in addition to the physical properties of the solution, the amount of the coating solution to be coated on the transparent support also influences the upper limit rate at which coating is possible. The amount of the coating solution to be coated on the transparent support is preferably from 2.0 to 5.0 [mL/m$^2$]. By increasing the amount of the coating solution to be coated on the transparent support, the upper limit rate at which coating is possible increases, and therefore, such is preferable. However, when the amount of the coating solution to be coated on the transparent support is excessively increased, a load to be applied for drying becomes large. Thus, it is preferred to determine an optimum amount of the coating solution to be coated on the transparent support by solution formulation and process condition.

The surface tension is preferably in the range of from 15 to 36 [mN/m]. It is preferred to lower the surface tension by adding a leveling agent or other means because unevenness at the time of drying is controlled. On the other hand, when the surface tension decreases too much, the upper limit rate at which coating is possible is lowered. Thus, the surface tension is more preferably in the range of from 17 [mN/m] to 32 [mN/m], and further preferably in the range of from 19 [mN/m] to 26 [mN/m].

<Filtration>

It is preferable that the coating solution which is used for coating is filtered prior to coating. With respect to a filter for the filtration, it is preferred to use a filter having a pore size as small as possible within the range in which the components in the coating solution are not removed. For the filtration, a filter having an absolute filtration accuracy of from 0.1 to 10 μm is used, and a filter having an absolute filtration accuracy of from 0.1 to 5 μm is preferably used. The filter preferably has a thickness of from 0.1 to 10 mm, and more preferably from 0.2 to 2 mm. In that case, the filtration is preferably carried out under a filtration pressure of not more than 1.5 MPa, more preferably not more than 1.0 MPa, and further preferably not more than 0.2 MPa.

A filtration filter member is not particularly limited so far as it does not influence the coating solution. Concretely, there is enumerated a filtration member for a wet dispersion of an inorganic compound the same as described previously.

Furthermore, it is also preferable that the filtered coating solution is ultrasonically dispersed just before coating, thereby assisting defoaming and dispersing and holding of the dispersion.

4-(2) Treatment Before Coating:

It is preferable that the support which is used in the invention is subjected to a surface treatment before coating. Specific examples thereof include a corona discharge treatment, a glow discharge treatment, a flame treatment, an acid treatment, an alkaline treatment, and an ultraviolet ray irradiation treatment. Furthermore, it is also preferably utilized to provide an undercoat layer as described in JP-A-7-333433.

In addition, examples of a dust removal method which is employed in a dust removal process as a process prior to coating include dry dust removal methods such as a method of pressing a non-woven fabric, a blade, etc, onto the film surface as described in JP-A-59-150571; a method of blowing air with high cleanliness at a high speed to separate deposits from the film surface and sucking the separated deposits by an adjacent suction opening as described in JP-A-10-309553; and a method of blowing ultrasonically vibrating compressed air to separate deposits and sucking the deposits (for example, NEW ULTRASONIC CLEANER, manufactured by Shinko Co., Ltd.) as described in JP-A-7-333613.

Furthermore, there are also employable wet dust removal methods such as a method of introducing a film into a cleaning tank and separating deposits by an ultrasonic vibrator; a method of feeding a cleaning solution into a film, blowing high-speed air and performing suction as described in JP-B-49-13020; and a method of continuously rubbing a web by a liquid-wetted roll and then spraying a liquid onto the rubbed surface to achieve cleaning as described in JP-A-2001-38306. Of these dust removal methods, a method by ultrasonic dust removal and a method by wet dust removal are especially preferable in view of the dust removal effect.

Furthermore, destaticization of static electricity on the film support prior to the dust removal process is especially preferable in view of increasing an efficiency of dust removal and suppressing attachment of dusts. For achieving such a destaticization method, it is possible to use an ionizer of a corona discharge system, an ionizer of an irradiation system with light such as UV and soft X-rays, etc. The film support before and after dust removal and coating desirably has a charging voltage of not more than 1,000 V, preferably not more than 300 V, and especially preferably not more than 100 V.

From the viewpoint of holding the flatness of the film, it is preferable that the temperature of the cellulose acylate film is controlled at not higher than Tg, specifically not higher than 150° C. in these treatments.

In the case where the cellulose acylate film is made to adhere to a polarizing film as in the case of using the film of the invention as a protective film for polarizing plate, it is especially preferable from the viewpoint of adhesion to the polarizing film that an acid treatment or an alkaline treatment, namely a saponification treatment with respect to the cellulose acylate is carried out.

From the viewpoint of adhesion or the like, the cellulose acylate film preferably has surface energy of 55 mN/m or more, and more preferably 60 mN/m or more and not more than 75 mN/m. The surface energy can be adjusted by the foregoing surface treatment.

4-(3) Coating:

The respective layers of the film of the invention can be formed by the following coating methods, but it should not be construed that the invention is limited to these methods.

There are employed known methods such as a dip coating method, an air knife coating method, a curtain coating method, a roll coating method, a wire bar coating method, a gravure coating method, and an extrusion coating method (die coating method) (see U.S. Pat. No. 2,681,294), and a microgravure coating method. Of these, a microgravure coating method and a die coating method are preferable.

The "microgravure coating method" as referred to herein, which is employed in the invention, is a coating method which is characterized by disposing a gravure roll having a diameter of from about 10 to 100 mm, and preferably from about 20 to 50 mm and engraved with a gravure pattern over the entire periphery thereof beneath the support and simultaneously revolving the gravure roll in an inverse direction to the conveyance direction of the support and scraping away the excessive coating solution from the surface of the subject gravure roll by a doctor blade and transferring a fixed amount of the coating solution onto a lower surface of the support in a position at which the upper surface of the support is in a free state, thereby achieving coating. The transparent support in a roll state is continuously wound out, and at least one layer of a hard coat layer and a fluorine-coating olefin based polymer-containing low refractive index layer can be coated in one side of the wound-out support by the microgravure coating method.

With respect to the coating condition by the microgravure method, the number of lines of the gravure pattern as engraved on the gravure roll is preferably from 50 to 800 lines per inch, and more preferably from 100 to 300 lines per inch; a depth of the gravure pattern is preferably from 1 to 600 μm, and more preferably from 5 to 200 μm; the revolution number of the gravure roll is preferably from 3 to 800 rpm, and more preferably from 5 to 200 rpm; and a conveyance speed of the support is preferably from 0.5 to 100 m/min, and more preferably from 1 to 50 m/min.

In order to feed the film of the invention with high productivity, an extrusion coating method (die coating method) is preferably employed. In particular, the production method disclosed in JP-A-2006-122889 can be employed in a region with a small wet coating amount (not more than 20 cc/$m^2$) such as the hard coat layer and the antireflection layer, so that uniformity of the film can be improved.

4-(4) <Drying>It is preferable that after coating on the support directly or via other layer, the film of the invention is conveyed into a zone heated for drying the solvent by means of a web.

As a method of drying the solvent, a variety of knowledge can be utilized. Specific examples of the knowledge include methods as described in JP-A-2001-286817, JP-A-2001-314798, JP-A-2003-126768, JP-A-2003-315505, and JP-A-2004-34002.

The temperature of the drying zone is preferably from 25° C. to 140° C.; and it is preferable that the temperature of the first half of the drying zone is relatively low, whereas the temperature of the second half of the drying zone is relatively high. However, it is preferable that the temperature is not higher than the temperature at which volatilization of the components other than the solvent to be contained in the coating composition of each layer starts. For example, among commercially available photo radical generators which are used together with an ultraviolet ray hardenable resin, there are ones in which a several tens % portion thereof is volatilized within several minutes in warm air of 120° C. Furthermore, among monofunctional or bifunctional acrylate monomers, there are ones in which volatilization proceeds in warm air of 100° C. In such case, it is preferable that the temperature of the drying zone is not higher than the temperature at which volatilization of the components other than the solvent to be contained in the coating composition of each layer starts.

Furthermore, it is preferable that with respect to the dry air after coating the coating composition of each layer on the support, when the solids content of the coating composition is from 1 to 50%, for the purpose of preventing drying unevenness from occurring, it is preferable that the air velocity on the surface of the coating film is in the range of from 0.1 to 2 n/sec.

Moreover, after coating the coating composition of each layer on the support, when a difference in temperature between a conveyance roll coming into contact with an opposite surface of the support to a coating surface is made to fall within the range of from 0° C. to 20° C. in the drying zone, drying unevenness due to heat transmission unevenness on the conveyance roll can be prevented from occurring, and therefore, such is preferable.

4-(5) Hardening:

After drying the solvent, the film of the invention is passed through a zone capable of hardening each coating film by ionizing radiations and/or heat by the web, whereby the coating film can be hardened.

It is preferable that the film of the invention is heated at a temperature of 70° C. or higher and not higher than 130° C. for a period of time of from 5 minutes to 20 minutes, followed by hardening by active energy rays represented by ultraviolet rays.

The heat hardening temperature is preferably 70° C. or higher and not higher than 120° C., and most preferably 80° C. or higher and not higher than 115° C.

In the invention, the species of the ionizing radiations is not particularly limited and can be properly selected among ultraviolet rays, electron beams, near ultraviolet rays, visible light, near infrared rays, infrared rays, and X-rays depending upon the kind of the hardenable composition from which a film is formed. Above all, ultraviolet rays and electron beams are preferable; and ultraviolet rays are especially preferable from the standpoints that handling is simple and easy and that high energy is easily obtained.

As a light source of ultraviolet rays for photopolymerizing an ultraviolet ray reactive compound, any light source can be used so far as it is able to emit ultraviolet rays. For example, a low pressure mercury vapor lamp, a middle pressure mercury vapor lamp, a high pressure mercury vapor lamp, an extra-high pressure mercury vapor lamp, a carbon arc lamp, a metal halide lamp, a xenon lamp, and so on can be used. Furthermore, an ArF excimer laser, a KrF excimer laser, an excimer lamp, a synchrotron radiation, and so on can be used, too. Above all, an extra-high pressure mercury vapor lamp, a high pressure mercury vapor lamp, a low pressure mercury vapor lamp, a carbon arc lamp, a xenon arc lamp, and a metal halide lamp can be preferably used.

Further, electron beams can be similarly used. As the electron beams, there can be enumerated electron beams having energy of from 50 to 1,000 keV, and preferably from 100 to 300 keV, which are emitted from a variety of electron beam accelerators such as a Cockcroft-Walton type electron beam accelerator, a van de Graaff type electron beam accelerator, a resonant transformation type electron beam accelerator, an insulating core transformer type electron beam accelerator, a linear type electron beam accelerator, a dynamitron type electron beam accelerator, and a high frequency type electron beam accelerator.

The irradiation condition varies depending upon the respective lamp. An energy intensity of an irradiation dose is preferably 10 $mJ/cm^2$ or more, more preferably from 50 $mJ/cm^2$ to 10,000 $mJ/cm^2$, and especially preferably from 50 $mJ/cm^2$ to 2,000 $mJ/cm^2$. On that occasion, the irradiation dose distribution in a width direction of the web including the both ends is preferably from 50 to 100%, and more preferably from 80 to 100% on the basis of a maximum irradiation dose in the center.

In the invention, it is preferred to harden at least one layer stacked on the support by a step for irradiating ionizing radiations in an atmosphere having an oxygen concentration of not more than 10% by volume in a state of irradiating ionizing radiation and heating at a film surface temperature of 60° C. or higher for a period of time of 0.5 seconds or more after starting the irradiation with ionizing radiations.

It is also preferable that heating is carried out in an atmosphere having an oxygen concentration of not more than 3% by volume simultaneously with or subsequently to the irradiation with ionizing radiations.

In particular, it is preferable that the low refractive index layer which is the outermost layer and has a thin thickness is hardened by this method. The hardening reaction is accelerated by heat, whereby a film having excellent physical strength and chemical resistance can be formed.

The time for irradiating ionizing radiations is preferably 0.7 seconds or more and not more than 60 seconds, and more preferably 0.7 seconds or more and not more than 10 seconds. When the time for irradiating ionizing radiations is not more than 0.5 seconds, the hardening reaction cannot be completed so that hardening cannot be thoroughly achieved. Furthermore, what the low oxygen condition is kept for a long period of time is not preferable because the equipment becomes large in size and a large amount of an inert gas is required.

It is preferable that a film is formed in an atmosphere having an oxygen concentration of not more than 6% by volume by a crosslinking reaction or polymerization reaction of the ionizing radiation hardenable compound. The oxygen concentration of the atmosphere is more preferably not more than 4% by volume, especially preferably not more than 2% by volume, and most preferably not more than 1% by volume. In order to reduce the oxygen concentration to more than the necessity, a large amount of an inert gas such as nitrogen is required, and therefore, such is not preferable from the viewpoint of production costs.

As a measure for controlling the oxygen concentration to not more than 10% by volume, it is preferred to substitute the air (nitrogen concentration: about 79% by volume, oxygen concentration: about 21% by volume) with other gas. It is especially preferred to substitute (purge) the air with nitrogen.

By feeding an inert gas into an ionizing radiation irradiation chamber and setting up a condition so as to slightly blow out the inert gas into a web inlet side of the irradiation chamber, not only it is possible to exclude entrained air following the conveyance and to effectively decrease an oxygen concentration of a reaction chamber, but also it is possible to effectively decrease a substantial oxygen concentration on the polar surface having large hardening hindrance due to oxygen. The direction of the inert gas flow in the web inlet side of the irradiation chamber can be controlled by adjusting a balance between air supply and exhaustion of the irradiation chamber.

With respect to a method for excluding the entrained air, it is preferably employed to blow the inert gas directly on the web surface.

Furthermore, by providing a front chamber before the foregoing reaction chamber to exclude oxygen on the web surface in advance, it is possible to make the hardening proceed more efficiently. Moreover, for the purpose of efficiently using the inert gas, a gap between the side face constructing the web inlet side of the ionizing radiation reaction chamber or front chamber and the web surface is preferably from 0.2 to 15 mm, more preferably from 0.2 to 10 mm, and most preferably from 0.2 to 5 mm. However, in order to continuously produce a web, it is necessary to join and connect the web. For joining, there is widely used a method of sticking it with a joining tape, etc. For that reason, when the gap between the inlet face of the ionizing radiation reaction chamber or front chamber and the web is excessively narrow, there is caused a problem such that a joining member such as a joining tape is stuck. For that reason, in order to make the gap narrow, it is preferable that at least a part of the inlet face of the ionizing radiation reaction chamber or front chamber is made movable such that when a joining part enters, the gap is widened in a proportion corresponding to the joining thickness. In order to realize this, there are employable a method in which the inlet face of the ionizing radiation reaction chamber or front chamber is made movable back and forth in the direction of movement and when the joining part passes therethrough, moves back and forth, thereby widening the gap; and a method in which the inlet face of the ionizing radiation reaction chamber or front chamber is made movable in a direction vertical to the web surface and when the joining part passes therethrough, moves up and down, thereby widening the gap.

In hardening, it is preferable that the film surface is heated at 60° C. or higher and not higher than 170° C. When the heating temperature is lower than 60° C., an effect by heating is low, whereas when it exceeds 170° C., there is caused a problem such as deformation of the substrate. The heating temperature is more preferably from 60° C. to 100° C. The temperature of the "film surface" as referred to herein means a temperature of the film surface of a layer to be hardened. Furthermore, the time required for reaching the foregoing temperature is 0.1 seconds or more and not more than 300 seconds, and more preferably not more than 10 seconds after starting the UV irradiation. When the time for keeping the temperature of the film surface within the foregoing temperature range is too short, the reaction of the hardenable composition capable of forming a film cannot be accelerated. On the other hand, when it is too long, an optical performance of the film is lowered, and there is caused a problem in the production such that equipment becomes large.

Though the heating method is not particularly limited, and preferred examples thereof include a method of heating a roll and bringing it into contact with the film; a method of blowing heated nitrogen; and irradiation with far infrared rays or infrared rays. A method of performing heating while making a medium such as warm water, vapors and oils flow into a rotating metal roll as described in Japanese Patent No. 2523574 can be utilized, too. As a measure for heating, a dielectric heating roll or the like may be used.

The irradiation with ultraviolet rays may be carried out every time of providing one layer for the respective constitutional plural layers or after stacking. Alternatively, the irradiation may be carried out by combining them. It is preferable from the standpoint of productivity that ultraviolet rays are irradiated after stacking multiple layers.

In the invention, it is possible to harden at least one layer as stacked on the support by irradiation with ionizing radiations plural times. In this case, it is preferable that the irradiation with ionizing radiations is carried out at least two times in continuous reactions chambers where the oxygen concentration does not exceed 3% by volume. By carrying out the irradiation with ionizing radiations plural times in reaction chambers having the same low oxygen concentration, it is possible to effectively ensure the reaction time necessary for hardening.

In particular, in the case of increasing the production speed for high productivity, in order to ensure energy of ionizing radiations necessary for the hardening reaction, it is necessary to carry out the irradiation with ionizing radiations plural times.

Furthermore, in the case where a hardening rate [100−(residual functional group content)] is a value less than 100%, in providing a layer thereon and hardening by ionizing radiations and/or heat, when the hardening rate of a lower layer is higher than that before providing an upper layer, the adhesiveness between the lower layer and the upper layer is improved, and therefore, such is preferable.

4-(6) Handling:

For the purpose of continuously producing the film of the invention, a step for continuously delivering a support film in a rolled state; a step for coating and drying a coating solution; a step for hardening a coating film; and a step for winding up the support film having a hardened layer are carried out.

A film support is continuously delivered from the film support in a rolled state into a clean chamber; static electricity as charged on the film support is destaticized by a destaticization unit within the clean chamber; and a foreign substance as attached on the film support is subsequently removed by a dust removing unit. Subsequently, the coating solution is coated on the film support in a coating part as placed within the clean chamber, and the coated film support is sent into a drying chamber and dried.

The film support having a dried coating layer is delivered from the drying chamber into a hardening chamber, and a monomer as contained in the coating layer is polymerized and hardened. In addition, the film support having a hardened layer is sent into a hardening part, thereby completing hardening; and the film support having a completely hardened layer is wound up and becomes in a rolled state.

The foregoing steps may be carried out every time of forming each layer. By providing a plural number of coating part/drying chamber/hardening part, it is also possible to carry out the formation of each layer.

In order to prepare the film of the invention, it is preferable that at the same time of the foregoing microfiltration operation of the coating solution, the coating step in the coating part and the drying step to be carried out in the drying chamber are carried out in an air atmosphere with high cleanliness and that prior to carrying out coating, contaminants and dusts on the film are thoroughly removed. The air cleanliness in the coating step and the drying step is desirably class 10 (the number of particles of 0.5 μm or larger is not more than 353/$m^3$) or more, and more desirably class 1 (the number of particles of 0.5 μm or larger is not more than 35.5/$m^3$) or more on the basis of the air cleanliness according to the Federal Standard No. 209E. Furthermore, it is also preferable that the air cleanliness is high, too in other steps than the coating and drying step such as delivery and winding up.

4-(7) Saponification Treatment:

In preparing a polarizing plate by using the film of the invention as one of two surface protective films of polarizing film, it is preferred to improve the adhesion on the adhesive surface by hydrophilizing the surface in a side at which the polarizing film is stuck.

(a) Method of Dipping in an Alkaline Solution:

This method is a measure in which the film is dipped in an alkaline solution, thereby saponifying all of the surfaces having reactivity with an alkali on the entire surface of the film. Since this method does not require special equipment, it is preferable from the viewpoint of costs. A sodium hydroxide aqueous solution is preferable as the alkaline solution. A concentration of the alkaline solution is preferably from 0.5 to 3 moles/L, and especially preferably from 1 to 2 moles/L; and a liquid temperature of the alkaline solution is preferably from 30 to 75° C., and especially preferably from 40 to 60° C.

Though the foregoing combination of the saponification condition is a combination of relatively mild conditions, it can be set up by the raw material and configuration of the film and a desired contact angle.

After dipping in the alkaline solution, it is preferable that the film is thoroughly washed with water or that the film is dipped in a dilute acid, thereby neutralizing an alkaline component such that the alkaline component does not remain in the film.

By the saponification treatment, the surface opposite to the surface on which the coating layer is present is hydrophilized. The protective film for polarizing plate is provided for use after making the hydrophilized surface of the transparent support adhere to the polarizing film.

The hydrophilized surface is effective for improving the adhesion to the adhesive surface made of, as the major component, polyvinyl alcohol.

With respect to the saponification treatment, it is preferable from the viewpoint of adhesion to the polarizing film that the contact angle of the surface of the transparent support in the opposite side to the side at which the coating layer is present against water is low as far as possible. On the other hand, in the dipping method, since the film is damaged by the alkali at the same time over from the surface at which the coating layer is present to the inside of the film, it is important to employ a necessary and minimum condition. In the case where the contact angle of the transparent support on the surface in the opposite side against water is employed as an index of the damage which each layer receives by the alkali, especially when the transparent support is triacetyl cellulose, the contact angle is preferably from 10° to 50°, more preferably from 30° to 50°, and further preferably from 40° to 50°. When the contact angle exceeds 50°, a problem is caused in the adhesion to the polarizing film, and therefore, such is not preferable. On the other hand, when it is less than 10°, the damage which the film receives becomes too large, the physical strength is hindered, and therefore, such is not preferable.

(b) Method of Coating an Alkaline Solution:

As a measure for avoiding the damage against each film in the foregoing dipping method, there is preferably employed a method of coating an alkaline solution by coating an alkaline solution only on the surface in the opposite side to the surface on which the coating layer is present, followed by heating, washing with water and drying. Incidentally, in this case, the "coating" as referred to herein means that the alkaline solution or the like is brought into contact with only the surface on which the saponification is carried out. In addition to the coating, spraying, contacting with a liquid-containing belt, or other means is also included. By employing such a method, since equipment and step for coating the alkaline solution are separately required, this method is inferior to the dipping method (a) from the viewpoint of costs. On the other hand, since the alkaline solution comes into contact with only the surface to which the saponification treatment is applied, a layer using a raw material which is weak against the alkaline solution can be provided on the surface in the opposite side. For example, in a vapor deposited film or a sol-gel film, a variety of influences such as corrosion, dissolution and peeling are caused due to the alkaline solution. Accordingly, though it is not desired to provide such vapor deposited film or sol-gel film by the dipping method, since the film does not come into contact with the solution in this coating method, it is possible to use such a vapor deposited film or a sol-gel film without any problem.

In all of the foregoing saponification methods (a) and (b), since the saponification can be carried out after winding out the film from the support in a rolled state and forming the respective layers, it may be added after the film production step and achieved in a series of operations. In addition, by continuously carrying out a sticking step to a polarizing plate made of a similarly wound out support collectively, it is possible to prepare a polarizing plate with good efficiency as compared with the case of carrying out the same operations sheet by sheet.

(c) Method of Achieving Saponification by Protecting by a Laminate Film:

Likewise the foregoing method (b), in the case where the coating layer is insufficient in resistance to an alkaline solution, after forming an ultimate layer, by sticking a laminate film onto the surface on which the ultimate layer has been formed and then dipping in an alkaline solution, it is possible to hydrophilize only the triacetyl cellulose surface in an opposite side to the surface on which the ultimate layer has been formed and then peeling away the laminate film. According to this method, it is also possible to apply a hydrophilization treatment enough as a protective film for polarizing plate to only the surface of the triacetyl cellulose film in an opposite side to the surface on which the ultimate layer has been formed without damaging the coating layer. In comparison with the foregoing method (b), this method involves an advantage such that though the laminate film is generated as a waste, a special device for coating an alkaline solution is not required.

(d) Method of Dipping in an Alkaline Solution After Forming a Middle Layer:

In the case where though a lower layer has resistance to an alkaline solution, an upper layer is insufficient in resistance to an alkaline solution, after forming the lower layer, it is possible to dip the film in an alkaline solution, thereby hydrophilizing the both surfaces thereof and then forming an upper layer. The production process becomes complicated. However, for example, in a film composed of an antiglare layer and a low refractive index layer made of a fluorine-containing sol-gel film, in the case where a hydrophilic layer is present, there is brought an advantage that interlaminar adhesiveness between the antiglare layer and the low refractive index layer is improved.

(e) Method of Forming a Coating Layer on a Previously Saponified Triacetyl Cellulose Film:

A coating layer may be formed on either one surface of a triacetyl cellulose film which has been previously saponified by dipping in an alkaline solution or other means directly or via other layer. In the case where the triacetyl cellulose film is saponified by dipping in an alkaline solution, interlaminar adhesiveness to the triacetyl cellulose surface which has been hydrophilized by the saponification may possibly be deteriorated. In such case, it is possible to deal with this problem by subjecting only the surface on which a coating layer is formed after the saponification to a corona discharge or glow discharge treatment or other means, thereby removing the hydrophilized surface. Furthermore, in the case where the coating layer contains a hydrophilic group, the interlaminar adhesiveness may possibly become good.

4-(8) Preparation of Polarizing Film:

The film of the invention can be used as a polarizing film by using it as a polarizing film and a protective film as disposed in one side or both sides thereof The film of the invention may be used as one protective film, while using a usual cellulose acetate film as the other protective film. However, it is preferred to use a cellulose acetate film which is produced by the foregoing solution film formation method and stretched in a width direction in a rolled film state in a stretching ratio of from 10 to 100%.

In addition, in the polarizing plate of the invention, it is preferable that one surface thereof is made of an antireflection film, whereas the other protective film is an optical compensating film made of a liquid crystalline compound.

Examples of the polarizing film include an iodine based polarizing film, a dye based polarizing film using a dichroic dye, and a polyene based polarizing film. The iodine based polarizing film and the dye based polarizing film are in general produced by using a polyvinyl alcohol based film.

A slow axis of the transparent support of the antireflection film or the cellulose acetate film and a transmission axis of the polarizing film are disposed substantially parallel to each other.

For the productivity of the polarizing plate, moisture permeability of the protective film is important. The polarizing film and the protective film are stuck to each other by an aqueous adhesive, and a solvent of this adhesive is diffused into the protective film, thereby achieving drying. When the moisture permeability of the protective film is high, the drying becomes fast, and the productivity is improved. However, when the moisture permeability is excessively high, the moisture enters the polarizing film by the use circumstance (under high humidity) of a liquid crystal display device, whereby a polarizing ability is lowered.

The moisture permeability of the protective film is determined by thickness, free volume, hydrophilicity or hydrophobicity, and so on of the transparent support or polymer film (and polymerizable liquid crystal compound).

In the case where the film of the invention is used as a protective film for polarizing plate, the moisture permeability is preferably from 100 to 1,000 $g/m^2 \cdot 24$ hrs, and more preferably from 300 to 700 $g/m^2 \cdot 24$ hrs.

In the case of film formation, the thickness of the transparent support can be adjusted by a lip flow rate and a line speed, or stretching or compression. Since the moisture permeability varies depending upon the major raw material to be used, it is possible to set up the moisture permeability in a preferred range by adjusting the thickness.

In the case of film formation, the free volume of the transparent support can be adjusted by drying temperature and time.

In this case, since the moisture permeability also varies depending upon the major raw material to be used, it is possible to set up the moisture permeability in a preferred range by adjusting the free volume.

The hydrophilicity or hydrophobicity of the transparent support can be adjusted by an additive. By adding a hydrophilic additive in the foregoing free volume, the moisture permeability becomes high, whereas by adding a hydrophobic additive, the moisture permeability can be made low.

By independently controlling the foregoing moisture permeability, it is possible to produce a polarizing plate having an optical compensating ability cheaply with high productivity.

As the polarizing film, known polarizing films and polarizing films which are cut out from a longitudinal polarizing film whose absorption axis is neither parallel nor vertical to the longitudinal direction may be used. The longitudinal polarizing film whose absorption axis is neither parallel nor vertical to the longitudinal direction is prepared by the following method.

That is, this polarizing film is a polarizing film as prepared by stretching a continuously fed polymer film by imparting a tension while holding the both ends thereof by holding units. The polarizing film can be produced in a stretching method in which the film is stretched in a ratio of from 1.1 to 20.0 times in at least a film width direction; a difference in movement speed in a longitudinal direction between the holding units in the both film ends is within 3%; and the direction of movement of the film is bent in a state of holding the both film ends such that an angle between the direction of movement of the film in an outlet of the step for holding the both film ends and the substantial stretching direction of the film is inclined at from 20° to 70°. In particular, a polarizing film in which the subject angle is inclined at 45° is preferably used from the viewpoint of productivity.

The stretching method of the polymer film is described in detail in JP-A-2002-86554, paragraphs [0020] to [0030].

It is also preferable that of two protective films of a polarizer, a film other than the antireflection film is an optical compensating film having an optical compensating layer containing an optically anisotropic layer. The optical compensating film (retardation film) is able to improve a viewing angle characteristic of a liquid crystal display screen.

Known optical compensating films can be used as the optical compensating film. An optical compensating film as described in JP-A-2001-100042 is preferable from the standpoint of widening a viewing angle.

5. Use Embodiment of the Invention:

The film of the invention is used for image display devices such as a liquid crystal display device (LCD), a plasma display panel (PDP), an electroluminescence display device (ELD), and a cathode ray tube display device (CRT). An optical filter according to the invention can be used on a known display such as a plasma display panel (PDP) and a 5-(1) Liquid Crystal Display Device:

The film of the invention can be advantageously used for image display devices such as a liquid crystal display device. It is preferred to use the film of the invention in the outermost layer of a display.

The liquid crystal display device has a liquid crystal cell and two polarizing plates as disposed in the both sides thereof, and the liquid crystal cell supports a liquid crystal between two electrode substrates. In addition, one optically anisotropic layer may be disposed between the liquid crystal cell and one of the polarizing plates, or two optically anisotropic layers may be disposed between the liquid crystal cell and each of the both polarizing plates.

It is preferable that the liquid crystal cell is of a TN mode, a VA mode, an OCB mode, an IPS mode, or an ECB mode.

<TN Mode>

In a liquid crystal cell of a TN mode, a rod-like liquid crystalline molecule is substantially horizontally aligned and further aligned in a twisted state at from 60° to 120° at the time of applying no voltage.

The liquid crystal cell of a TN mode is most frequently utilized as a color TFT liquid crystal display device and described in many references.

<VA Mode>

In a liquid crystal cell of a VA mode, a rod-like liquid crystalline molecule is substantially vertically aligned at the time of applying no voltage.

The liquid crystal cell of a VA mode includes, in addition to (1) a liquid crystal cell of a VA mode in a narrow sense in which a rod-like liquid crystalline molecule is substantially vertically aligned at the time of applying no voltage, whereas it is substantially horizontally aligned at the time of applying a voltage (as described in JP-A-2-176625), (2) a liquid crystal cell of a multi-domained VA mode (MVA mode) for enlarging a viewing angle (as described in *SID* 97, *Digest of Tech. Papers,* 28 (1997), page 845), (3) a liquid crystal cell of a mode (n-ASM mode) in which a rod-like liquid crystalline molecule is substantially vertically aligned at the time of applying no voltage and is subjected to twisted multi-domain alignment at the time of applying a voltage (as described in *Preprints of Forum on Liquid Crystal*, pages 58 to 59 (1998), and (4) a liquid crystal cell of a SURVIVAL mode (as announced in *LCD International* 98).

<OCB Mode>

A liquid crystal cell of an OCB mode is a liquid crystal cell of a bend alignment mode in which a rod-like liquid crystalline molecule is aligned in a substantially reverse direction (in a symmetric manner) in the upper and lower parts of a liquid crystal cell and is disclosed in U.S. Pat. Nos. 4,583,825 and 5,410,422. Since the rod-like liquid crystal-line molecule is symmetrically aligned in the upper and lower parts of a liquid crystal cell, the liquid crystal cell of a bend alignment mode has a self optical compensating ability. For that reason, this liquid crystal mode is named as an OCB (optically compensatory bend) liquid crystal mode. A liquid crystal display device of a bend alignment mode involves an advantage such that the response speed is fast.

<IPS Mode>

A liquid crystal cell of an IPS mode is of a system of switching by applying a lateral electric field to a nematic liquid crystal and is described in detail in *Proc. IDRC* (*Asia Display* '95), pages 577 to 580 and pages 707 to 710.

<ECB Mode>

In a liquid crystal cell of an ECB mode, a rod-like liquid crystalline molecule is substantially horizontally aligned at the time of applying no voltage. The ECB mode is one of liquid crystal display modes having the simplest structure and is described in detail in, for example, JP-A-5-203946.

5-(2) Displays Other than Liquid Crystal Display Device:

<PDP>

A plasma display panel (PDP) is in general constituted of a gas, a glass substrate, an electrode, an electrode lead material, a thick film printing material, and a fluorescent material. The glass substrate is constituted of two sheets of a front glass substrate and a rear glass substrate. In each of the two glass substrates, an electrode and an insulating layer are formed. In the rear glass substrate, a fluorescent material layer is further formed. The two glass substrates are assembled, and a gas is sealed therebetween.

The plasma display panel (PDP) is already marketed. The plasma display panel is described in JP-A-5-205643 and JP-A-9-306366.

There may be the case where a front plate is disposed in front of the plasma display panel. It is preferable that the front plate has a sufficient strength for protecting the plasma display panel. The front plate can be used at an interval from the plasma display panel or can be used by sticking directly on the plasma display panel main body.

In image display devices such as a plasma display panel, an optical filter can be stuck directly on the display surface. Furthermore, in the case where a front plate is provided in front of the display, it is also possible to stick an optical filter in the front side (external side) or rear side (display side) of the front plate.

<Touch Panel>

The film of the invention can be applied to touch panels as described in JP-A-5-127822 and JP-A-2002-48913, and so on.

<Organic EL Element>

The film of the invention can be used as a substrate (substrate film) or a protective film of an organic EL element and so on.

In the case where the film of the invention is used in an organic EL element or the like, the contents as described in JP-A-11-335661, JP-A-11-335368, JP-A-2001-192651, JP-A-2001-192652, JP-A-2001-192653, JP-A-2001-335776, JP-A-2001-247859, JP-A-2001-181616, JP-A-2001-181617, JP-A-2002-181816, JP-A-2002-181617, and JP-A-2002-056976 can be applied. Furthermore, it is preferred to use the contents as described in JP-A-2001-148291, JP-A-2001-221916, and JP-A-2001-231443 in combination.

6. Various Characteristic Values:

A variety of measurement methods and preferred characteristic values regarding the invention will be shown below.

6-(1) Reflectance:

With respect to the measurement of mirror reflectance and color taste, by using a spectrophotometer "V-550" (manufactured by JASCO Corporation) having an adaptor "ARV-474" installed therein, a mirror reflectance at each of an incident angle of 5° and an outgoing angle of −5 is measured in a wavelength region of from 380 to 780 nm, and an average reflectance at from 450 to 650 nm is calculated, thereby evaluating antireflection properties.

With respect to the antiglare antireflection film of the invention, what it has a mirror reflectance of not more than 2.0% and a transmittance of 90% or more is preferable because the reflection of external light can be inhibited and the visibility can be improved. The mirror reflectance is especially preferably not more than 1.5%. It is the most preferable that the reflectance is controlled to not more than 1.0% by employing the layer configuration as described in 3-(d).

6-(2) Color Taste:

With respect to the antireflection ability-provided polarizing plate of the invention, it is possible to evaluate a color taste of regular reflected light against incident light at an incident angle of 5° in a region of a CIE stand light source $D_{65}$ having a wavelength of from 380 nm to 780 nm, namely a color taste by determining L*, a* and b* values of a CIE 1976 L*, a* and b* color space.

It is preferable that the L*, a* and b* values are satisfied with the relationships of (3≦L*≦20), (−7≦a*≦7), and (−10≦b*≦10), respectively. By making these values fall within the foregoing ranges, the color taste of reflected light of reddish violet color to bluish violet color, an aspect of which has hitherto been considered problematic, is reduced. In addition, when the L*, a* and b* values are satisfied with the relationships of (3≦L*≦10), (0≦a*≦5), and (−7≦b*≦0), respectively, the foregoing conventional problem is largely reduced so that in the case where the polarizing plate is applied to a liquid crystal display device, even when external light having high luminance such as light emitted from a fluorescent lamp in a room is slightly reflected, a color taste is neutral so that it is not noticeable. In detail, in the case of (a*≦7), a red taste does not become excessively strong, whereas in the case of (a*≧7), a cyan taste does not excessively strong, and therefore, such is preferable. Furthermore, in the case of (b*≧7), a blue taste does not become excessively strong, whereas in the case of (b*≦0), a yellow taste does not become excessively strong, and therefore, such is preferable.

In addition, the color taste uniformity of reflected light can be obtained from a* and b* on an L*a*b* chromaticity diagram as determined from reflection spectra of reflected light at from 380 nm to 680 nm in terms of a conversion of color taste according to the following numerical expression (21).

$$[\text{Conversion of color taste of } (a^*)]=[(a^*_{max}-a^*_{min})/a^*_{av}]\times 100$$

$$[\text{Conversion of color taste of } (b^*)]=[(b^*_{max}-b^*_{min})/b^*_{av}]\times 100 \quad \text{Numerical Expression (21)}$$

Here, $a^*_{max}$ and $a^*_{min}$ represent a maximum value and a minimum value of the a* value, respectively; $b^*_{max}$ and $b^*_{min}$ represent a maximum value and a minimum value of the b* value, respectively; and $a^*_{av}$ and $b^*_{av}$ represent an average value of the a* value and an average value of the b* value, respectively. The conversions of color are each preferably not more than 30%, more preferably not more than 20%, and most preferably not more than 8%.

Furthermore, the film of the invention preferably has a $\Delta E_w$ which is a change of color taste before and after the weather resistance test of not more than 15, more preferably not more than 10, and most preferably not more than 5. When the $\Delta E_w$ falls within this range, it is possible to achieve both low reflection and a reduction of the color taste of reflected light. Accordingly, for example, in the case where the film of the invention is applied to the outermost layer of an image display device, even when external light having high luminance such as light emitted from a fluorescent lamp in a room is slightly reflected, a color taste is neutral and the quality of a display image becomes good, and therefore, such is preferable.

The foregoing $\Delta E_w$ which is a change of color taste can be determined according to the following numerical expression (22).

$$\Delta E_w=[(\Delta L_w)^2+(\Delta a_w)^2+(\Delta b_w)^2]^{1/2} \quad \text{Numerical Expression (22)}$$

Here, $\Delta L_w$, $\Delta a_w$ and $\Delta b_w$ represent a change amount of the L* value, a change amount of the a* value and a change amount of the b* value before and after the weather resistance test, respectively.

6-(3) Transmitted Image Sharpness:

Transmitted image sharpness can be measured by an image sharpness meter (MICM-2D Model) as manufactured by Suga Test Instruments Co., Ltd. by using an optical comb with a slit width of 0.5 mm according to JIS K7105.

The film of the invention preferably has a transmitted image sharpness of 15 to 100%. The transmitted image sharpness is in general an index to show a blurring state of an image which is transmitted through the film and projected. The larger this value, the better the sharpness of the image as seen through the film is. In case the film of the invention is an antiglare film, a transmitted image sharpness of the film is preferably from 15% to 40% because both sufficient antiglare properties and improvements in image blurring and lowering of dark room contrast can be achieved.

6-(4) Surface Roughness:

The measurement of central line mean roughness (Ra) can be carried out according to JIS B0601.

What the antireflection film of the invention is designed such that with respect to the surface irregular shape, a central line mean roughness Ra is from 0.08 to 0.30 μm; that a ten-point mean roughness Rz is not more than 10 times of Ra; that an average crest/root distance Sm is from 1 to 100 μm; that a standard deviation of a height of the convex from the deepest part of irregularities is not more than 0.5 μm; that a standard deviation of the average crest/root distance Sm on the basis of the central line is not more than 20 μm; and that a face with an inclination angle of from 0 to 5° accounts for 10% or more because both sufficient antiglare properties and visually uniform mat feeling are achieved. When the Ra is less than 0.08 μm, sufficient antiglare properties are not obtained, whereas when it exceeds 0.30 μm, there are caused problems such as glare and whitening of surface when external light is reflected.

6-(5) Haze:

Haze of the film of the invention is a haze value as defined in JIS K7105 and is automatically measured as "haze=[(scattered light)/(whole transmitted light)]×100 (%)" using a haze turbidimeter "NDH-1001DP" as manufactured by Nippon Denshoku Industries Co., Ltd. on the basis of a measurement method as defined in JIS K7361-1.

Incidentally, a surface haze and an internal haze can be measured by the following procedures.

(1) A total haze value (H) of the film is measured according to JIS K7136.

(2) A few drops of silicone oil is added on the front surface of the film in the side of the low refractive index layer and the back surface thereof; the film is sandwiched by two sheets of a glass plate having a thickness of 1 mm (MICRO SLIDE GLASS Product No. S9111, manufactured by Matsunami Glass Ind., Ltd.) from the front and back sides, thereby bringing the film into complete intimate contact with the two glass plates; a haze is measured in a state of eliminating a surface haze; and a value obtained by subtracting a haze as separately measured by putting only silicone oil between two sheets of a glass plate therefrom is calculated as an internal haze (Hi) of the film.

(3) A value obtained by subtracting the internal haze (Hi) as calculated above in (2) from the total haze (H) as measured above in (1) is calculated as a surface haze (Hs).

6-(7) Scar Resistance:

<Evaluation of Scar Resistance by Steel Wool>

By carrying out a rubbing test under the following condition by using a rubbing tester, it is possible to provide an index for scar resistance.

Evaluation circumstance condition: 25° C., 60% RH

Rubbing material: steel wool (manufactured by Nippon Steel Wool Co., Ltd., Grade No. 0000). The steel wool is wound around a tip part (1 cm×1 cm) of the tester coming into contact with a sample and fixed by a band.

Movement distance (one way): 13 cm

Rubbing rate: 13 cm/sec

Load: 500 $g/cm^2$ and 200 $g/cm^2$

Contact area of tip part: 1 cm×1 cm

Number of rubbing: 10 reciprocations

An oily black ink is applied in the rear side of the rubbed sample, and a scar of the rubbed portion is evaluated by visual observation by reflected light or by a difference in quantity of reflected light from that in other portion than the rubbed portion.

<Evaluation of Scar Resistance by Eraser Rubbing>

By carrying out a rubbing test under the following condition by using a rubbing tester, it is possible to provide an index for scar resistance.

Evaluation circumstance condition: 25° C., 60% RH

Rubbing material: plastic eraser (MONO, manufactured by Tombow Pencil Co., Ltd.).

The plastic eraser is fixed in a tip part (1 cm×1 cm) of the tester coming into contact with a sample.

Movement distance (one way): 4 cm

Rubbing rate: 2 cm/sec

Load: 500 $g/cm^2$

Contact area of tip part: 1 cm×1 cm

Number of rubbing: 100 reciprocations

An oily black ink is applied in the rear side of the rubbed sample, and a scar of the rubbed portion is evaluated by visual observation by reflected light or by a difference in quantity of reflected light from that in other portion than the rubbed portion.

<Taber Test>

Scar resistance can be evaluated from an abrasion amount of a specimen before and after the test by a taber test according to JIS K5400.

It is preferable that this abrasion amount is low as far as possible.

6-(8) Hardness:

<Pencil Hardness>

Hardness of the film of the invention can be evaluated by a pencil hardness test according to JIS K5400.

The pencil hardness is preferably H or more, more preferably 2H or more, and most preferably 3H or more.

<Surface Elastic Modulus>

In the invention, surface elastic modulus is a value as determined by using a micro-surface hardness tester (Fischer Scope H100VP-HCU, manufactured by Fischer Instruments K.K.). Concretely, the surface elastic modulus is an elastic modulus as determined from changes a load and displacement at the time of eliminating a load by using a diamond-made quadrangular pyramid indentator (tip facing angle: 136°) and measuring an indentation depth under a proper test load within the range where the indentation depth does not exceed 1 μm.

Furthermore, the surface hardness can be determined, too as a universal hardness by using the foregoing micro-surface hardness tester. The universal hardness is a value obtained by measuring an indentation depth under a test load of a quadrangular pyramid indentator and dividing the test load by a surface area of an impression as generated under the foregoing test load which is calculated from a geometrical shape of that impression. It is known that there is a positive correlation between the foregoing surface elastic modulus and the universal hardness.

The universal hardness of a crosslinking polymer as defined in the invention is expressed by a universal hardness ($N/mm^2$) which is determined with respect to a crosslinking polymer film having a thickness of from about 20 to 30 μm as hardened and formed on a glass plate by using a micro hardness tester H100 according to the following measurement procedures.

A coating solution containing necessary catalyst, crosslinking agent and polymerization initiator in addition to the crosslinking polymer and having a solids content of about 25% is coated on a polished slide glass plate (26 mm×76 mm×1.2 mm) as manufactured by Toshinriko Co., Ltd. by selecting a proper bar coater such that the thickness after hardening is from about 20 to 30 μm. In the case where the crosslinking polymer is thermally hardenable, a thermal hardening condition under which the film is thoroughly hardened (for example, at 125° C. for 10 minutes) is determined in advance; and in the case where the crosslinking polymer is ionizing radiation hardenable, a hardening condition under which the film is thoroughly hardened (for example, oxygen concentration: 12 ppm, UV irradiation dose: 750 $mJ/cm^2$) is determined in advance. With respect to the respective films, the load is continuously increased from 0 to 4 mN; a conical diamond indentator is indented while a 1/10 thickness at which the hardness of the substrate glass plate does not affect is made the maximum; and a universal hardness is calculated from an average measured value of N=6 of F/A as determined from an indentation area A ($mm^2$) against each load F.

Furthermore, the surface hardness can be determined by nano indentation as described in JP-A-2004-354828. In this case, it is preferable that the hardness is from 2 GPa to 4 GPa and that the nano indentation elastic modulus is from 10 GPa to 30 GPa.

6-(9) Antifouling Test:

<Marker Ink Wiping Properties>

A film is fixed on a glass surface by an adhesive; a circle of a diameter of 5 mm is written in three times by a pen tip (fine) of a black marking pen "McKee Ultra-fine (a trade name of Zebra Co., Ltd.)" under a condition at 25° C. and 60 RH %; and after 5 seconds, wiping is carried out 20 reciprocations by a bundle of ten-ply folded BEMCOT (a trade name of Asahi Kasei Corporation) under a load to an extent that the BEMCOT bundle is indented. By repeating the foregoing writing and wiping under the foregoing condition until the marker ink mark does not disappear by wiping, it is possible to evaluate anti-fouling properties in terms of the number of wiping at which wiping is possible.

The number of wiping until the marker ink mark does not disappear is preferably 5 or more, and more preferably 10 or more.

With respect to a black marker ink, a circle having a diameter of 1 cm is drawn and painted over on a sample by using MAGIC INK No. 700 (M700-T1 Black) Ultra-fine and after standing for 24 hours, is rubbed by BEMCOT (manufactured by Asahi Kasei Corporation). Then, the wiping properties can be evaluated by whether or not the marker ink is wiped off.

6-(10) Contact Angle:

Using a contact angle meter ("CA-X" type contact angle meter, manufactured by Kyowa Interface Science Co., Ltd.), a droplet having a diameter of 1.0 mm was prepared in a needle tip in a dry state (at 20° C. and 65% RH) by using pure water as a liquid, which was then brought into contact with the surface of a film to prepare a droplet on the film. At a point at which the film and the liquid come into contact with each other, an angle formed between the tangential line to the liquid surface and the film surface and in a side containing the liquid is defined as a contact angle.

The contact angle of the film of the invention is preferably 94° or more, more preferably 97° or more, and most preferably 101° or more.

6-(11) Surface Free Energy:

Surface energy can be determined by a contact angle method, a method for measuring heat of wetting, or an adsorption method as described in *Foundation and Application of Wetting*, published by Realize Advanced Technology Limited, Dec. 10, 1989. In the case of the film of the invention, it is preferred to employ a contact angle method.

Concretely, two kinds of solvents having known surface energy are dropped on a cellulose acylate film; an angle of the droplet-containing side is defined by an angle formed between the tangential line drawn against the droplet and the film surface in a point of intersection of the droplet surface with the film surface; and the surface energy of the film can be computed by calculation.

The surface free energy ($\gamma s^v$: unit, mN/m) of the film of the invention as referred to herein means a surface tension of the antireflection film as defined by a value $\gamma s^v$ ($=\gamma s^d+\gamma s^h$) which is expressed by the total sum of $\gamma s^d$ and $\gamma s^h$ as determined by the following simultaneous equations (a) and (b) from contact angles $\theta_{H2O}$ and $\theta_{CH2I2}$ of pure water $H_2O$ and methylene iodide $CH_2I_2$, respectively on the antireflection film as experimentally determined while referring to D. K. Owens, *J. Appl. Polym*. Sci., 13, 1974 (1969). When this $\gamma s^v$ is small and the surface free energy is low, the film is high in surface repellency and generally excellent in antifouling properties.

$$1+\cos\theta_{H2O}=2\sqrt{\gamma s^d}(\sqrt{\gamma_{H2O}{}^d}/\gamma_{H2O}{}^v)+2\sqrt{\gamma s^h}(\sqrt{\gamma_{H2O}{}^h}/\gamma_{H2O}{}^v) \quad \text{Equation } (a)$$

$$1+\cos\theta_{CH2I2}=2\sqrt{\gamma s^d}(\sqrt{\gamma_{CH2I2}{}^d}/\gamma_{CH2I2}{}^v)+2\sqrt{\gamma s^h}(\sqrt{\gamma_{CH2I2}{}^h}/\gamma_{CH2I2}{}^v) \quad \text{Equation } (b)$$

$\gamma_{H2O}{}^d=21.8$, $\gamma_{H2O}{}^h=51.0$, $\gamma_{H2O}{}^v=72.8$ $\gamma_{CH2I2}{}^d=49.5$, $\gamma_{CH2I2}{}^h=1.3$, $\gamma_{CH2I2}{}^v=50.8$ The contact angle measurement was carried out by subjecting the film to humidity control for one hour or more under a condition at 25° C. and 60%, dropping 2 μL of a droplet on the film by using an automatic contact angle meter, CA-VI50 Model, manufactured by Kyowa Interface Science Co., Ltd. and after 30 seconds, determining a contact angle.

The surface free energy of the film of the invention is preferably not more than 25 mN/m, and especially preferably not more than 20 mN/m.

6-(12) Curl:

The measurement of curl is carried out by using a template for measuring the curl of Method Ain the "Determination of the curl of photographic film" of JIS K7619-1988.

The measurement is carried out under a condition at 25° C. and at a relative humidity of 60% for a humidity control time of 10 hours.

In the film of the invention, the curl preferably has a value as expressed by the following numerical expression in the range of from −15 to +15, more preferably in the range of from −12 to +12, and further preferably in the range of from −10 to +10. At this time, in the case of coating in a web state, the measurement direction of the curl within a sample is a conveyance direction of the substrate.

$$\text{Curl}=1/R \quad (R\text{: radius of curvature } (m)) \qquad \text{Numerical Expression}$$

This is an important characteristic for preventing cracking or film separation from occurring in manufacturing, processing and handling in markets of the film. It is preferable that the curl value falls within the foregoing range and is small.

Here, what the curl is a plus value means that the coating side of the film is curved inwardly, whereas what the curl is a minus value means that the coating side of the film is curved outwardly.

Furthermore, in the film of the invention, when only the relative humidity is changed to 80% and 10%, respectively on the basis of the foregoing curl measurement method, an absolute value of a difference in the curl value therebetween is preferably from 24 to 0, more preferably from 15 to 0, and most preferably from 8 to 0. This is a characteristic which is related to handling properties, separation and cracking when the film is stuck under a variety of humidity.

6-(13) Evaluation of Adhesiveness:

The adhesiveness between the layers or between the support and the coating layer in the film can be evaluated by the following method.

The surface of the film in a side at which the coating layer is present is subjected to cross-cutting with 11 lines in length and 11 lines in width at intervals of 1 mm by using a cutter knife, thereby providing 100 squares in total; a polyester pressure sensitive adhesive tape (No. 31B) manufactured by Nitto Denko Corporation is brought into press contact therewith; and after standing for 24 hours, a peeling test is repeated three times in the same place, thereby visually observing the presence or absence of peeling.

It is preferable that peeling is observed within ten in the hundred squares; and it is more preferable that peeling is observed within two in the hundred squares.

6-(14) Brittleness Test (Cracking Resistance):

Cracking resistance is an important characteristic for preventing cracking defects in handling such as coating, processing and cutting of the film, coating of an adhesive, and sticking to a variety of substances from occurring.

Surface cracking can be evaluated by cutting a film sample into a size of 35 mm×140 mm, allowing it to stand for 2 hours under a condition at a temperature of 25° C. and a relative humidity of 60%, and rolling up it in a cylindrical shape, thereby measuring a diameter of curvature at which cracking starts to occur.

With respect to the cracking resistance of the film of the invention, when the film is rolled up such that the coating layer side is positioned outwardly, the diameter of curvature at which the cracking occurs is preferably not more than 50 mm, more preferably not more than 40 mm, and most preferably not more than 30 mm. With respect to cracking in an edge part, it is preferable that no cracking occurs or a length of cracking is less than 1 mm in average.

6-(15) Dust Removal Properties:

Dust removal properties can be evaluated by sticking the film of the invention to a monitor, sprinkling a dust (for example, flocks of futon or fiber) onto the monitor surface and wiping the dust by a cleaning cloth.

It is preferable that the dust can be completely removed by wiping of six times; and it is more preferable that the dust can be completely removed by wiping within three times.

6-(16) Performance of Liquid Crystal Display Device:

Evaluation methods of characteristics and preferred states at the time of using the film of the invention on a display device will be described below.

A polarizing plate in the viewing side as provided in a liquid crystal display device using a TN type liquid crystal cell (TH-15TA2, manufactured by Matsushita Electric Industrial Co., Ltd.) is peeled off, and instead thereof, the film or polarizing plate of the invention is stuck via an adhesive such that the coating surface is present in the viewing side and that the transmission axis of the polarizing plate is coincident with the polarizing plate stuck on the product. A variety of the following characteristics can be visually evaluated from various viewing angles in a bright room while black displaying the liquid crystal display device.

<Evaluation of Image Unevenness and Color Taste>

By using the prepared liquid crystal display device, unevenness and change in color taste at the time of black display (L1) are visually evaluated by plural observers.

When ten observers make the evaluation, it is preferred that not more than three observers are able to recognize unevenness, change in color taste left and right, change in color taste by the temperature and humidity, and white blurring; and it is more preferable that nobody is able to recognize them.

Furthermore, with respect to the reflection of external light, change of the reflection can be visually relatively evaluated by using a fluorescent lamp.

<Light Leakage of Black Display>

A rate of light leakage of black display at an azimuth direction of 45° from the front of the liquid crystal display device and a polar angle direction of 70° is measured. The rate of light leakage is preferably not more than 0.4%, and more preferably not more than 0.1%.

<Contrast and Viewing Angle>

With respect to contrast and viewing angle, a contrast ratio and a viewing angle (extent of an angle range in which the contrast ratio is 10 or more) in the left and right direction (orthogonal direction to the rubbing direction of cell) can be examined by using an analyzer (EZ-Contrast 160D, manufactured by ELDIM).

EXAMPLES

The invention will be described below in detail with reference to the Examples, but it should not be construed that the invention is limited thereto. In the following Examples and Synthesis Examples, the term "%" is % by weight unless otherwise indicated.

Example 1

<Preparation of Antireflection Film>

[Synthesis of Fluorine-containing Polymer]

Synthesis Example 1

Synthesis of Fluorine-containing Polymer P1

In a stainless steel-made stirrer-equipped autoclave having an internal volume of 100 mL, 40 mL of ethyl acetate, 14.7 g of hydroxyethyl vinyl ether (HEVE) and 0.55 g of dilauroyl peroxide were charged, and the inside of the system was deaerated and purged with a nitrogen gas. In addition, 25 g of hexafluoropropylene (HFP) was introduced into the autoclave, and the temperature was raised to 65° C. At a point of time when the temperature in the autoclave reached 65° C., the pressure was 5.4 kg/$cm^2$. The reaction was continued for 8 hours while keeping the temperature in the autoclave at 65° C., and at a point of time when the pressure reached 3.2 kg/$cm^2$, the heating was stopped, followed by allowing it to stand for cooling.

At a point of time when the internal temperature dropped to room temperature, the unreacted monomers were expelled, and the autoclave was opened, and the reaction solution was taken out. The obtained reaction solution was thrown into a large excess of hexane, the solvent was removed by decantation, and a precipitated polymer was taken out. In addition, this polymer was dissolved in a small amount of ethyl acetate and reprecipitated twice from hexane, thereby completely removing the residual monomers. After drying, 28 g of a copolymer P1 having a molar ratio of IFP to HEVE of 1/1 was obtained. The obtained polymer had a number average molecular weight of 15,000.

Synthesis Examples 2 to 5

Fluorine-containing polymers P18, P37, P39 and P45 were synthesized in substantially the same manner as in the synthesis of P1 of the foregoing Synthesis Example 1, provided that raw materials were changed to those shown at Tables 1 to 5. A number average molecular weight of each of the obtained fluorine-containing polymers was shown in the foregoing Tables 1 and 2.

Synthesis Example 6

Synthesis of Fluorine-containing Polymer P49

In an autoclave having an inner volume of 2 $dm^3$ and equipped with a stainless steel stirrer, 133.0 g of 2-butanone, 33.0 g of 2-propanol, 52.9 g of hydroxyethyl vinyl ether (HEVE), 28.8 g of ethyl vinyl ether (EVE), 15.0 g of Syraplane FM-0721, and 3.9 g of V-65 (a polymerization initiator manufactured by Wako Pure Chemical Co., Ltd.) were charged, and then the interior of the system was replaced with nitrogen gas. After further introduction of 184.1 g of hexafluoropropylene (HFP) into the autoclave, the temperature was elevated to 60° C. The pressure at the time when the temperature in the autoclave reached 60° C. was 0.93 MPa. Under maintenance of the temperature in the autoclave at 60° C., the reaction was continued for 8 hr. Thereafter, the temperature in the autoclave was elevated to 80° C. and the reaction was continued for another hour. At the stage where the pressure became 0.44 MPa, heating was stopped, and the system was left for cooling. After the inner temperature lowered to room temperature, the unreacted monomer was purged. Then the autoclave was opened to take out the reaction solution. The yield of the polymer thus obtained was 217 g. The number average molecular weight of the polymer was 11,000.

Synthesis Example 7

Fluorine-containing polymer P54 was synthesized in substantially the same manner as in the synthesis of P49 in the above-described Synthesis Example. The number average molecular weight of the resulting polymer is shown in Table 5.

Synthesis Example 8

Synthesis of p-toluenesulfonic Acid Salt 3.0 g of diethylmethylamine was dissolved in 30 $cm^3$ of 2-butanone, to which was then gradually added 5.7 g of p-toluenesulfonic acid monohydrate while stirring. The stirring was continued for an additional one hour, and the solvent was then distilled off in vacuo. The obtained solid was recrystallized from acetone to obtain a diethylmethylamine salt of p-toluenesulfonic acid.

(Preparation of Sol Solution (a))

In a reactor equipped with a stirrer and a reflux condenser, 120 parts of methyl ethyl ketone, 100 parts of acryloyloxypropyl trimethoxysilane (KBM-5103, manufactured by Shin-Etsu Chemical Co., Ltd.) and 3 parts of diisopropoxyaluminum ethyl acetoacetate were added and mixed. After adding 30 parts of ion exchanged water, the mixture was allowed to react at 60° C. for 4 hours, followed by cooling to room temperature. The reaction product had a weight average molecular weight of 1,600, and among components including oligomer or polymer components, components having a molecular weight of from 1,000 to 20,000 accounted for 100%. Furthermore, the gas chromatographic analysis revealed that the starting acryloyloxypropyl trimethoxysilane did not remain at all. The reaction solution was adjusted with methyl ethyl ketone so as to have a solids content of 29%, thereby preparing a sol solution (a).

(Preparation of Sol Solution (b))

In a reactor equipped with a stirrer and a reflux condenser, 80 parts of acryloyloxypropyl trimethoxysilane, 20 parts of methyl trimethoxysilane (KBM-13, manufactured by Shin-Etsu Chemical Co., Ltd.) and 3 parts of diisopropoxyaluminum ethyl acetoacetate were added and mixed. After adding 30 parts of ion exchanged water, the mixture was allowed to react at 40° C. for 60 minutes. The reaction product had a weight average molecular weight of 800, and among components including oligomer or polymer components, components having a molecular weight of from 1,000 to 20,000 accounted for 30%. Furthermore, the gas chromatographic analysis revealed that the starting acryloyloxypropyl trimethoxysilane and methyl trimethoxysilane had a residual rate of not more than 10%.

(Preparation of Hollow Silica Dispersion A)

To 500 parts of a hollow silica fine particle sol (isopropyl alcohol silica sol, average particle size: 40 nm, shell thickness: 6 nm, silica concentration: 20% by weight, refractive index of silica particle: 1.30; as prepared by changing the size according to Preparation Example 4 of JP-A-2002-79616), 30 parts of acryloyloxypropyl trimethoxysilane (KBM-5.103, manufactured by Shin-Etsu Chemical Co., Ltd.), 2 parts of trimethyl methoxysilane and 1.5 parts of diisopropoxyaluminum ethyl acetoacetate were added and mixed. After adding 9 parts of ion exchanged water, the mixture was allowed to react at 60° C. for 8 hours. After cooling to room temperature, 1.8 parts of acetyl acetone was added.

Solvent substitution was carried out by distillation in vacuo under a pressure of 20 kPa while adding cyclohexanone to 500 g of this dispersion such that the content of silica became constant. The dispersion was free from the generation of a foreign matter. When the solids content was adjusted with cyclohexanone at 26% by weight, the viscosity was found to be 10 mPa·s at 25° C. The residual amount of isopropyl alcohol in the obtained dispersion A was analyzed by gas chromatography. As a result, it was found to be 1.0%.

[Preparation of Antireflection Film]

[Preparation of Coating Solutions for Low Refractive Index Layer (LLL-1 to LLL-53)]

The respective components as shown in Table 7 were mixed and dissolved in MEK to prepare coating solutions for low refractive index layer each having a solids content of 8%. The numerical values in the parenthesis in Table 7 express a part by weight of the solid of each of the components.

TABLE 7

| Coating solution No. | Fluorine-containing polymer No. | (Use amount) | Hardening agent Kind | (Use amount) | Hardening catalyst Kind | (Use amount) |
|---|---|---|---|---|---|---|
| LLL-1 | P1 | (85) | CYMEL 303 | (15) | PTS | (1.0) |
| LLL-2 | P1 | (73.5) | CYMEL 303 | (13.0) | PTS | (1.0) |
| LLL-3 | P1 | (59.5) | CYMEL 303 | (10.5) | PTS | (1.0) |
| LLL-4 | P1 | (48.0) | CYMEL 303 | (8.5) | PTS | (1.0) |
| LLL-5 | P1 | (48.0) | CYMEL 303 | (8.5) | PTS | (1.0) |
| LLL-6 | P1 | (48.0) | CYMEL 303 | (8.5) | PTS | (1.0) |
| LLL-7 | P37 | (85) | CYMEL 303 | (15) | PTS | (1.0) |
| LLL-8 | P37 | (73.5) | CYMEL 303 | (13.0) | PTS | (1.0) |
| LLL-9 | P37 | (59.5) | CYMEL 303 | (10.5) | PTS | (1.0) |
| LLL-10 | P37 | (48.0) | CYMEL 303 | (8.5) | PTS | (1.0) |
| LLL-11 | P37 | (48.0) | CYMEL 303 | (8.5) | PTS | (1.0) |
| LLL-12 | P37 | (48.0) | CYMEL 303 | (8.5) | PTS | (1.0) |
| LLL-13 | P39 | (85) | CYMEL 303 | (15) | PTS | (1.0) |
| LLL-14 | P39 | (73.5) | CYMEL 303 | (13.0) | PTS | (1.0) |
| LLL-15 | P39 | (59.5) | CYMEL 303 | (10.5) | PTS | (1.0) |
| LLL-16 | P39 | (48.0) | CYMEL 303 | (8.5) | PTS | (1.0) |
| LLL-17 | P39 | (48.0) | CYMEL 303 | (8.5) | PTS | (1.0) |
| LLL-18 | P39 | (48.0) | CYMEL 303 | (8.5) | PTS | (1.0) |
| LLL-19 | P39 | (48.0) | CYMEL 303 | (8.5) | PTS | (1.0) |
| LLL-20 | P18 | (48.0) | CYMEL 303 | (8.5) | PTS | (1.0) |
| LLL-21 | P18 | (48.0) | CYMEL 303 | (8.5) | PTS | (1.0) |
| LLL-22 | P45 | (48.0) | CYMEL 303 | (8.5) | PTS | (1.0) |
| LLL-23 | P45 | (48.0) | CYMEL 303 | (8.5) | PTS | (1.0) |
| LLL-24 | P1 | (48.0) | H-a/H-b (*2) | (8.5) | PTS | (1.0) |
| LLL-25 | P37 | (48.0) | H-a/H-b (*2) | (8.5) | PTS | (1.0) |
| LLL-26 | P18 | (48.0) | H-a/H-b (*2) | (8.5) | PTS | (1.0) |
| LLL-27 | P39 | (48.0) | H-a/H-b (*2) | (8.5) | PTS | (1.0) |
| LLL-28 | P45 | (48.0) | H-a/H-b (*2) | (8.5) | PTS | (1.0) |
| LLL-29 | P39 | (50.8) | CYMEL 303 | (5.7) | PTS | (1.0) |
| LLL-30 | P39 | (45.2) | CYMEL 303 | (11.3) | PTS | (1.0) |
| LLL-31 | P39 | (42.3) | CYMEL 303 | (14.2) | PTS | (1.0) |
| LLL-32 | P39 | (48.0) | TAKANATE D110 | (8.5) | — | — |
| LLL-33 | P37 | (48.0) | CYMEL 303 | (8.5) | PTS | (1.0) |
| LLL-34 | P37 | (48.0) | CYMEL 303 | (8.5) | PTS | (1.0) |
| LLL-35 | P37 | (44.6) | CYMEL 303 | (7.9) | PTS | (1.0) |
| LLL-36 | P39 | (48.0) | CYMEL 303 | (8.5) | PTS | (1.0) |
| LLL-37 | P39 | (48.0) | CYMEL 303 | (8.5) | PTS | (1.0) |
| LLL-38 | P39 | (44.6) | CYMEL 303 | (7.9) | PTS | (1.0) |
| LLL-39 | PR1 | (85) | CYMEL 303 | (15) | PTS | (1.0) |
| LLL-40 | PR1 | (73.5) | CYMEL 303 | (13.0) | PTS | (1.0) |
| LLL-41 | PR1 | (59.5) | CYMEL 303 | (10.5) | PTS | (1.0) |
| LLL-42 | PR1 | (48.0) | CYMEL 303 | (8.5) | PTS | (1.0) |
| LLL-43 | PR1 | (48.0) | CYMEL 303 | (8.5) | PTS | (1.0) |
| LLL-44 | PR1 | (48.0) | CYMEL 303 | (8.5) | PTS | (1.0) |
| LLL-45 | P49 | (80) | CYMEL 303 | (20) | PTS | (1.0) |
| LLL-46 | P49 | (69.2) | CYMEL 303 | (17.3) | PTS | (1.0) |
| LLL-47 | P49 | (56.0) | CYMEL 303 | (14.0) | PTS | (1.0) |
| LLL-48 | P49 | (45.2) | CYMEL 303 | (11.3) | PTS | (1.0) |
| LLL-49 | P49 | (45.2) | CYMEL 303 | (11.3) | PTS | (1.0) |
| LLL-50 | P49 | (45.2) | CYMEL 303 | (11.3) | PTS | (1.0) |
| LLL-51 | P49 | (45.2) | CYMEL 303 | (11.3) | PTS | (1.0) |
| LLL-52 | P54 | (42.4) | CYMEL 303 | (14.1) | PTS | (1.0) |
| LLL-53 | P54 | (42.4) | CYMEL 303 | (14.1) | PTS | (1.0) |

| Coating solution No. | Polyfunctional acrylate or sol Kind | (Use amount) | Colloidal silica Kind (Use amount) | (Use amount) | Polysiloxane Kind | (Use amount) | Remark |
|---|---|---|---|---|---|---|---|
| LLL-1 | — | — | — | — | FM-4425 | (3.0) | Comparison |
| LLL-2 | Sol solution (a) | (13.5) | — | — | FM-4425 | (3.0) | Invention |
| LLL-3 | — | — | MEK-ST-L | (30) | FM-4425 | (3.0) | Invention |
| LLL-4 | Sol solution (a) | (13.5) | MEK-ST-L | (30) | FM-4425 | (3.0) | Invention |
| LLL-5 | Sol solution (a) | (13.5) | MEK-ST-L | (30) | X-22-160AS | (3.0) | Invention |
| LLL-6 | Sol solution (a)/ DPHA (*1) | (13.5) | MEK-ST-L | (30) | FM-4425 | (3.0) | Invention |
| LLL-7 | — | — | — | — | FM-4425 | (3.0) | Comparison |
| LLL-8 | Sol solution (a) | (13.5) | — | — | FM-4425 | (3.0) | Invention |
| LLL-9 | — | — | MEK-ST-L | (30) | FM-4425 | (3.0) | Invention |

TABLE 7-continued

| | | | | | | | |
|---|---|---|---|---|---|---|---|
| LLL-10 | Sol solution (a) | (13.5) | MEK-ST-L | (30) | FM-4425 | (3.0) | Invention |
| LLL-11 | Sol solution (a) | (13.5) | MEK-ST-L | (30) | X-22-160AS | (3.0) | Invention |
| LLL-12 | Sol solution (a)/ DPHA (*1) | (13.5) | MEK-ST-L | (30) | FM-4425 | (3.0) | Invention |
| LLL-13 | — | — | — | — | — | — | Comparison |
| LLL-14 | Sol solution (a) | (13.5) | — | — | — | — | Invention |
| LLL-15 | — | — | MEK-ST-L | (30) | — | — | Invention |
| LLL-16 | Sol solution (a) | (13.5) | MEK-ST-L | (30) | — | — | Invention |
| LLL-17 | Sol solution (a) | (13.5) | MEK-ST-L | (30) | FM-4425 | (1.0) | Invention |
| LLL-18 | Sol solution (a) | (13.5) | MEK-ST-L | (30) | X-22-160AS | (1.0) | Invention |
| LLL-19 | Sol solution (a)/ DPHA (*1) | (13.5) | MEK-ST-L | (30) | FM-4425 | (1.0) | Invention |
| LLL-20 | Sol solution (a) | (13.5) | MEK-ST-L | (30) | — | — | Invention |
| LLL-21 | Sol solution (a) | (13.5) | MEK-ST-L | (30) | FM-4425 | (1.0) | Invention |
| LLL-22 | Sol solution (a) | (13.5) | MEK-ST-L | (30) | — | — | Invention |
| LLL-23 | Sol solution (a) | (13.5) | MEK-ST-L | (30) | FM-4425 | (1.0) | Invention |
| LLL-24 | Sol solution (a) | (13.5) | MEK-ST-L | (30) | X-22-160AS | (3.0) | Invention |
| LLL-25 | Sol solution (a) | (13.5) | MEK-ST-L | (30) | X-22-160AS | (3.0) | Invention |
| LLL-26 | Sol solution (a) | (13.5) | MEK-ST-L | (30) | — | — | Invention |
| LLL-27 | Sol solution (a) | (13.5) | MEK-ST-L | (30) | — | — | Invention |
| LLL-28 | Sol solution (a) | (13.5) | MEK-ST-L | (30) | — | — | Invention |
| LLL-29 | Sol solution (a) | (13.5) | MEK-ST-L | (30) | — | — | Invention |
| LLL-30 | Sol solution (a) | (13.5) | MEK-ST-L | (30) | — | — | Invention |
| LLL-31 | Sol solution (a) | (13.5) | MEK-ST-L | (30) | — | — | Invention |
| LLL-32 | Sol solution (a) | (13.5) | MEK-ST-L | (30) | — | — | Invention |
| LLL-33 | Sol solution (a) | (13.5) | MEK-ST-L/ MEK-ST (*3) | (30) | FM-4425 | (3.0) | Invention |
| LLL-34 | Sol solution (a) | (4.5) | Hollow silica | (30) | FM-4425 | (3.0) | Invention |
| LLL-35 | Sol solution (a) | (4.5) | Hollow silica/ MEK-ST-L (*4) | (39) | FM-4425 | (3.0) | Invention |
| LLL-36 | Sol solution (a) | (13.5) | MEK-ST-L/ MEK-ST (*3) | (30) | — | — | Invention |
| LLL-37 | Sol solution (a) | (4.5) | Hollow silica | (39) | — | — | Invention |
| LLL-38 | Sol solution (a) | (4.5) | Hollow silica/ MEK-ST-L (*4) | (48) | — | — | Invention |
| LLL-39 | — | — | — | — | FM-4425 | (3.0) | Comparison |
| LLL-40 | Sol solution (a) | (13.5) | — | — | FM-4425 | (3.0) | Comparison |
| LLL-41 | — | — | MEK-ST-L | (30) | FM-4425 | (3.0) | Comparison |
| LLL-42 | Sol solution (a) | (13.5) | MEK-ST-L | (30) | FM-4425 | (3.0) | Comparison |
| LLL-43 | Sol solution (a) | (13.5) | MEK-ST-L | (30) | X-22-160AS | (3.0) | Comparison |
| LLL-44 | Sol solution (a)/ DPHA (*1) | (13.5) | MEK-ST-L | (30) | FM-4425 | (3.0) | Comparison |
| LLL-45 | — | — | — | — | — | — | Comparison |
| LLL-46 | Sol solution (a) | (13.5) | — | — | — | — | Invention |
| LLL-47 | — | — | MEK-ST-L | (30) | — | — | Invention |
| LLL-48 | Sol solution (a) | (13.5) | MEK-ST-L | (30) | — | — | Invention |
| LLL-49 | Sol solution (a) | (4.5) | Hollow silica | (39) | — | — | Invention |
| LLL-50 | Sol solution (a) | (13.5) | MEK-ST-L | (30) | FM-4425 | (1.0) | Invention |

TABLE 7-continued

| | | | | | | | |
|---|---|---|---|---|---|---|---|
| LLL-51 | (a)/ DPHA (*1) | (13.5) | MEK-ST-L | (30) | FM-4425 | (1.0) | Invention |
| LLL-52 | Sol solution (a) | (13.5) | MEK-ST-L | (30) | — | — | Invention |
| LLL-53 | Sol solution (a) | (13.5) | MEK-ST-L | (30) | FM-4425 | (1.0) | Invention |

(*1) Mixture of sol solution (a) and DPHA (1/1) (weight ratio)
(*2) Mixture of MEK-ST-L and MEK-ST (3/7) (weight ratio)
(*3) Mixture of hollow silica and MEK-ST-L (39/9) (weight ratio)

Furthermore, the material names and product names in the table are as follows.

MEK-ST: Colloidal silica manufactured by Nissan Chemical Industries, Ltd., average particle size: 10 to 15 nm MEK-ST-L: Colloidal silica manufactured by Nissan Chemical Industries, Ltd., average particle size: about 50 nm Hollow silica: Foregoing hollow silica dispersion A. The solids content in the foregoing table expresses the total sum of silica and surface treating agent.

CYMEL 303: Methyloled melamine, manufactured by Nihon Cytec Industries Inc.

TAKENATE D110: Isocyanate based hardening agent, manufactured by Takeda Pharmaceutical Industries Limited DPHA: UV hardenable resin, manufactured by Nippon Kayaku Co., Ltd.

PTS: p-Toluenesulfonic acid monohydrate

H-a and H-b are compounds having the following structures.

H-a

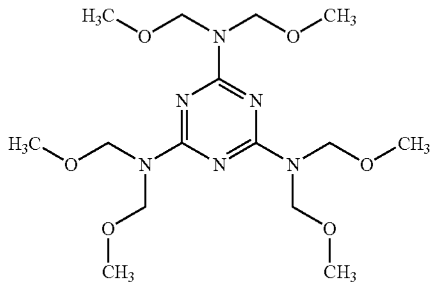

H-b

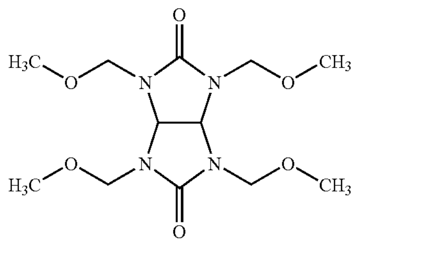

The fluorine-containing polymer PR1 in Table 7 is a compound having the following structure and is one as synthesized under the same condition as described in the following patent document.

PR1: Copolymer of Example 2 as described in Japanese Patent No. 3498481.

The numerals express a molar fraction of each of the monomers.

PR 1

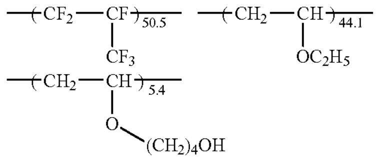

| [Preparation of coating solution for antiglare layer (HCL-1)] | |
|---|---|
| PET-30: | 50.0 g |
| IRGACURE 184: | 2.0 g |
| SX-350 (30%): | 1.5 g |
| Crosslinked acryl-styrene particle (30%): | 13.9 g |
| Sol solution (b): | 10.0 g |
| Toluene: | 38.5 g |

The foregoing mixed solution was filtered through a polypropylene-made filter having a pore size of 30 μm, thereby preparing a coating solution for hard coat layer (HCL-1).

The compounds as used herein are as follows.

PET-30: Mixture of pentaerythritol acrylate and pentaerythritol tetraacrylate (manufactured by Nippon Kayaku Co., Ltd.)

IRGACURE 184: Polymerization initiator (manufactured by Ciba Speciality Chemicals)

SX-350: Crosslinked polystyrene particle having an average particle size of 3.5 μm (refractive index: 1.60, manufactured by Soken Chemical & Engineering Co., Ltd.; 30% toluene dispersion, as used after dispersing by a Polytron dispersing machine at 10,000 rpm for 20 minutes)

[Preparation of Antireflection Film Sample 101]

An 80 μm-thick triacetyl cellulose film "TAC-TD80U" (manufactured by Fuji Photo Film Co., Ltd.) was wound out in a rolled state; the foregoing coating solution for hard coat layer (HCL-1) was coated directly thereon by using a microgravure roll with a gravure pattern having 180 lines per inch and a depth of 40 μm and having a diameter of 50 mm and a doctor blade under a condition at a resolution number of gravure roll of 30 rpm and a conveyance rate of 30 m/min; after drying at 60° C. for 150 seconds, the coating layer was hardened upon irradiation with ultraviolet rays having a radiation illuminance of 400 $mW/cm^2$ and an irradiation dose of 100 $mJ/cm^2$ by using an air-cooled metal halide lamp (manufactured by Eyegraphics Co., Ltd.) of 160 W/cm under purging with nitrogen in an oxygen concentration of 0.1% by volume, thereby forming a layer having a thickness of 6 μm, followed by winding up. The thus prepared and obtained antiglare layer (HC-1) had a surface roughness of Ra=0.18 μm and Rz=1.40 μm, a surface haze of 12% and an internal haze of 29%.

On the thus obtained antiglare layer, the foregoing coating solution for low refractive index layer (LLL-1) was coated such that the low refractive index layer had a thickness of 95 nm, thereby preparing an antireflection film sample 101. With respect to the coating solution, the respective components were mixed for 2 hours and then applied; with respect to the drying condition, the low refractive index layer was dried at 110° C. for 10 minutes; and with respect to the ultraviolet ray hardening condition, ultraviolet rays were irradiated at a radiation illuminance of 120 $mW/cm^2$ and an irradiation energy intensity of 240 $mJ/cm^2$ by using an air-cooled metal halide lamp (manufactured by Eyegraphics Co., Ltd.) of 240 W/cm under purging with nitrogen in an atmosphere having an oxygen concentration of not more than 0.01% by volume.

[Preparation of Antireflection Films 102 to 153]

Antireflection films 102 to 153 were prepared in the same manner as in the antireflection film 101, except that in the preparation of the antireflection film 101, the coating solution for low refractive index layer (LLL-1) was replaced by each of the coating solutions (LLL-2) to (LLL-53).

[Saponification Treatment of Antireflection Film]

Each of the obtained antireflection films was treated and dried under the following saponification standard condition.

Alkaline bath: Sodium hydroxide aqueous solution of 1.5 $moles/dm^3$ at 55° C. for 120 seconds First water washing bath: Tap water for 60 seconds Neutralization bath: Sulfuric acid of 0.05 $moles/dm^3$ at 30° C. for 20 seconds Second water washing bath: Tap water for 60 seconds Drying: 120° C., 60 seconds

[Evaluation of Antireflection Film]

Each of the thus obtained saponified antireflection films was evaluated in the following manners.

(Evaluation 1) Measurement of Average Reflectance:

An average reflectance at from 450 to 650 nm was employed by the method as described in this specification. With respect to the sample as processed into a polarizing plate, the sample in a polarizing plate state was used as it was; and in the case of a film itself or a display device in a state of not using a polarizing plate, the back surface of the antireflection film was subjected to a roughing treatment and then to a light absorption treatment with a black ink (transmittance at 380 to 780 nm: less than 10%), followed by providing for the measurement on a black table.

(Evaluation 2) Evaluation of Scar Resistance by Steel Wool:

The test was carried out by the method as described in this specification, an oily black ink was applied in the rear side of the rubbed sample, and a scar in the rubbed portion was visually observed by reflected light and evaluated according to the following criteria. A load was set up at 500 $g/cm^2$.

A: Even by very careful observation, a scar is not observed at all.

AB: By every careful observation, a weak scar is slightly observed.

B: A weak scar is observed.

BC: A scar is observed to a medium extent.

C: A scar is observed at the first glance.

(Evaluation 3) Evaluation of Scar Resistance by Eraser Rubbing:

The test was carried out by the method as described in this specification, an oily black ink was applied in the rear side of the rubbed sample, and a scar in the rubbed portion was visually observed by reflected light and evaluated according to the following criteria.

A: Even by very careful observation, a scar is not observed at all.

AB: By every careful observation, a weak scar is slightly observed.

B: A weak scar is observed.

BC: A scar is observed to a medium extent.

C: A scar is observed at the first glance.

CC: The entire surface of the film is scared.

(Evaluation 4) Marker Ink Wiping Properties:

The test was carried out by the method as described in this specification, and the number of wiping until the marker ink disappeared was determined. It is preferable that the number of wiping until the maker ink disappears is five or more; and it is more preferable that the number of wiping until the maker ink disappears is ten or more.

(Evaluation 5) Dust Removal Properties:

The test was carried out by the method as described in this specification, and the number of wiping until the dust was completely removed was determined. It is preferable that the dust can be completely removed by wiping of six times; and it is more preferable that the dust can be completely removed by wiping within three times.

The evaluation results are shown in Table 8.

TABLE 8

| Antireflection film No. | Coating solution for low refractive index layer No. | Reflectance (%) | SW resistance | Eraser rubbing resistance | Marker ink wiping properties | Dust removal properties | Remark |
|---|---|---|---|---|---|---|---|
| 101 | LLL-1 | 1.90 | C | A | 2 | 8 | Comparison |
| 102 | LLL-2 | 1.90 | AB | A | 6 | 6 | Invention |
| 103 | LLL-3 | 1.92 | AB | A | 5 | 6 | Invention |
| 104 | LLL-4 | 1.92 | A | A | 7 | 5 | Invention |
| 105 | LLL-5 | 1.92 | A | A | 7 | 5 | Invention |
| 106 | LLL-6 | 1.92 | A | A | 7 | 5 | Invention |
| 107 | LLL-7 | 1.88 | C | A | 2 | 8 | Comparison |
| 108 | LLL-8 | 1.88 | A | A | 6 | 6 | Invention |
| 109 | LLL-9 | 1.90 | AB | A | 5 | 6 | Invention |
| 110 | LLL-10 | 1.90 | A | A | 8 | 5 | Invention |
| 111 | LLL-11 | 1.90 | A | A | 8 | 5 | Invention |
| 112 | LLL-12 | 1.90 | A | A | 8 | 5 | Invention |
| 113 | LLL-13 | 1.88 | C | AB | 3 | 7 | Comparison |
| 114 | LLL-14 | 1.88 | A | A | 6 | 5 | Invention |
| 115 | LLL-15 | 1.90 | AB | A | 6 | 5 | Invention |
| 116 | LLL-16 | 1.90 | A | A | 11 | 4 | Invention |
| 117 | LLL-17 | 1.90 | A | A | 15 | 3 | Invention |
| 118 | LLL-18 | 1.90 | A | A | 15 | 3 | Invention |
| 119 | LLL-19 | 1.90 | A | A | 15 | 3 | Invention |

TABLE 8-continued

| Antireflection film No. | Coating solution for low refractive index layer No. | Reflectance (%) | SW resistance | Eraser rubbing resistance | Marker ink wiping properties | Dust removal properties | Remark |
|---|---|---|---|---|---|---|---|
| 120 | LLL-20 | 1.91 | A | A | 10 | 4 | Invention |
| 121 | LLL-21 | 1.91 | A | A | 13 | 3 | Invention |
| 122 | LLL-22 | 1.89 | A | A | 12 | 3 | Invention |
| 123 | LLL-23 | 1.89 | A | A | 15 | 3 | Invention |
| 124 | LLL-24 | 1.92 | A | A | 7 | 6 | Invention |
| 125 | LLL-25 | 1.90 | A | A | 8 | 6 | Invention |
| 126 | LLL-26 | 1.91 | A | A | 11 | 4 | Invention |
| 127 | LLL-27 | 1.90 | A | A | 13 | 4 | Invention |
| 128 | LLL-28 | 1.89 | A | A | 15 | 4 | Invention |
| 129 | LLL-29 | 1.89 | AB | AB | 10 | 4 | Invention |
| 130 | LLL-30 | 1.90 | A | A | 11 | 4 | Invention |
| 131 | LLL-31 | 1.91 | A | A | 11 | 4 | Invention |
| 132 | LLL-32 | 1.90 | A | A | 11 | 4 | Invention |
| 133 | LLL-33 | 1.90 | A | AB | 7 | 6 | Invention |
| 134 | LLL-34 | 1.42 | A | AB | 6 | 6 | Invention |
| 135 | LLL-35 | 1.42 | A | A | 8 | 6 | Invention |
| 136 | LLL-36 | 1.90 | A | AB | 10 | 5 | Invention |
| 137 | LLL-37 | 1.42 | A | A | 9 | 5 | Invention |
| 138 | LLL-38 | 1.42 | A | A | 12 | 5 | Invention |
| 139 | LLL-39 | 1.88 | C | CC | 1 | 9 | Comparison |
| 140 | LLL-40 | 1.88 | C | CC | 1 | 9 | Comparison |
| 141 | LLL-41 | 1.90 | BC | C | 1 | 9 | Comparison |
| 142 | LLL-42 | 1.90 | BC | BC | 2 | 8 | Comparison |
| 143 | LLL-43 | 1.90 | BC | BC | 2 | 8 | Comparison |
| 144 | LLL-44 | 1.90 | BC | BC | 2 | 8 | Comparison |
| 145 | LLL-45 | 1.90 | C | A | 4 | 4 | Comparison |
| 146 | LLL-46 | 1.90 | A | A | 8 | 3 | Invention |
| 147 | LLL-47 | 1.92 | AB | A | 8 | 3 | Invention |
| 148 | LLL-48 | 1.92 | A | A | 13 | 3 | Invention |
| 149 | LLL-49 | 1.45 | A | A | 11 | 3 | Invention |
| 150 | LLL-50 | 1.92 | A | A | 18 | 2 | Invention |
| 151 | LLL-51 | 1.92 | A | A | 18 | 2 | Invention |
| 152 | LLL-52 | 1.94 | A | A | 14 | 2 | Invention |
| 153 | LLL-53 | 1.94 | A | A | 18 | 2 | Invention |

As is clear from the present Examples, it is noted that the antireflection films using a polymer copolymer having a hydroxyl group content exceeding 20% according to the invention and containing the constitutional components of the invention are excellent in SW rubbing resistance and eraser rubbing resistance and excellent in antifouling properties.

The improvements in various performances by the matter that the hydroxyl group content in the fluorine-containing polymer are shown by the comparison between the antireflection films 101 to 112 and the antireflection films 139 to 144.

Furthermore, it is noted that by having a polysiloxane structure as a polymer graft chain, the marker ink wiping properties are largely improved (compare the antireflection films 107 to 112 and 113 to 119).

Moreover, it is noted that by using hollow silica, the reflectance is largely lowered (see the antireflection films 134, 135, 137, 138 and 149).

Example 2

[Preparation of Antireflection Film]

[Preparation of Coating Solutions for Low Refractive Index Layer (LLL-54 to LLL-63)]

Coating solutions LLL-54 to LLL-58 and LLL-59 to LLL-63 were prepared in the same manner as in the preparation of the coating solutions for low refractive index layer (LLL-17 and LLL-38), except for changing the kind of the hardening catalyst as shown in Table 8. In changing the hardening catalyst, the change was made such that an acid was used in an equivalent molar amount. A base was used in an equivalent amount (1/1) to the acid.

(Preparation of Coating Solution for Hard Coat Layer (HCL-2))

To 90 parts by weight of MEK, 10 parts by weight of cyclohexanone, 85 parts by weight of a polyfunctional acrylate partially modified with caprolactone (DPCA-20, manufactured by Nippon Kayaku Co., Ltd.), 10 parts by weight of KBM-5103 (silane coupling agent as manufactured by Shin-Etsu Chemical Co., Ltd.), and 5 parts by weight of a photopolymerization initiator (IRGACURE 184, manufactured by Ciba Speciality Chemicals) were added and stirred. The mixture was filtered through a poly-propylene-made filter having a pore size of 0.4 μm, thereby preparing a coating solution for hard coat layer (HCL-2).

[Preparation and Evaluation of Antireflection Film Samples 201 to 212]

An 80 μm-thick triacetyl cellulose film “TAC-TD80U” (manufactured by Fuji Photo Film Co., Ltd.) was wound out in a rolled state; the foregoing coating solution for hard coat layer (HCL-2) was coated directly thereon by using a microgravure roll with a gravure pattern having 180 lines per inch and a depth of 40 μm and having a diameter of 50 mm and a doctor blade under a condition at a resolution number of gravure roll of 30 rpm and a conveyance rate of 30 n/min; after drying at 60° C. for 150 seconds, the coating layer was hardened upon irradiation with ultraviolet rays having a radiation illuminance of 400 $mW/cm^2$ and an irradiation energy intensity of 100 $mJ/cm^2$ by using an air-cooled metal halide lamp (manufactured by Eyegraphics Co., Ltd.) of 160 W/cm under purging with nitrogen in an oxygen concentration of 0.1% by volume, thereby forming a layer having a thickness of 7 μm, followed by winding up. The thus prepared and obtained antiglare layer (HC-2) had a surface roughness of Ra=0.005 μm and Rz=0.01 μm.

The foregoing low refractive index layer was coated and provided on the hard coat layer HC-2 in the same manner as in Example 1, thereby preparing antireflection films 201 to 212. With respect to the time of from the preparation of a low refractive index layer to coating, the standard condition was set up at 2 hours. Furthermore, a sample in which the thermal hardening time was shortened to 5 minutes at 110° C. was prepared at the same time, subjected to a saponification treatment under the same condition as in Example 1 and evaluated for the eraser rubbing resistance.

In addition, the coating solution for low refractive index layer was stored under a light-shielding and sealed condition at 30° C. for one month and three months, respectively and then coated. An oily black ink was applied on the back surface of the coating film, and the surface properties on an A4-size area were evaluated according to the following criteria.

A: Even by very careful observation, fault is not observed at all.

AB: By every careful observation, fault is slightly observed (one to three/A4).

B: Weak fault is observed (four to ten/A4).

C: Fault is observed at the first glance (eleven or more/A4).

The evaluation results are shown in Table 9.

As is clear from the present Examples, it is noted that an antireflection film which is excellent in storage stability of the coating solution and excellent in scar resistance can be obtained by using, as the hardening catalyst, an acid in combination with the base of the invention

Example 3

A multilayered antireflection film as described below was prepared.

The following composition was thrown into a mixing tank and stirred to prepare a coating solution for hard coat layer.

To 750.0 parts by weight of trimethylolpropane triacrylate (TMPTA, manufactured by Nippon Kayaku Co., Ltd.), 270.0 parts by weight of poly(glycidyl methacrylate) having a weight average molecular weight of 15,000, 730.0 parts by weight of methyl ethyl ketone, 500.0 parts by weight of cyclohexanone, 25.0 parts by weight of a photo cationic polymerization initiator (RHODORSIL 2074) and 50.0 parts by weight of a photopolymerization initiator (IRGACURE 184, manufactured by Ciba Speciality Chemicals) were added and stirred.

The mixture was filtered through a polypropylene-made filter having a pore size of 0.4 μm, thereby preparing a coating solution for hard coat layer (HCL-3).

(Preparation of Titanium Dioxide Fine Particle Dispersion)

A titanium dioxide fine particle containing a cobalt and having been subjected to a surface treatment with aluminum hydroxide and zirconium hydroxide (MPT-129C, manufac-

TABLE 9

| Antireflection film No. | Coating solution No. | Hardening agent Kind | Hardening agent (Use amount) | Hardening catalyst Acid | Hardening catalyst Base Kind | Base pKa | Base Boiling point |
|---|---|---|---|---|---|---|---|
| 201 | LLL-17 | CYMEL 303 | (8.5) | PTS | — | — | — |
| 202 | LLL-54 | CYMEL 303 | (8.5) | PTS | b-1 | 5.1 | 64 |
| 203 | LLL-55 | CYMEL 303 | (8.5) | PTS | b-14 | 7.8 | 115 |
| 204 | LLL-56 | CYMEL 303 | (8.5) | PTS | b-19 | 10.7 | 88.5 |
| 205 | LLL-57 | CYMEL 303 | (8.5) | PTS | b-23 | 10.5 | 64 |
| 206 | LLL-58 | CYMEL 303 | (8.5) | DBS | b-23 | 10.5 | 64 |
| 207 | LLL-38 | CYMEL 303 | (7.9) | PTS | — | — | — |
| 208 | LLL-59 | CYMEL 303 | (7.9) | PTS | b-1 | 5.1 | 64 |
| 209 | LLL-60 | CYMEL 303 | (7.9) | PTS | b-14 | 7.8 | 115 |
| 210 | LLL-61 | CYMEL 303 | (7.9) | PTS | b-19 | 10.7 | 88.5 |
| 211 | LLL-62 | CYMEL 303 | (7.9) | PTS | b-23 | 10.5 | 64 |
| 212 | LLL-63 | CYMEL 303 | (7.9) | DBS | b-23 | 10.5 | 64 |

TABLE 8

(Cont'd.)

| Antireflection film No. | Eraser rubbing resistance (Cured at 110° C. for 10 minutes) | Eraser rubbing resistance (Cured at 110° C. for 5 minutes) | Coating surface properties after elapsing one moth | Coating surface properties after elapsing three moths | Remark |
|---|---|---|---|---|---|
| 201 | A | A | C | CC | Invention |
| 202 | A | A | A | AB | Invention |
| 203 | A | A | A | A | Invention |
| 204 | A | AB | A | A | Invention |
| 205 | A | A | A | A | Invention |
| 206 | A | A | A | A | Invention |
| 207 | A | A | C | CC | Invention |
| 208 | A | A | A | AB | Invention |
| 209 | A | A | A | A | Invention |
| 210 | A | AB | A | A | Invention |
| 211 | A | A | A | A | Invention |
| 212 | A | A | A | A | Invention |

tured by Ishihara Sangyo Kaisha, Ltd., $TiO_2$/Co3$O_4$/Al2$O_3$/$ZrO_3$=90.5/3.0/4.0/0.5 (weight ratio)) was used as the titanium dioxide fine particle.

To 257.1 parts by weight of this particle, 41.1 parts by weight of the following dispersant and 701.8 parts by weight of cyclohexanone were added, and the mixture was dispersed by a Dyno-Mill, thereby preparing a titanium dioxide dispersion having a weight average particle size of 70 nm.

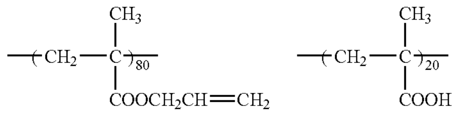

(Preparation of Coating Solution for Middle Refractive Index Layer)

To 99.1 parts by weight of the foregoing titanium dioxide dispersion, 68.0 parts by weight of a mixture (DPHA) of dipentaerythritol pentaacrylate and dipentaerythritol hexaacrylate, 3.6 parts by weight of a photopolymerization initiator (IRGACURE 907), 1.2 parts by weight of a photosensitizer (KAYACURE DETX, manufactured by Nippon Kayaku Co., Ltd.), 279.6 parts by weight of methyl ethyl ketone, and 1,049.0 parts by weight of cyclohexanone were added and stirred. After thoroughly stirring, the mixture was filtered through a polypropylene-made filter having a pore size of 0.4 μm, thereby preparing a coating solution for middle refractive index layer.

(Preparation of Coating Solution for High Refractive Index Layer)

To 469.8 parts by weight of the foregoing titanium dioxide dispersion, 40.0 parts by weight of a mixture (DPHA) of dipentaerythritol pentaacrylate and dipentaerythritol hexaacrylate, 3.3 parts by weight of a photopolymerization initiator (IRGACURE 907, manufactured by Ciba Speciality Chemicals), 1.1 parts by weight of a photosensitizer (KAYACURE DETX, manufactured by Nippon Kayaku Co., Ltd.), 526.2 parts by weight of methyl ethyl ketone, and 459.6 parts by weight of cyclohexanone were added and stirred. The mixture was filtered through a polypropylene-made filter having a pore size of 0.4 μm, thereby preparing a coating solution for high refractive index layer.

(Preparation of Antireflection Film (301))

The foregoing coating solution for hard coat layer was coated on an 80 μm-thick triacetyl cellulose film (TAC-TD80U, manufactured by Fuji Photo Film Co., Ltd.) by using a gravure coater. After drying at 100° C., the coating layer was hardened upon irradiation with ultraviolet rays having a radiation illuminance of 400 mW/$cm^2$ and an irradiation energy intensity of 300 mJ/$cm^2$ by using an air-cooled metal halide lamp (manufactured by Eyegraphics Co., Ltd.) of 160 W/cm under purging with nitrogen in an oxygen concentration of 1.0% by volume, thereby forming a hard coat layer having a thickness of 8 μm.

On the hard coat layer, the coating solution for middle refractive index layer, the coating solution for high refractive index layer, and the coating solution for low refractive index layer (LLL-1) were continuously coated by using a gravure coater having three coating stations.

With respect to the drying condition, the middle refractive index layer was dried at 90° C. for 30 seconds; and with respect to the ultraviolet ray hardening condition, ultraviolet rays were irradiated at a radiation illuminance of 400 mW/$cm^2$ and an irradiation energy intensity of 400 mJ/$cm^2$ by using an air-cooled metal halide lamp (manufactured by Eyegraphics Co., Ltd.) of 180 W/cm under purging with nitrogen in an atmosphere having an oxygen concentration of not more than 0.1% by volume. The middle refractive index layer after hardening had a refractive index of 1.630 and a thickness of 67 nm.

With respect to the drying condition, the high refractive index layer was dried at 90° C. for 30 seconds; and with respect to the ultraviolet ray hardening condition, ultraviolet rays were irradiated at a radiation illuminance of 600 mW/$cm^2$ and an irradiation energy intensity of 400 mJ/$cm^2$ by using an air-cooled metal halide lamp (manufactured by Eyegraphics Co., Ltd.) of 240 W/cm under purging with nitrogen in an atmosphere having an oxygen concentration of not more than 0.1% by volume.

The high refractive index layer after hardening had a refractive index of 1.905 and a thickness of 107 nm.

With respect to the drying condition, the low refractive index layer was dried at 110° C. for 10 minutes; and with respect to the ultraviolet ray hardening condition, ultraviolet rays were irradiated at a radiation illuminance of 120 mW/$cm^2$ and an irradiation energy intensity of 480 mJ/$cm^2$ by using an air-cooled metal halide lamp (manufactured by Eyegraphics Co., Ltd.) of 240 W/cm under purging with nitrogen in an atmosphere having an oxygen concentration of not more than 0.01% by volume.

The low refractive index layer after hardening had a refractive index of 1.45 and a thickness of 85 nm.

Samples 302 to 353 were prepared in the same as in the preparation of the thus obtained Sample 301, except for changing the coating solution for low refractive index layer to (LLL-2) to (LLL-53), respectively. As a result of the saponification treatment and evaluation according to Example 1, the reflectance was largely lowered in all of the samples by providing a middle refractive index layer and a high refractive index layer. It was noted that an antireflection film having low reflection and having excellent marker ink wiping properties and scar resistance is obtained according to the invention.

In addition, a sample was prepared by adding KBM-5103 (silane coupling agent as manufactured by Shin-Etsu Chemical Co., Ltd.) in an amount of 5% by weight based on the whole of solids in the high refractive index layer and evaluated. As a result, in the case of using a fluorine-containing polymer having a hydroxyl group amount exceeding 20% by mole, the steel wall rubbing resistance was especially improved.

Example 4

(Preparation of Coating Solution for Hard Coat Layer (HCL-4))

100 parts by weight of DeSolite Z7404 (zirconia fine particle-containing hard coat composition solution as manufactured by JSR Corporation), 31 parts by weight of DPHA (UV hardenable resin as manufactured by Nippon Kayaku Co., Ltd.), 10 parts by weight of KBM-5103 (silane coupling agent as manufactured by Shin-Etsu Chemical Co., Ltd.), 8.9 parts by weight of KE-P150 (1.5 μm-silica particle as manufactured by Nippon Shokubai Co., Ltd.), 3.4 parts by weight of MXS-300 (3 μm-crosslinked PMMA particle as manufactured by Soken Chemical & Engineering Co., Ltd.), 29 parts by weight of MEK, and 13 parts by weight of MIBK were thrown in a mixing tank and stirred, thereby preparing a coating solution for hard coat layer.

(Preparation of Antireflection Film)

As a support, a triacetyl cellulose film (TD80U, manufactured by Fuji Photo Film Co., Ltd.) was wound out in a rolled state; the foregoing coating solution for hard coat layer was coated directly thereon by using a microgravure roll with a gravure pattern having 135 lines per inch and a depth of 60 μm and having a diameter of 50 mm and a doctor blade under a condition at a conveyance rate of 10 m/min; after drying at 60° C. for 150 seconds, the coating layer was further hardened upon irradiation with ultraviolet rays having a radiation illuminance of 400 $mW/cm^2$ and an irradiation energy intensity of 250 $mJ/cm^2$ by using an air-cooled metal halide lamp (manufactured by Eyegraphics Co., Ltd.) of 160 W/cm under purging with nitrogen, thereby forming a hard coat layer, followed by winding up. A hard coat 401 was prepared by adjusting the revolution number of the gravure roll such that the hard coat layer after hardening had a thickness of 4.0 μm. The thus obtained hard coat 401 had a surface roughness of Ra=0.02 μm, PMS=0.03 μm and Rz=0.25 μm. (Ra (center line mean roughness), RMS (square mean surface roughness) and Rz (n-point mean roughness) were measured by a scanning probe microscope system SPI3800, manufactured by Seiko Instruments Inc.)

On the hard coat 401, the low refractive index layer of Example 1 was coated and provided, and the resulting antireflection film was subjected to a saponification treatment and evaluated according to Example 1. As a result, it was noted that an antireflection film having low reflection and having excellent scar resistance and marker ink wiping properties is obtained according to the invention.

Example 5

(Preparation of Coating Solution for Hard Coat Layer (HCL-5))

To 40 parts by mass of MEK, 15 parts by mass of cyclohexanone, 28 parts by mass of a mixture of pentaerythritol triacrylate and pentaerythritol tetraacrylate (PET-30, a product of Nippon Kayaku Co., Ltd.), 12 parts by mass of a mixture of dipentaerythritol pentaacrylate and dipentaerythritol hexaacrylate (DPHA, a product of Nippon Kayaku Co., Ltd.), and 5 parts by mass of aggregated silica (secondary aggregate diameter: 1.5 μm, primary particle diameter: several ten nm, a product of Nihon Silica Co., Ltd.), one part by mass of a photopolymerization initiator (Irgacure 184, a product of Ciba Specialty Chemicals), 0.2 parts by mass of a photopolymerization initiator (Irgacure 907, Ciba Specialty Chemicals), and 0.08 parts by mass of a fluorine-based surface modifying agent (SP-13) were added under stirring to prepare a coating solution (HCL-5) for a hard coat layer.

Fluorine-based Surface Modifying Agent SP-13:

SP-13

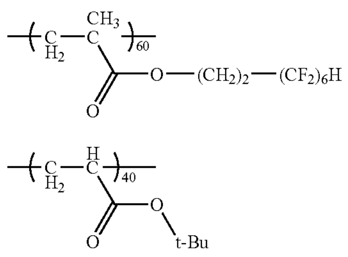

Mw 14000

(Coating of Hard Coat 501)

An 80 μm-thick triacetyl cellulose film "TAC-TD80U" (manufactured by Fuji Photo Film Co., Ltd.) was wound out in a rolled state; the foregoing coating solution for hard coat layer (HCL-5) was coated directly thereon by extrusion with use of a coater equipped with a throttle die under a condition of a conveyance rate of 30 m/min. After drying at 30° C. for 15 seconds followed by drying at 90° C. for 20 sec, the coating layer was hardened upon irradiation with ultraviolet rays of an irradiation dose of 90 $mJ/cm^2$ by using an air-cooled metal halide lamp (manufactured by Eyegraphics Co., Ltd.) of 160 W/cm under purging with nitrogen, thereby forming an anti-glare layer provided with anti-glare nature and with a thickness of 2.5 μm. Hard coat 501 was obtained by winding the film. The surface haze of hard coat 501 was 6, and the internal haze was 1.

Coating solutions for a low refractive index layer were prepared by adding 0.5 parts by mass of PM980M (a photopolymerization initiator, a product of Wako Pure Chemical) to the coating solutions LLL-51 and LLL-53 for low refractive index layer in Example 1. On the hard coat 501, these coating solutions for low refractive index layer were coated. The coated product was subjected to saponification treatment and evaluated in conformity with the method in Example 1. As a result, it was reproduced to obtain an anti-reflection film exhibiting low reflection, excellent scar resistance and marker ink wiping properties.

Example 6

<Preparation of Antireflection Film-provided Polarizing Plate>

Iodine was adsorbed on a stretched polyvinyl alcohol film to prepare a polarizing film. The saponification treated antireflection film of Example 1 was stuck to one side of the polarizing film by using a polyvinyl alcohol based adhesive such that the support (triacetyl cellulose) side of the antireflection film was faced at the polarizing film side. A viewing angle enlargement film having an optical compensating layer, "WIDE VIEW FILM SA12B" (manufactured by Fuji Photo Film Co., Ltd.) was subjected to a saponification treatment and stuck to the other side of the polarizing film by using a polyvinyl alcohol based adhesive. There was thus prepared a polarizing plate. This polarizing plate was evaluated according to Example 1. As a result, the same effect was obtained by using the low refractive index layer of the invention.

Example 7

It could be confirmed that transmission type liquid crystal display devices of a TN mode, having the thus prepared polarizing plate of the invention installed therein, were excellent in visibility, scar resistance and antifouling properties.

Example 8

The antireflection film sample of Example 2 was stuck to a glass plate on the surface of an organic EL display device via an adhesive. As a result, the reflection on the glass surface was suppressed so that a display device having high visibility was obtained.

This application is based on Japanese Patent application JP 2005-225478, filed August 3, 2005, and Japanese Patent application JP 2006-112368, filed Apr. 14, 2006, the entire contents of which are hereby incorporated by reference, the same as if set forth at length.

What is claimed is:

1. An antireflection film comprising a support and a low refractive index layer prepared by coating a coating composition containing the following components:

(A) a fluorine-containing polymer having, a principal chain which is made of only carbon atoms and the fluorine-containing polymer contains at least one fluorine-containing vinyl monomer polymerization unit and at least one hydroxyl group-containing vinyl monomer polymerization unit, wherein a content of the hydroxyl group-containing vinyl monomer polymerization unit exceeds 20% by mole, provided that the polymer does not have a polysiloxane structure in the principal chain;

(B) a crosslinking agent that reacts with a hydroxyl group; and (C) a compound containing two or more (meth)acryloyl groups in one molecule thereof, wherein the fluorine-containing polymer contains at least one polymerization unit having a graft site containing, in a side chain thereof, a polysiloxane repeating unit represented by the following formula (1):

Formula (1)

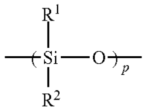

wherein $R^1$ and $R^2$ may be the same or different and each represents an alkyl group or an aryl group; and p represents an integer of from 10 to 500; and wherein the coating composition further contains at least one salt comprising an organic base having a pKa of from 5.0 to 10.5 in terms of a conjugated acid thereof and an acid.

2. An antireflection film comprising a support and a low refractive index layer prepared by coating a coating composition containing the following components:

(A) a fluorine-containing polymer having, a principal chain which is made of only carbon atoms and the fluorine-containing polymer contains at least one fluorine-containing vinyl monomer polymerization unit and at least one hydroxyl group-containing vinyl monomer polymerization unit, wherein a content of the hydroxyl group-containing vinyl monomer polymerization unit exceeds 20% by mole, provided that the polymer does not have a polysiloxane structure in the principal chain;

(B) a crosslinking agent that reacts with a hydroxyl group; and (D) an organosilane compound or a composition containing at least one of a hydrolyzate of the organosilane compound and a partial condensate of the organosilane compound, wherein the fluorine-containing polymer contains at least one polymerization unit having a graft site containing, in a side chain thereof, a polysiloxane repeating unit represented by the following formula (1):

Formula (1)

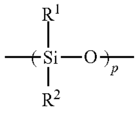

wherein $R^1$ and $R^2$ may be the same or different and each represents an alkyl group or an aryl group; and p represents an integer of from 10 to 500; and wherein the coating composition further contains at least one salt comprising an organic base having a pKa of from 5.0 to 10.5 in terms of a conjugated acid thereof and an acid.

3. An antireflection film comprising a support and a low refractive index layer prepared by coating a coating composition containing the following components:

(A) a fluorine-containing polymer having, a principal chain which is made of only carbon atoms and the fluorine-containing polymer contains at least one fluorine-containing vinyl monomer polymerization unit and at least one hydroxyl group-containing vinyl monomer polymerization unit, wherein a content of the hydroxyl group-containing vinyl monomer polymerization unit exceeds 20% by mole, provided that the polymer does not have a polysiloxane structure in the principal chain;

(B) a crosslinking agent that reacts with a hydroxyl group; and (E) an inorganic particle having a particle size of 1 nm or more and not more than 100 nm, wherein the fluorine-containing polymer contains at least one polymerization unit having a graft site containing, in a side chain thereof, a polysiloxane repeating unit represented by the following formula (1):

Formula (1)

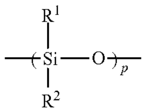

wherein $R^1$ and $R^2$ may be the same or different and each represents an alkyl group or an aryl group; and p represents an integer of from 10 to 500; and wherein the coating composition further contains at least one salt comprising an organic base having a pKa of from 5.0 to 10.5 in terms of a conjugated acid thereof and an acid.

4. The antireflection film as claimed in claim 1, wherein the coating composition further contains (E) an inorganic particle having a particle size of 1 nm or more and not more than 100 nm.

5. The antireflection film as claimed in claim 2, wherein the coating composition further contains (E) an inorganic particle having a particle size of 1 nm or more and not more than 100 nm.

6. The antireflection film as claimed in claim 1, wherein the coating composition further contains (F) a polysiloxane compound having a hydroxyl group or a function group that reacts with a hydroxyl group to form binding.

7. The antireflection film as claimed in claim 2, wherein the coating composition further contains (F) a polysiloxane compound having a hydroxyl group or a function group that reacts with a hydroxyl group to form binding.

8. The antireflection film as claimed in claim 3, wherein the coating composition further contains (F) a polysiloxane compound having a hydroxyl group or a function group that reacts with a hydroxyl group to form binding.

9. The antireflection film as claimed in claim 1, wherein the coating composition further contains at least one salt comprising a nitrogen-containing organic base having a boiling point of 35° C. or higher and not higher than 85° C. and an acid.

10. The antireflection film as claimed in claim 2, wherein the coating composition further contains at least one salt comprising a nitrogen-containing organic base having a boiling point of 35° C. or higher and not higher than 85° C. and an acid.

11. The antireflection film as claimed in claim 3, wherein the coating composition further contains at least one salt comprising a nitrogen-containing organic base having a boiling point of 35° C. or higher and not higher than 85° C. and an acid.

12. The antireflection film as claimed in claim 3, wherein the inorganic particle is a hollow silica particle.

13. The antireflection film as claimed in claim 1, further comprising at least one layer having a refractive index higher than that of the low refractive index layer between the support and the low refractive index layer, wherein the at least one layer contains an organosilane compound or a composition containing at least one of a hydrolyzate of the organosilane compound and a partial condensate of the organosilane compound.

14. The antireflection film as claimed in claim 2, further comprising at least one layer having a refractive index higher than that of the low refractive index layer between the support and the low refractive index layer, wherein the at least one layer contains an organosilane compound or a composition containing at least one of a hydrolyzate of the organosilane compound and a partial condensate of the organosilane compound.

15. The antireflection film as claimed in claim 3, further comprising at least one layer having a refractive index higher than that of the low refractive index layer between the support and the low refractive index layer, wherein the at least one layer contains an organosilane compound or a composition containing at least one of a hydrolyzate of the organosilane compound and a partial condensate of the organosilane compound.

16. A polarizing plate comprising a polarizing film and the antireflection film as claimed in claim 1, wherein the antireflection film is provided as one of two protective films for a polarizing film in the polarizing plate.

17. A polarizing plate comprising a polarizing film and the antireflection film as claimed in claim 2, wherein the antireflection film is provided as one of two protective films for a polarizing film in the polarizing plate.

18. A polarizing plate comprising a polarizing film and the antireflection film as claimed in claim 3, wherein the antireflection film is provided as one of two protective films for a polarizing film in the polarizing plate.

19. An image display device comprising the antireflection film as claimed in claim 1, wherein the antireflection film is provided at an outermost surface of a display.

20. An image display device comprising the antireflection film as claimed in claim 2, wherein the antireflection film is provided at an outermost surface of a display.

21. An image display device comprising the antireflection film as claimed in claim 3, wherein the antireflection film is provided at an outermost surface of a display.

22. The antireflection film as claimed in claim 1, wherein the salt is a compound that generates an acid by heating.

23. The antireflection film as claimed in claim 2, wherein the salt is a compound that generates an acid by heating.

24. The antireflection film as claimed in claim 3, wherein the salt is a compound that generates an acid by heating.

* * * * *